US008488693B2

(12) United States Patent
Ho et al.

(10) Patent No.: US 8,488,693 B2
(45) Date of Patent: Jul. 16, 2013

(54) WIRELESS COMMUNICATION SYSTEMS AND METHODS USING REFERENCE SIGNALS

(75) Inventors: Chung-Lien Ho, Guishan Shiang (TW); Ren-Jr Chen, Sanchong (TW); Yan-Xiu Zheng, Shulin (TW)

(73) Assignee: Industrial Technology Research Institute, Hsinchu (TW)

( * ) Notice: Subject to any disclaimer, the term of this patent is extended or adjusted under 35 U.S.C. 154(b) by 1096 days.

(21) Appl. No.: 12/406,394

(22) Filed: Mar. 18, 2009

(65) Prior Publication Data

US 2009/0323838 A1 Dec. 31, 2009

Related U.S. Application Data

(60) Provisional application No. 61/060,780, filed on Jun. 11, 2008, provisional application No. 61/061,992, filed on Jun. 16, 2008, provisional application No. 61/073,479, filed on Jun. 18, 2008, provisional application No. 61/079,108, filed on Jul. 8, 2008.

(51) Int. Cl.
*H04K 1/10* (2006.01)
*H04L 27/28* (2006.01)

(52) U.S. Cl.
USPC ........... 375/260; 375/142; 375/145; 375/264; 375/265

(58) Field of Classification Search
USPC ................................. 375/260, 262
See application file for complete search history.

(56) References Cited

U.S. PATENT DOCUMENTS

| 6,690,712 | B2 * | 2/2004 | Kim et al. | 375/146 |
|---|---|---|---|---|
| 7,248,559 | B2 | 7/2007 | Ma et al. | |
| 7,254,394 | B2 * | 8/2007 | Chen et al. | 455/437 |
| 7,292,651 | B2 | 11/2007 | Li | |
| 7,342,974 | B2 | 3/2008 | Chiou | |
| 7,869,341 | B2 * | 1/2011 | Lim et al. | 370/208 |
| 2005/0147025 | A1 * | 7/2005 | Auer | 370/203 |
| 2007/0263735 | A1 * | 11/2007 | Tong et al. | 375/260 |
| 2009/0262845 | A1 * | 10/2009 | Park et al. | 375/260 |
| 2009/0323838 | A1 * | 12/2009 | Ho et al. | 375/260 |

FOREIGN PATENT DOCUMENTS

KR 0534410 12/2005

OTHER PUBLICATIONS

English Translation of Notice to Submit Response for Application No. 10-2009-0050513, from the Korean Intellectual Property Office, dated Dec. 31, 2010.

(Continued)

*Primary Examiner* — Daniel Washburn
*Assistant Examiner* — Qutbuddin Ghulamali
(74) *Attorney, Agent, or Firm* — Finnegan, Henderson, Farabow, Garrett & Dunner, LLP

(57) ABSTRACT

A method used in a wireless communication apparatus based on reference signals is provided. The method may include obtaining a plurality of pilot rules and obtaining radio channel information of a radio channel between the wireless communication apparatus and another wireless communication apparatus. The wireless communication apparatus may be in an area including at least one cell and using one or more data streams. Further, the method may include selecting applicable pilot rules from the plurality of pilot rules based on the radio channel information, creating at least one pilot structure to be used in the radio channel; and using the created at least one pilot structure to transmit data over the radio channel.

42 Claims, 56 Drawing Sheets

OTHER PUBLICATIONS

Yuval Lomnitz, et al., "Proposed SDD Text on Downlink PHY Structure based on C802.16mDL_PHY-08/009", IEEE 802.16 Broadband Wireless Access Working Group, IEEE C802.16mDL_PHY-08/017, Apr. 9, 2008.

Sophie Vrzic, et al., "Proposed SDD Text on Downlink Physical Structure", IEEE 802.16 Broadband Wireless Access Working Group, IEEE C802.16mDL_PHY-08/019, Apr. 9, 2008.

Gene Marsh, et al., "Proposed SDD Text for Downlink Resource Allocation Unit and Pilots," IEEE 802.16 Broadband Wireless Access Working Group, IEEE C802.16mDL_PHY-08/018, Apr. 9, 2008.

Jie Zhang, et al., "Draft SDD Text Proposal for Downlink Physical Resource Structure", IEEE 802.16 Broadband Wireless Access Working Group, IEEE C802.16mDL_PHY-08_126r3, Apr. 22, 2008.

Taeyoung Kim, et al., "Proposal from IEEE C802.16mDL_PHY-08/009r2 for DL PHY Rapporteur Group Contribution", IEEE 802.16 Broadband Wireless Access Working Group, IEEE C802.16mDL_PHY-08-029, Apr. 23, 2008.

Chih-Yuan Lin, et al., "Text Proposal Regarding to DL Physical Structure", IEEE 802.16 Broadband Wireless Access Working Group, IEEE C802.16mDL_PHY-08/011, Apr. 8, 2008.

Mark Cudak, et al., "Draft SDD Text Proposal for Downlink Physical Resource Structure", IEEE 802.16 Broadband Wireless Access Working Group, IEEE C802.16mDL_PHY-08/010, Apr. 9, 2008.

Jinsoo Choi, et al., "Proposal for SDD text for IEEE 802.16m DL Physical Structure—11.5.3 Pilot Structure", IEEE 802.16 Broadband Wireless Access Working Group, C80216mDL_PHY-08_LGE_doc4, Apr. 23, 2008.

$3^{rd}$ Generation Partnership Project; Technical Specification Group Radio Access Network; Evolved Universal Terrestrial Radio Access (E-UTRA); Physical Channels and Modulation (Release 8); 3GPP TS 36.211, V8.4.0, Sep. 2008.

"Part 16: Air Interface for Broadband Wireless Access Systems," P802.16Rev2/ D8 Dec. 2008.

\* cited by examiner

WIRELESS COMMUNICATION SYSTEMS AND METHODS USING REFERENCE SIGNALS

CROSS REFERENCE TO RELATED APPLICATIONS

This application is based upon and claims the benefit of priority from U.S. Provisional Application No. 61/060,780 to Chung-Lien Ho et al. filed on Jun. 11, 2008, U.S. Provisional Application No. 61/061,992 to Chung-Lien Ho et al. filed on Jun. 16, 2008, U.S. Provisional Application No. 61/073,479 to Chung-Lien Ho et al. filed on Jun. 18, 2008, and U.S. Provisional Application No. 61/079,108 to Chung-Lien Ho et al. filed on Jul. 8, 2008, the entire contents of all of which are incorporated herein by reference.

TECHNICAL FIELD

The present invention relates generally to wireless communication systems and, more particularly, to reference signal based wireless communication techniques.

BACKGROUND

Recent research and development efforts in the field of next generation wireless communication systems aim at providing much higher data rates than existing systems. For wireless devices and systems to communicate at a much higher data rate, better mechanisms are needed to perform initial time and frequency synchronization, cell identification, and channel estimation. Generally, reference signals or pilot symbols are used to provide such mechanisms.

A reference signal or pilot symbol refers to a known signal sequence inserted at a known location (time or frequency) of a data stream such that communication devices can easily detect the reference signal or pilot symbol, and perform time and frequency synchronization, to measure channel information, to perform interference mitigation or cancellation, etc., and/or to provide time/frequency offset estimation based on detected reference signal or pilot symbol.

Further, the next generation wireless systems may use orthogonal frequency division multiplexing (OFDM) techniques. An OFDM scheme uses different frequency bands, called sub-carriers, to transmit signals in parallel. Pilot symbols may be used in the OFDM scheme to provide not only channel estimation and time and frequency synchronization, but also to prevent frequency and phase shift errors of the sub-carriers.

For example, for IEEE (Institute of Electrical and Electronics Engineering) 802.16 Broadband Wireless Access Working Group, the pilot structure for documentation 802.16m is initialized in IEEE meeting #54. Although several design considerations for pilot structures have been discussed, currently there lacks a systematic approach to design pilot structures or patterns used in the next generation wireless communication systems.

Methods and systems consistent with certain features of the disclosed embodiments address one or more of the problems set forth above.

SUMMARY

One aspect of the present invention includes a method used in a wireless communication apparatus based on reference signals. The method may include obtaining a plurality of pilot rules and obtaining radio channel information of a radio channel between the wireless communication apparatus and another wireless communication apparatus. The wireless communication apparatus may be in an area including at least one cell and using one or more data streams. Further, the method may include selecting applicable pilot rules from the plurality of pilot rules based on the radio channel information, creating at least one pilot structure to be used in the radio channel; and using the created at least one pilot structure to transmit data over the radio channel.

Another aspect of the present invention includes a wireless communication apparatus. The wireless communication apparatus may include at least one antenna and a transceiver. The transceiver may be configured to communicate with an external wireless communication apparatus through a radio channel between the wireless communication apparatus and the external wireless communication apparatus in an area including at least one cell or sector, using one or more data streams. Further, the transceiver may use at least one unified pilot structure provided to be used in the at least one cell or sector by the one or more data streams.

It is to be understood that both the foregoing general description and the following detailed description are exemplary and explanatory only and are not restrictive of the invention, as claimed.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
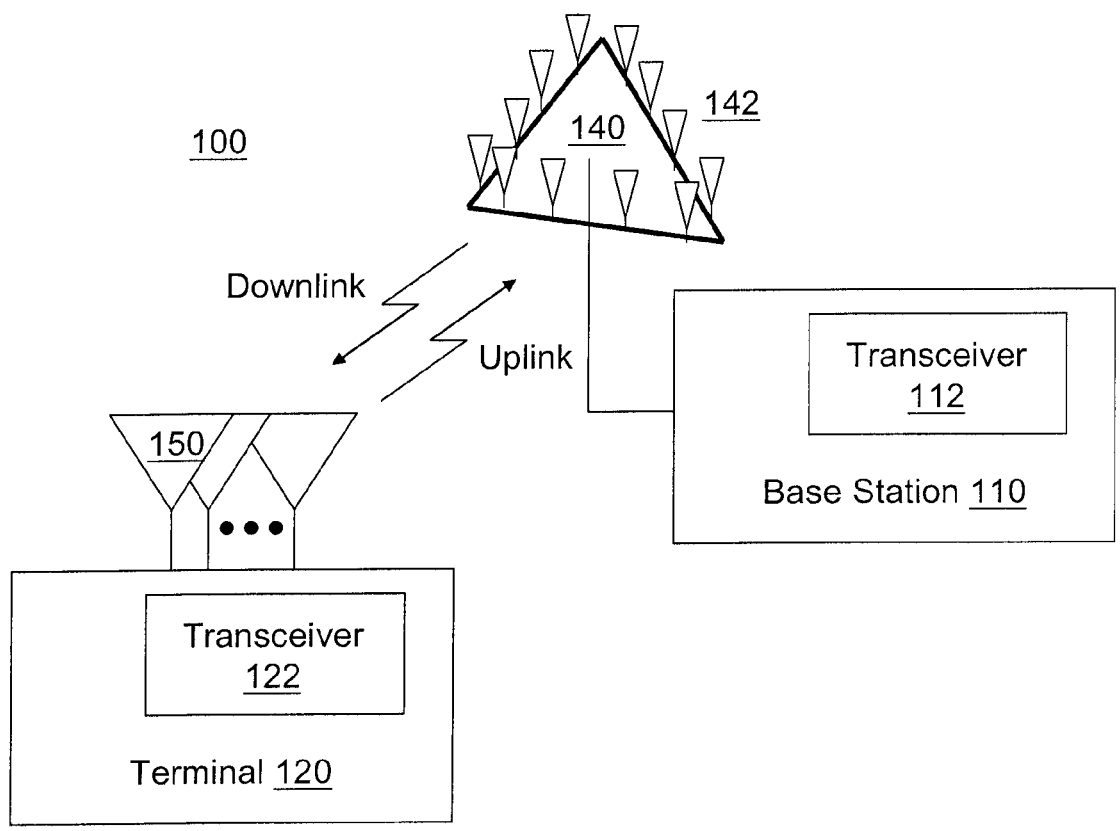
FIG. 1 shows an exemplary wireless communication environment incorporating certain features of embodiments consistent with the present invention.

FIG. 1 shows an exemplary communication environment 100 incorporating features consistent with embodiments of the present invention. As shown in FIG. 1, communication environment 100, such as a wireless communication network using various systems, e.g., code division multiple access (CDMA), wideband code division multiple access (WCDMA), wireless local area network (WLAN), worldwide interoperability for microwave access (WiMAX), and OFDM, may include a base station 110 and a communication terminal 120. The number of base stations and communication terminals is exemplary only and not intended to be limiting. Any number of base stations and communication terminals may be used, and other devices may be added, without departing from the principles of the present invention.

Base station 110 may include any appropriate type of wireless or radio base station, such as a land-based communication base station or a satellite-based communication base station. Base station 110 may include any appropriate type of voice, data, and/or integrated voice and data communication equipment to provide high speed data and/or voice communications. Any type of base station or equivalent thereof may be used.

Further, base station 110 may include a transceiver 112 and one or more antenna arrays 140, and each antenna array may include one or more antennas 142. Transceiver 112 may include any appropriate type of transmitter and receiver to transmit data from base station 110 to other wireless devices and to receive data from the other wireless devices. Transceiver 112 may include any desired functional component(s), processor(s), and/or circuitries to provide coding/encoding, modulation/demodulation, pilot symbol insertion/removal, and other wireless channel related functions.

Base station 110 or, more specifically, transceiver 112 may use one or more antenna arrays 140 for transmitting and receiving in different configurations, such as single-input and single-output (SISO), single-input and multiple-output (SIMO), multiple-input and single-output (MISO), and multiple-input and multiple-output (MIMO). One antenna array 140 may serve one cell or sector.

Communication terminal 120 may include any appropriate communication terminal capable of communicating with base station 110 based on any of the various communication standards, such as a mobile phone, a hand-held device, or any type of wireless device. Communication terminal 120 may also be configured to communicate with other communication terminals (not shown) directly or indirectly via base station 110, such as a landline communication device or a wireless communication device. Further, communication terminals 120 may include a wireless communication transceiver 122 for carrying out the communication between communication terminal 120 and base station 110 and/or between communication terminal 120 and the other communication terminals.

Transceiver 122 may include any appropriate type of mobile device communication transceiver, i.e., a combination of a transmitter and a receiver having a common frequency control. The transmitter and the receiver may be enclosed in a single package or in different packages. Transceiver 122 may include various circuitries provided for processing signals generated during the transmitting and/or receiving operations of transceiver 122. Transceiver 122 may also include any desired functional component(s), processor(s), and/or circuitries to provide coding/encoding, modulation/demodulation, pilot symbol insertion/removal, and other wireless channel related functions.

Terminal 120 may include one or more antenna arrays 150 used by transceiver 122 to receive and transmit signals from and to base station 110. Each antenna array 150 may serve one cell or one sector. Terminal 120 may also be configured to operate in SISO, SIMO, MISO, and/or MIMO mode. Terminal 120 receives signals or data from base station 110 through a downlink (DL) channel established between terminal 120 and base station 110 and transmits signals or data to base station 110 through an uplink (UL) channel established between terminal 120 and base station 110.

Figure 2:
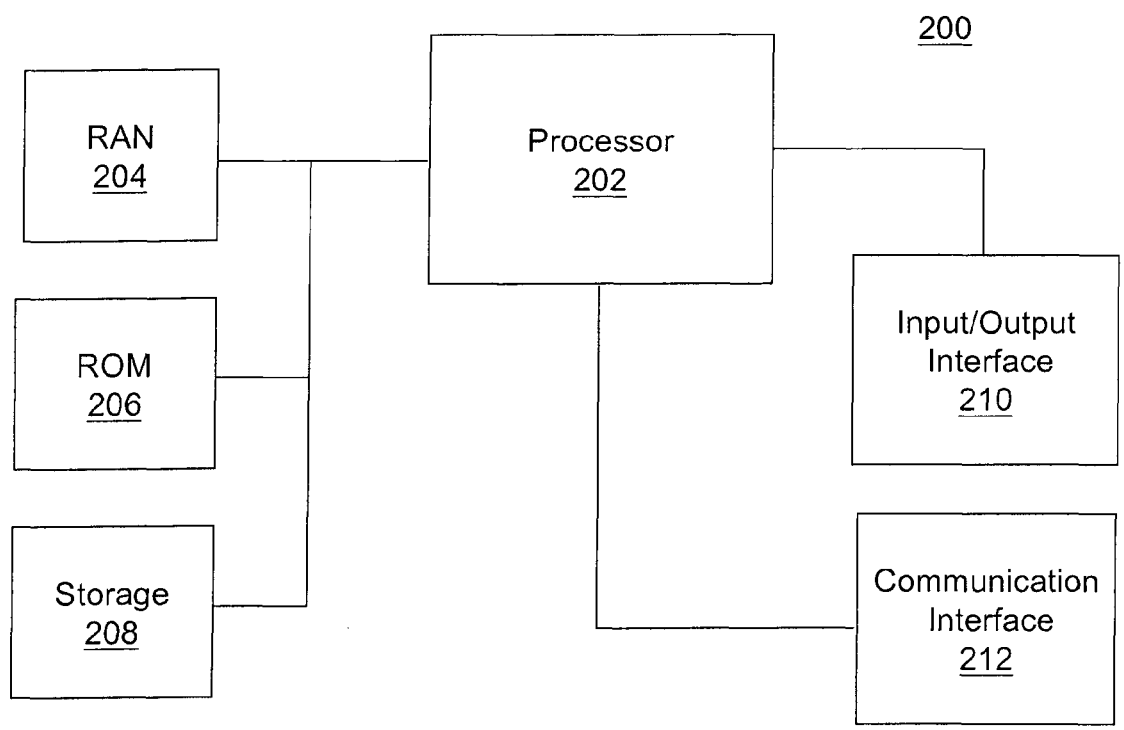
FIG. 2 shows an exemplary controller consistent with embodiments of the present invention.

Operations of transceiver 112 and/or transceiver 122 may be controlled by a controller (not shown in FIG. 1). FIG. 2 shows an exemplary controller 200 that may be used in transceiver 112 and transceiver 122. As shown in FIG. 2, controller 200 may include a processor 202, a random access memory (RAM) 204, a read-only memory (ROM) 206, a storage 208, an input/output interface 210, and a communication interface 212. It is understood that the type and number of devices included in controller 200 are exemplary only and not intended to be limiting. The number of listed devices may be changed, certain devices may be removed, and other devices may be added.

Processor 202 may include any appropriate type of general purpose microprocessor, digital signal processor, application specific integrated circuit (ASIC), or microcontroller. Processor 202 may execute sequences of computer program instructions to perform various information processing functions including certain encoding/decoding functions and pilot symbol related functions. Processor 202 may be coupled to or access other devices, such as transceivers, other processors, radio frequency (RF) devices, and/or antennas.

RAM 204 and ROM 206 may include any appropriate type of random access memory, read only memory, or flash memory. Storage 208 may include any appropriate type of mass storage provided to store any type of information that processor 202 may need to perform processing/functions. For example, storage 208 may include one or more hard disk devices, optical disk devices, floppy disk devices, and/or other storage devices to provide storage space.

Input/output interface 210 may send control and data signals to other devices from processor 202 and may receive control and data signals sent from other devices to processor 202. Communication interface 212 may provide communication connections to enable controller 200 to exchange information with other systems via, for example, computer networks, such as the Internet.

Figure 3:
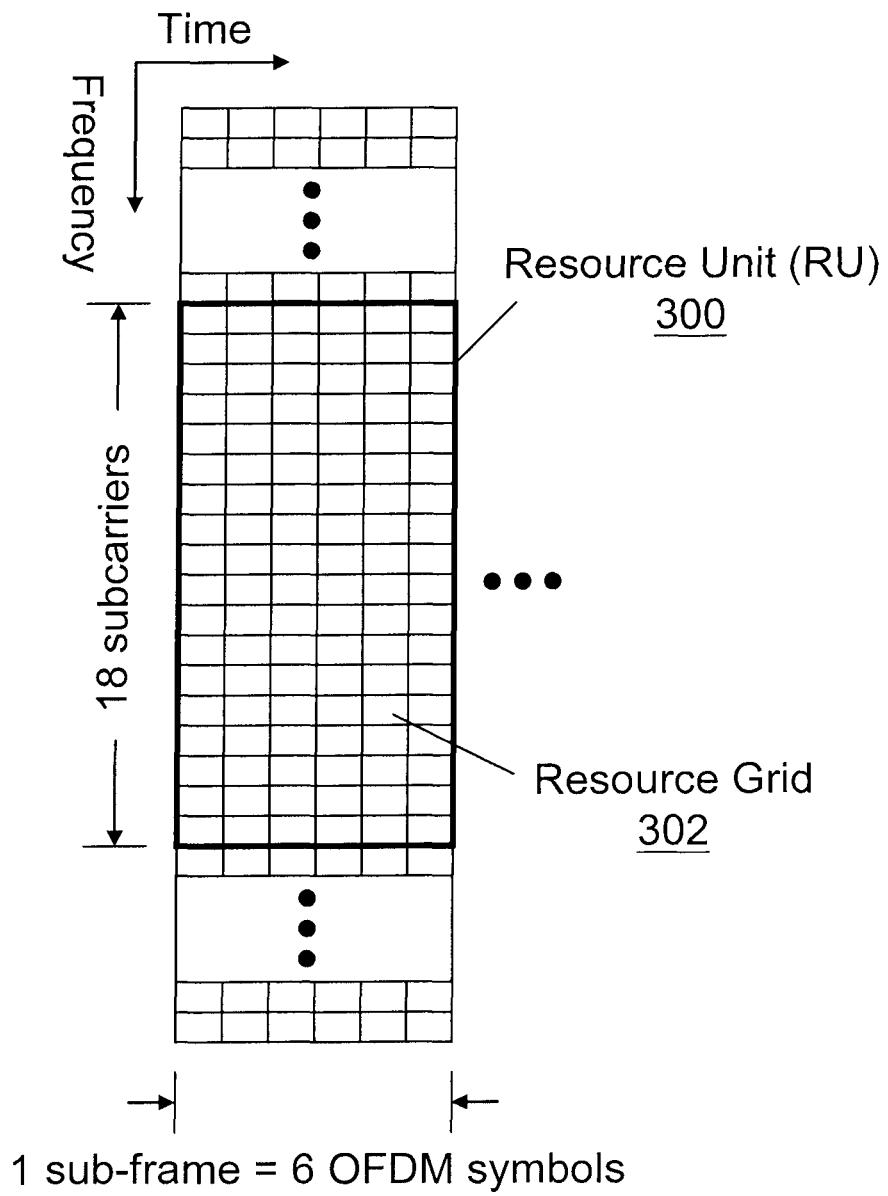
FIG. 3 shows an exemplary resource unit (RU) consistent with embodiments of the present invention.

Transceiver 112 and/or transceiver 122, under the control of controller 200, may communicate with each other using an OFDM scheme. Further, transceiver 112 and transceiver 122 may apply unified pilot patterns or pilot structures to OFDM communications. Unified pilot structures, as used herein, may refer to the same pilot structures used for both common pilots, i.e., all users can use, and dedicated pilots, i.e., limited to a specific user or users. Unified pilot structures may also refer to the same pilot structures used for both DL and UL transmission. Further, unified pilot structures may refer to a series of pilot patterns systematically designed under different operational circumstances, such as different numbers of data stream used, different sizes of resource unit (RU) used, and/or different base station and wireless cell configurations. FIG. 3 illustrates an exemplary RU in the OFDM scheme and FIGS. 4A and 4B illustrate an exemplary cell or cells and wireless network configurations.

As shown in FIG. 3, OFDM data transmission may be represented in both time and frequency, wherein the horizontal axis represents time and the vertical axis represents frequency. The OFDM data may be transmitted by a resource grid 302 on a sub-carrier (a frequency band) in a time slot (an OFDM symbol). An RU, as used herein, may refer to the basic unit for resource allocation that comprises a predetermined number of consecutive sub-carriers by a predetermined number of consecutive OFDMA symbols. For example, as shown in FIG. 3, RU 300 is an 18 sub-carrier and 6 symbol (18×6) data block.

Each symbol (a small rectangle in RU 300) may be used for carrying any type of information. For example, a data symbol carries data, and a pilot symbol carries a pilot pattern. However, because adding pilot symbols may reduce the number of data symbols, there may be a desirable tradeoff between adding overhead to provide robust channel estimation using the pilot symbols, while keeping overhead to a minimum so as not to impact spectral efficiency and data rate. The tradeoff may become more complex in MIMO schemes because multiple antennas may be used and multiple data streams or radio/wireless signals may co-exist at a particular time and location.

Figure 4A:
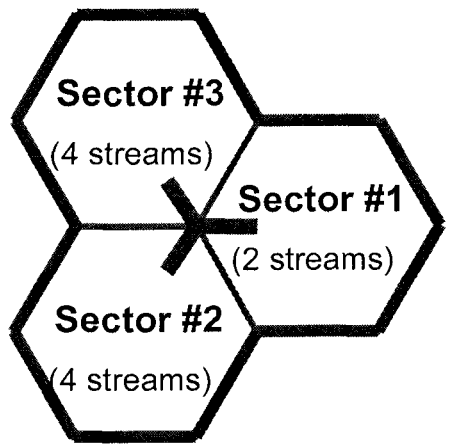
FIG. 4A illustrates an exemplary single cell of a wireless network consistent with embodiments of the present invention.
Figure 4B:
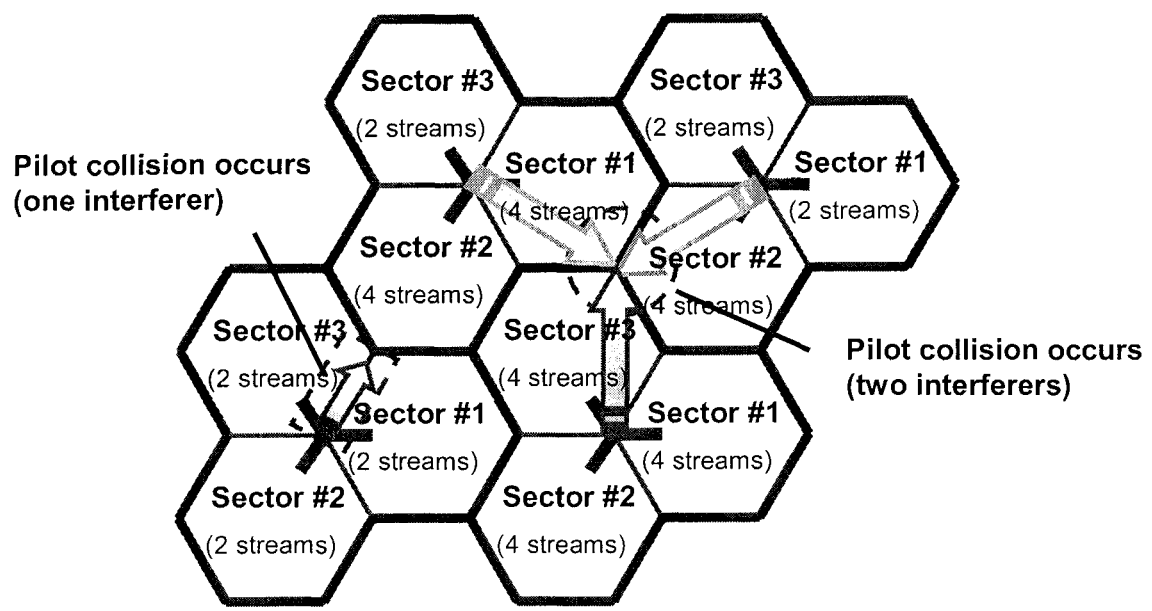
FIG. 4B illustrates a large area covered by multiple cells consistent with embodiments of the present invention.

FIG. 4A illustrates an exemplary single cell of a wireless network. A cell may refer to an area serviced by one base station with one or more antenna arrays or antennas. Multiple antenna arrays used by the base station may serve multiple sectors, e.g., sector #1, sector #2, and sector #3. Each sector may also transmit radio signals with one or more data streams. For example, in FIG. 4A, sector #1 transmits 2 streams, sector #2 transmits 4 streams, and sector #3 transmits 4 streams. The numbers of the streams and the sectors are for illustrative purpose only, any appropriate number of streams and/or sectors may be used. For example, for the purpose of designing pilot structures, a sector of a cell with multiple sectors may be equivalent to a cell with a single sector as a source of data streams, i.e., a sector/cell.

Figure 5:
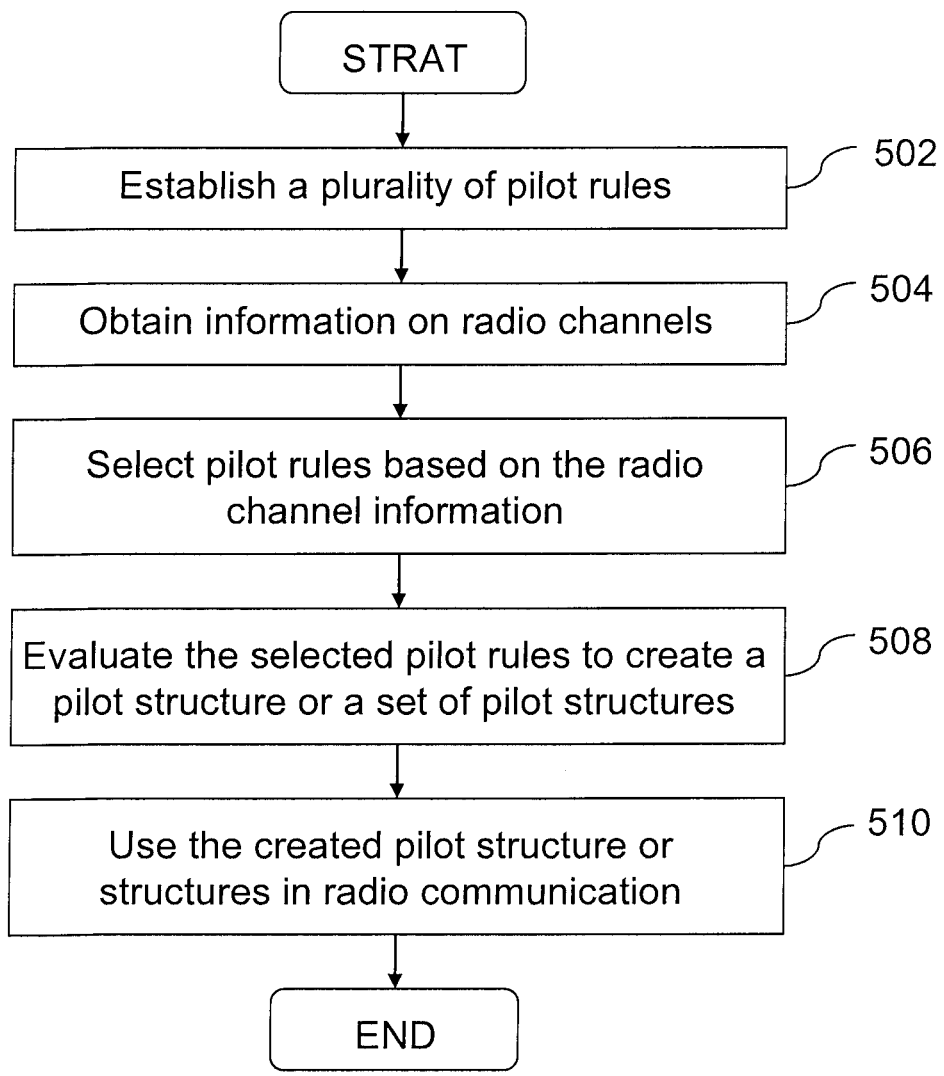
FIG. 5 illustrates an exemplary process for creating and using unified pilot structures consistent with embodiments of the present invention.

FIG. 4B illustrates a large area covered by multiple cells. Signals from different cells and/or different sectors may cause interference in certain areas, such as the dotted circle and dotted rectangle. A systematic approach in pilot structure design may prevent or reduce such interference. Unified pilot structures may be created and used to improve wireless communication quality by using a particular pilot structure or a particular set of pilot structures. FIG. 5 illustrates an exemplary process 500 for creating and using the unified pilot structures. Exemplary process 500 may be performed by controller 200 (processor 202) or any appropriate computer system with a processor similar to processor 202.

As shown in FIG. 5, processor 202 may establish a plurality of pilot rules (step 502). A pilot rule, as used herein, may refer to a particular design consideration related to a pilot pattern used in an OFDM or other wireless communication system. For example, the plurality of pilot rules may include a pilot density rule (rule 1 or R1).

Pilot density may have direct impact on the accuracy of channel estimation, as a higher pilot density, i.e., more pilot symbols, may increase the accuracy of the channel estimation. On the other hand, a higher pilot density means higher channel overhead because fewer data symbols can be used. To achieve a proper tradeoff between the channel overhead and the accuracy of channel estimation, it may be desirable to use 6 pilot symbols per transmission stream within a regular 18×6 RU for single stream and two stream configurations. It may also be desirable to use less than 6 pilot symbols per transmission stream if the number of transmission streams used is greater than two. For other irregular RUs, such as 18×5 and/or 18×7 RUs, the pilot symbols may be designed based on the corresponding regular 18×6 RU. Other numbers of pilot symbols, however, may also be used based on the size of RU, or in a case-by-case manner.

Pilot density, or pilot overhead $\rho$, may be calculated based on the pilot symbols used and the RU configuration. For example, if all the RUs within a cell/sector use the same pilot structure, the pilot overhead p can be calculated as $\rho = N_{p,RU}/N_{rg,RU}$, where $N_{p,RU}$ is the total number of pilot symbols over all pilot streams within an RU and $N_{rg,RU}$ is the total number of resource grids within an RU which is equal to the product of number of subcarriers $N_{sc,RU}$ and number of OFDM symbols $N_{OFDM,RU}$ within an RU, that is, $N_{rg,RU} = N_{sc,RU} \times N_{OFDM,RU}$.

The plurality of pilot rules may also include a pilot spacing rule (rule 2 or R2). Pilot spacing may decide how far apart to separate any two pilots in the time domain and/or the frequency domain. Pilot spacing may also have an impact on the performance of channel estimation. The maximum pilot spacing between any two pilots in the time domain and the frequency domain should depend on the channel parameters, such as the coherent time, i.e., the time window within which the time remains constant, and coherent bandwidth, i.e., the bandwidth within which frequency characteristics remain consistent. To satisfy the requirements of IEEE 802.16m standards, for example, supporting speed mobility up to 350 km/h and a channel delay spread of no more than 5 µs, it may be desirable to limit the maximum pilot spacing to no more than 3 OFDM symbols in the time domain and no more than 9 sub-carriers in the frequency domain. Based on the desired pilot spacing, the channel estimate on symbols other than pilot symbols may be appropriately interpolated/extrapolated.

The plurality of pilot rules may also include a channel estimation extrapolation avoidance rule (rule 3 or R3). From the numerical perspective, the extrapolation is generally less accurate than interpolation. To avoid the extrapolation for channel estimation, it may be desirable to allocate pilot symbols or a set of pilot symbols near or at RU boundaries.

The plurality of pilot rules may also include an interlaced pilot rule (rule 4 or R4). When the users are at a sector/cell boundary, "pilot collision" (interference) may occur and affect the accuracy of the channel estimation. To avoid pilot collision, it may be desirable to interlace pilot structures used in different sectors or cells. That is, to preserve the orthogonal property of pilot structures used in each of sectors/cells. Thus, interlaced pilot patterns, e.g., orthogonal pilot structures, may be supported in every sector/cell. Further, to simplify the pilot structure for avoiding the collision, it may be desirable to cyclically shift a pilot pattern in the time domain (and/or frequency domain) within an RU to generate pilot patterns for adjacent cells and/or sectors or for all sectors/cells.

The plurality of pilot rules may also include a pilot power boosting rule (rule 5 or R5). It may be desirable to boost the power of pilot symbols to enhance the channel estimation accuracy. However, only increasing the power of pilot symbols on each of OFDM symbols within an RU may be difficult. Alternatively, it may be possible to reallocate power from data and/or the null symbols. This, however, may also cause the symbol-by-symbol power fluctuation if the number of pilot symbols for a particular pilot stream is different in each of OFDM symbols. Therefore, to reduce the symbol-by-symbol power fluctuation, it may be desirable to evenly place the pilot streams and pilot symbols on each of the OFDM symbols within an RU.

The plurality of pilot rules may also include a pilot power across antennas rule (rule 6 or R6). When pilot symbols are transmitted through multiple antennas, power fluctuation may occur across different antennas. To reduce or minimize the power fluctuation for multi-antenna/stream transmissions, it may be desirable to evenly allocate pilot symbols on each of the antennas.

The plurality of pilot rules may also include a sub-frame size pilot rule (rule 7 or R7). In certain circumstances, some OFDM symbols may be used to send control signals or a guard interval that may be needed for downlink/uplink transition so that the pilot symbols may not be allocated on some of OFDM symbols, which may lead to an 18×5 RU. On the other hand, when a short-length cyclic prefix (CP), for example of 1/16 of an OFDM symbol, is supported, an 18×7 RU may be used for transmission. Therefore, pilot structures may need to be designed for sub-frames with fewer or more 6 OFDM symbols.

More particularly, in IEEE 802.16m standards, the first and/or last OFDM symbols may be preserved for certain purposes, such as for control signaling and/or guard interval. However, reserving these two OFDM symbols without allocating the pilot symbols will lead to symbol-by-symbol power fluctuation. It may be desirable to design a pilot structure to maintain the pilot density (or overhead) the same regardless of the number of OFDM symbols within a subframe, e.g., for a 18×3, 18×5, 18×6, or 18×7 RU, to reduce or prevent power fluctuation. The pilot structure may be generated by deleting the last time domain column (OFDM symbol) from a regular RU (18×6) to form another pilot structure on an irregular RU (18×5); by inserting an extra column (OFDM symbol) behind a regular RU (18×6) by duplicating the first column on the regular RU to form another pilot structure on an irregular RU (18×7); or by separating the pilot structure in a regular RU (18×6) into two identical pilot structures on two irregular RUs (18×3).

The plurality of pilot rules may also include an inter-user synchronization error reduction rule (rule 8 or R8). In an uplink transmission, multi-user synchronization errors may cause overlapping of the RUs of the uplink users. For example, according to the WiMAX system profile, frequency and time synchronization requirements are less than 2% subcarrier spacing and less than $\pm(T_b/32)/4$, respectively, where $T_b$ is an OFDM symbol time duration. To properly arrange pilot symbols to reduce inter-pilot interference (IPI) in the overlapped region, it may be desirable to apply staggered structure to pilot symbols located at the boundary of an RU.

Further, the plurality of pilot rules may also include a rule for unified pilot structure for spatial multiplexing and space/frequency block coding (SFBC) (rule 9 or R9). Rule 9 may be suitable when the number of pilot streams is power of two. For example, when SFBC is used with 2 or 4 antennas at the transmitter, it may be desirable to make the number of pilot symbols on each OFDM symbol within an RU be power of two (including where no pilot symbols are allocated on an OFDM symbol within an RU).

It is understood that the above rules (rule 1 to rule 9) are listed for illustrative purposes only, the listed rules may be changed or removed, and other rules may be added.

After establishing the plurality of pilot rules (step 502) or, if the plurality of pilot rules have already been established, obtaining the plurality of pilot rules, processor 202 may obtain information on radio channels (step 504). For example, processor 202 may obtain the radio communication standard, the size of the RU or RUs, the pilot schemes, the number of antennas, sectors, and/or data streams, channel configurations, downlink/uplink parameters, etc.

Further, processor 202 may select pilot rules based on the information obtained (step 506). Any or all rules may be selected to be applied or considered, and the application or consideration may also be prioritized. The rule selection may be performed based on any appropriate method, such as by a predetermined algorithm, by experiments, and/or by simulations.

Processor 202 may also evaluate the selected pilot rules to create a desired pilot structure or a set of pilot structures (step 508). The evaluation may be performed based on any appropriate method, such as by a predetermined algorithm, by experiments, e.g., to determine whether the selected pilot rules or most of the selected pilot rules are satisfied for the pilot structures, and/or by simulations.

Figure 6A:
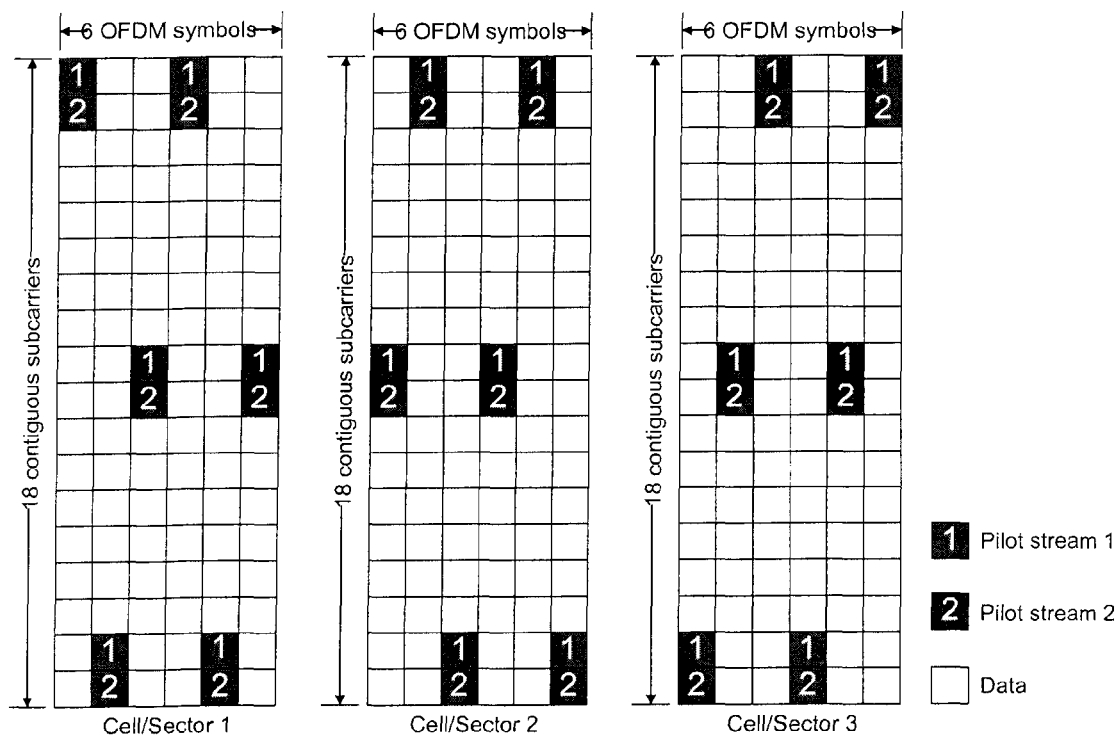
FIG. 6A illustrates an exemplary set of pilot structures consistent with embodiments of the present invention.

For example, FIG. 6A illustrates an exemplary set of pilot structures designed for a base station or base stations using a 2-stream 3-sector/cell configuration for an RU size of 18×6. A 3 sector/cell configuration may refer to a set of pilot structures used in 3 sectors of an individual cell, in 3 individual sectors of 3 respective cells, or any combination of sectors and cell.

This set of pilot structures for cell/sector 1, cell/sector 2, and cell/sector 3 may be represented by following notion:

$$\begin{vmatrix} 1 & 0 & 0 & 1 & 0 & 0 \\ 2 & 0 & 0 & 2 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 1 \\ 0 & 0 & 2 & 0 & 0 & 2 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 1 & 0 \\ 0 & 2 & 0 & 0 & 2 & 0 \end{vmatrix}, \begin{vmatrix} 0 & 1 & 0 & 0 & 1 & 0 \\ 0 & 2 & 0 & 0 & 2 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & 0 & 1 & 0 & 0 \\ 2 & 0 & 0 & 2 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 1 \\ 0 & 0 & 2 & 0 & 0 & 2 \end{vmatrix}, \begin{vmatrix} 0 & 0 & 1 & 0 & 0 & 1 \\ 0 & 0 & 2 & 0 & 0 & 2 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 1 & 0 \\ 0 & 2 & 0 & 0 & 2 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & 0 & 1 & 0 & 0 \\ 2 & 0 & 0 & 2 & 0 & 0 \end{vmatrix},$$

respectively. Where the 6 columns represent 6 OFDM symbols and 18 rows represent 18 sub-carriers, as shown in FIG. 6A, and '1' represents pilot symbol for stream 1; '2' represents pilot symbol for stream 2, and '0' represents non-pilot symbol such as data symbols.

Figure 6B:
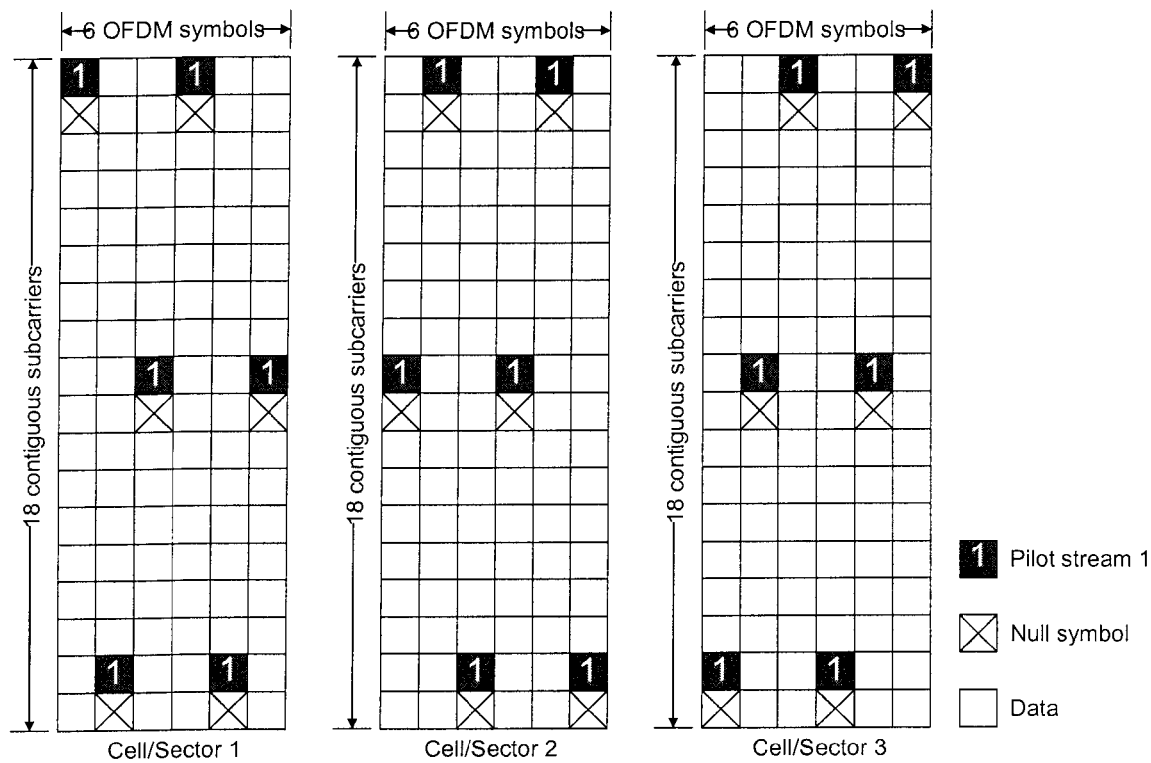
FIG. 6B illustrates another exemplary set of pilot structures consistent with embodiments of the present invention.
Figure 6C:
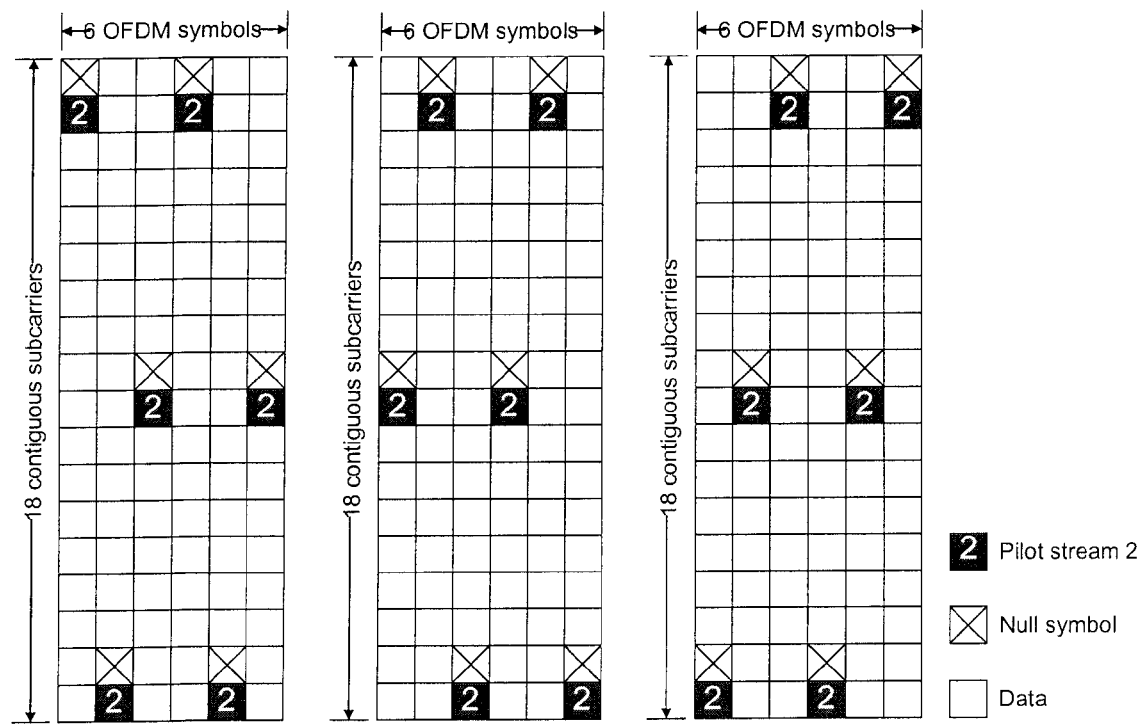
FIG. 6C illustrates another exemplary set of pilot structures consistent with embodiments of the present invention.

FIG. 6B and 6C further illustrates how the pilot symbols and data symbols are allocated in an RU transmitted from the two streams (or antennas) in pilot structures individually for each of the two streams for 2-stream transmission. More specifically, the pilot structures illustrated in FIGS. 6B and 6C may be used for transmission on the $1^{st}$ stream and $2^{nd}$ stream for the 2-stream 3-sector/cell configuration, respectively. It is noted that "X" stands for null symbol which means that no data or pilot will be allocated on that time-frequency resource grid for transmission. However, to simplify the presentation for illustration in the following, without loss of generality, we use the illustration of FIG. 6A to express the pilot structures shown in FIG. 6B and FIG. 6C without illustrating individual streams (unless otherwise stated, this is true for all disclosed pilot structures consistent with the embodiments). Therefore, all the embodiments disclosed herein includes all relevant pilot structures for all individual streams although the illustrations may be omitted for the purpose of simplicity.

Figure 6D:
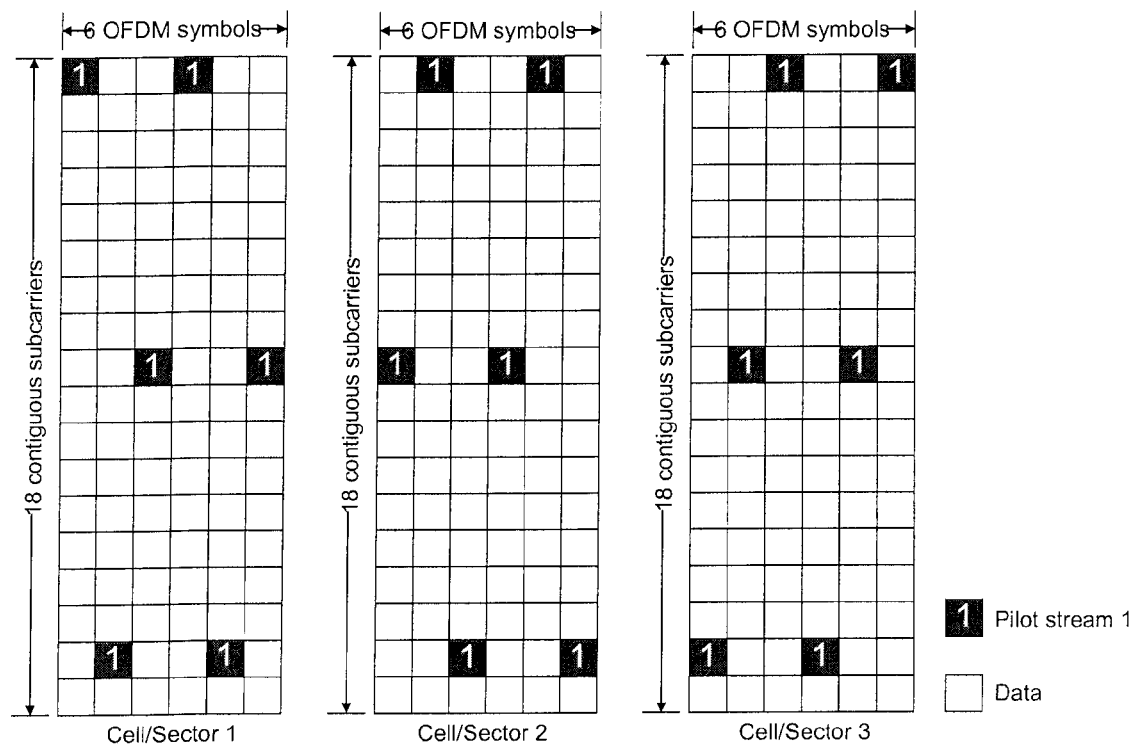
FIG. 6D illustrates another exemplary set of pilot structures consistent with embodiments of the present invention.

FIG. 6D illustrates an exemplary set of pilot structures designed for a base station or base stations using a single stream 3-sector/cell configuration for an RU size of 18×6. This set of pilot structures for cell/sector 1, cell/sector 2, and cell/sector 3 may be represented as:

$$\begin{bmatrix} 1&0&0&1&0&0 \\ 0&0&0&0&0&0 \\ 0&0&0&0&0&0 \\ 0&0&0&0&0&0 \\ 0&0&0&0&0&0 \\ 0&0&0&0&0&0 \\ 0&0&0&0&0&0 \\ 0&0&0&0&0&0 \\ 0&0&1&0&0&1 \\ 0&0&0&0&0&0 \\ 0&0&0&0&0&0 \\ 0&0&0&0&0&0 \\ 0&0&0&0&0&0 \\ 0&0&0&0&0&0 \\ 0&0&0&0&0&0 \\ 0&0&0&0&0&0 \\ 0&1&0&0&1&0 \\ 0&0&0&0&0&0 \end{bmatrix}, \begin{bmatrix} 0&1&0&0&1&0 \\ 0&0&0&0&0&0 \\ 0&0&0&0&0&0 \\ 0&0&0&0&0&0 \\ 0&0&0&0&0&0 \\ 0&0&0&0&0&0 \\ 0&0&0&0&0&0 \\ 0&0&0&0&0&0 \\ 1&0&0&1&0&0 \\ 0&0&0&0&0&0 \\ 0&0&0&0&0&0 \\ 0&0&0&0&0&0 \\ 0&0&0&0&0&0 \\ 0&0&0&0&0&0 \\ 0&0&0&0&0&0 \\ 0&0&0&0&0&0 \\ 0&0&1&0&0&1 \\ 0&0&0&0&0&0 \end{bmatrix}, \begin{bmatrix} 0&0&1&0&0&1 \\ 0&0&0&0&0&0 \\ 0&0&0&0&0&0 \\ 0&0&0&0&0&0 \\ 0&0&0&0&0&0 \\ 0&0&0&0&0&0 \\ 0&0&0&0&0&0 \\ 0&0&0&0&0&0 \\ 0&1&0&0&1&0 \\ 0&0&0&0&0&0 \\ 0&0&0&0&0&0 \\ 0&0&0&0&0&0 \\ 0&0&0&0&0&0 \\ 0&0&0&0&0&0 \\ 0&0&0&0&0&0 \\ 0&0&0&0&0&0 \\ 1&0&0&1&0&0 \\ 0&0&0&0&0&0 \end{bmatrix}$$

respectively.

Figure 6E:
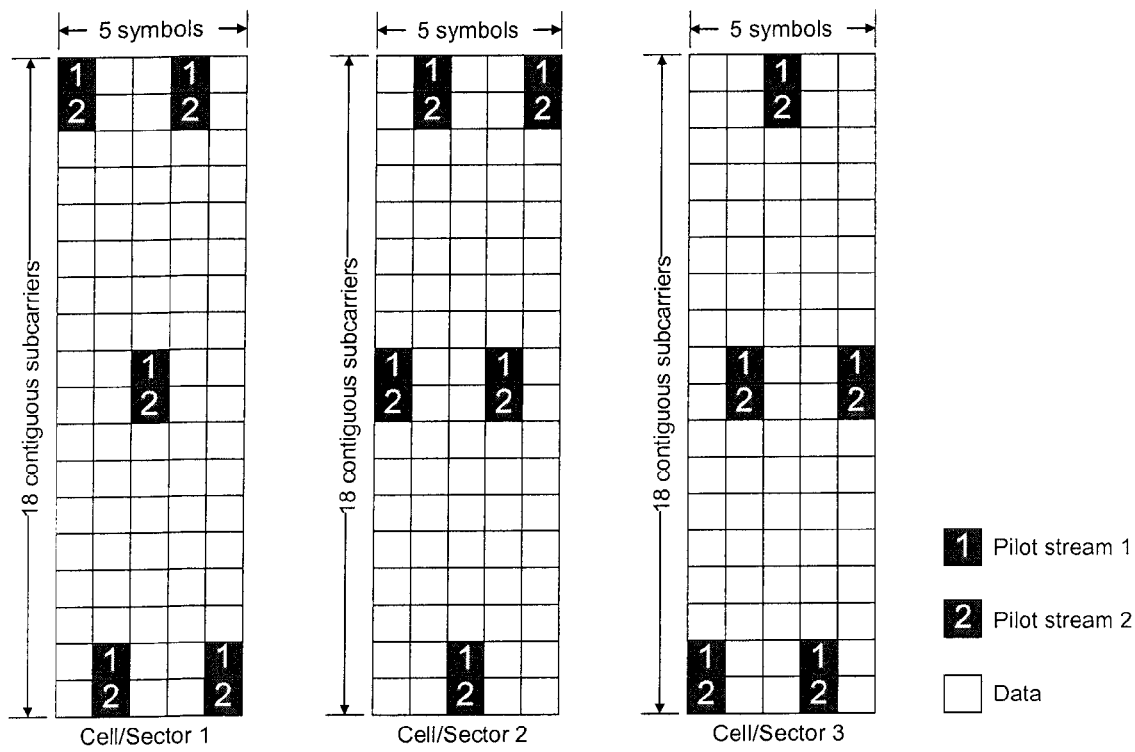
FIG. 6E illustrates another exemplary set of pilot structures consistent with embodiments of the present invention.

FIG. 6E illustrates an exemplary set of pilot structures designed for a base station or base stations using a 2-stream 3-sector/cell configuration for an RU size of 18×5. This set of pilot structures for cell/sector 1, cell/sector 2, and cell/sector 3 may be represented as:

$$\begin{bmatrix} 1&0&0&1&0 \\ 2&0&0&2&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&0&1&0&0 \\ 0&0&2&0&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&1&0&0&1 \\ 0&2&0&0&2 \end{bmatrix}, \begin{bmatrix} 0&1&0&0&1 \\ 0&2&0&0&2 \\ 0&0&0&0&0 \\ 0&0&0&0&0 \\ 0&0&0&0&0 \\ 0&0&0&0&0 \\ 0&0&0&0&0 \\ 0&0&0&0&0 \\ 1&0&0&1&0 \\ 2&0&0&2&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&0&1&0&0 \\ 0&0&2&0&0 \end{bmatrix}, \begin{bmatrix} 0&0&1&0&0 \\ 0&0&2&0&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&1&0&0&1 \\ 0&2&0&0&2 \\ 0&0&0&0&0 \\ 0&0&0&0&0 \\ 0&0&0&0&0 \\ 0&0&0&0&0 \\ 0&0&0&0&0 \\ 0&0&0&0&0 \\ 1&0&0&1&0 \\ 2&0&0&2&0 \end{bmatrix}$$

respectively.

Figure 6F:
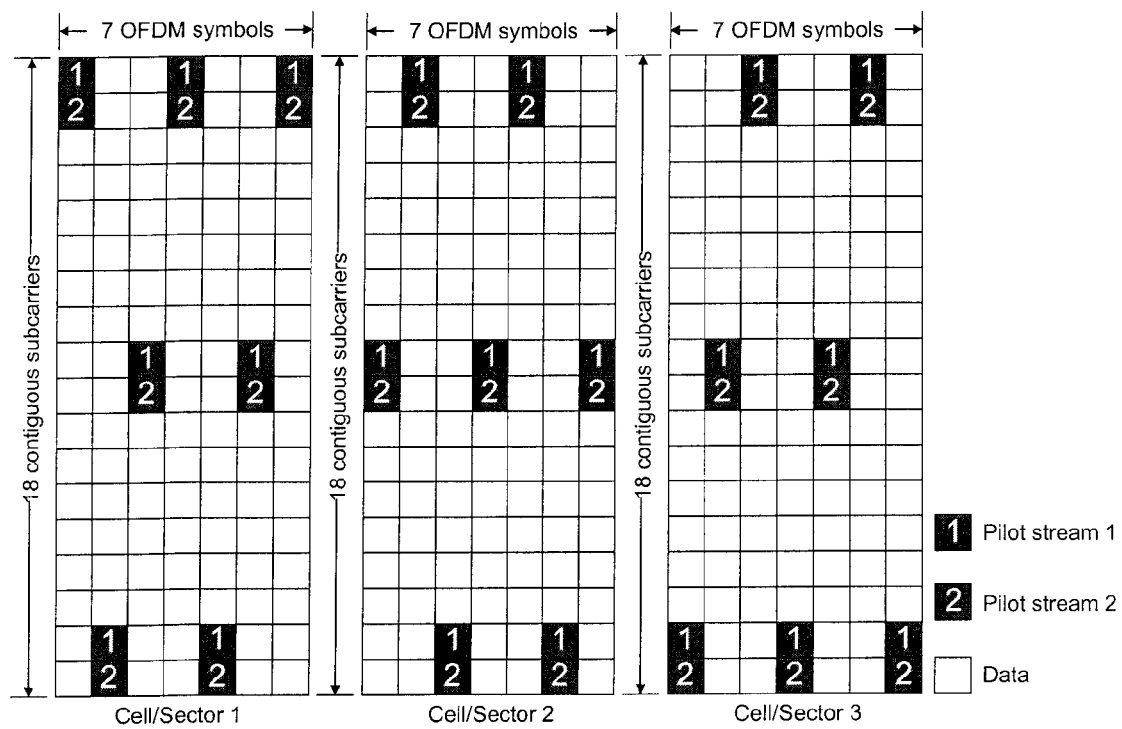
FIG. 6F illustrates another exemplary set of pilot structures consistent with embodiments of the present invention.

FIG. 6F illustrates an exemplary set of pilot structures designed for a base station or base stations using a 2-stream 3-sector/cell configuration for an RU size of 18×7. This set of pilot structures for cell/sector 1, cell/sector 2, and cell/sector 3 may be represented as:

$$\begin{bmatrix} 1&0&0&1&0&0&1 \\ 2&0&0&2&0&0&2 \\ 0&0&0&0&0&0&0 \\ 0&0&0&0&0&0&0 \\ 0&0&0&0&0&0&0 \\ 0&0&0&0&0&0&0 \\ 0&0&0&0&0&0&0 \\ 0&0&0&0&0&0&0 \\ 0&0&1&0&0&1&0 \\ 0&0&2&0&0&2&0 \\ 0&0&0&0&0&0&0 \\ 0&0&0&0&0&0&0 \\ 0&0&0&0&0&0&0 \\ 0&0&0&0&0&0&0 \\ 0&0&0&0&0&0&0 \\ 0&0&0&0&0&0&0 \\ 0&1&0&0&1&0&0 \\ 0&2&0&0&2&0&0 \end{bmatrix}, \begin{bmatrix} 0&1&0&0&1&0&0 \\ 0&2&0&0&2&0&0 \\ 0&0&0&0&0&0&0 \\ 0&0&0&0&0&0&0 \\ 0&0&0&0&0&0&0 \\ 0&0&0&0&0&0&0 \\ 0&0&0&0&0&0&0 \\ 0&0&0&0&0&0&0 \\ 1&0&0&1&0&0&1 \\ 2&0&0&2&0&0&2 \\ 0&0&0&0&0&0&0 \\ 0&0&0&0&0&0&0 \\ 0&0&0&0&0&0&0 \\ 0&0&0&0&0&0&0 \\ 0&0&0&0&0&0&0 \\ 0&0&0&0&0&0&0 \\ 0&0&1&0&0&1&0 \\ 0&0&2&0&0&2&0 \end{bmatrix}, \begin{bmatrix} 0&0&1&0&0&1&0 \\ 0&0&2&0&0&2&0 \\ 0&0&0&0&0&0&0 \\ 0&0&0&0&0&0&0 \\ 0&0&0&0&0&0&0 \\ 0&0&0&0&0&0&0 \\ 0&0&0&0&0&0&0 \\ 0&0&0&0&0&0&0 \\ 0&1&0&0&1&0&0 \\ 0&2&0&0&2&0&0 \\ 0&0&0&0&0&0&0 \\ 0&0&0&0&0&0&0 \\ 0&0&0&0&0&0&0 \\ 0&0&0&0&0&0&0 \\ 0&0&0&0&0&0&0 \\ 0&0&0&0&0&0&0 \\ 1&0&0&1&0&0&1 \\ 2&0&0&2&0&0&2 \end{bmatrix}$$

respectively.

Figure 6G:
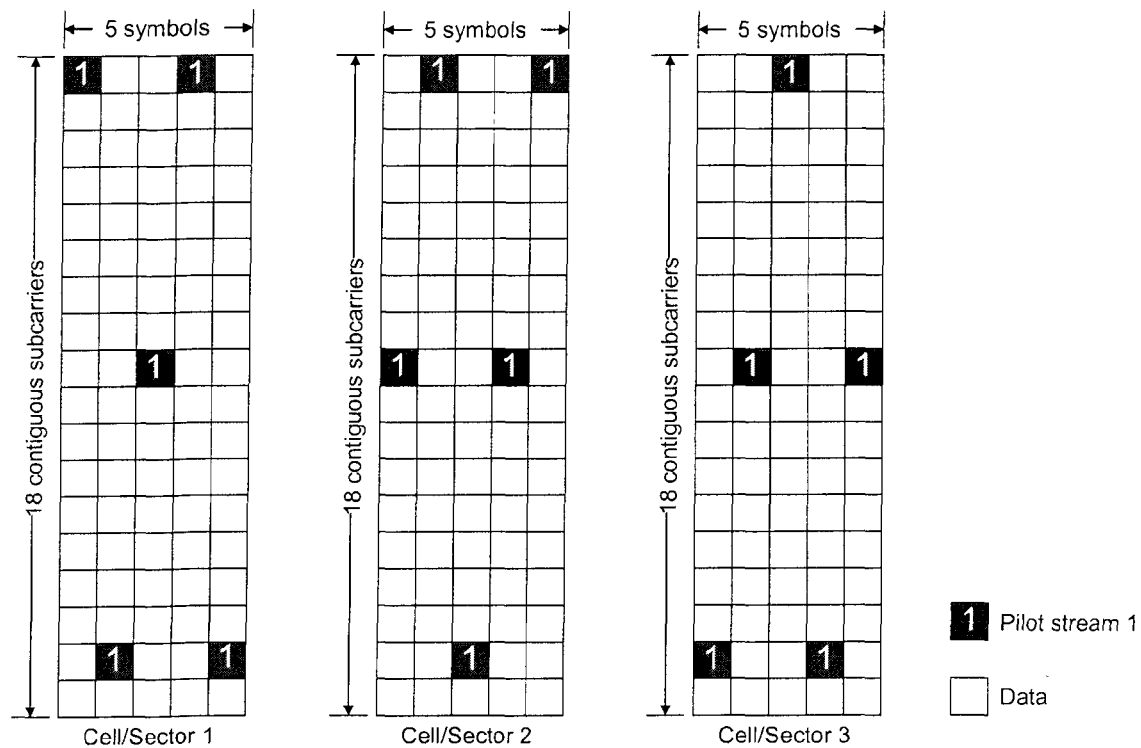
FIG. 6G illustrates another exemplary set of pilot structures consistent with embodiments of the present invention.

FIG. 6G illustrates an exemplary set of pilot structures designed for a base station or base stations using a single stream 3-sector/cell configuration for an RU size of 18×5. This set of pilot structures for cell/sector 1, cell/sector 2, and cell/sector 3 may be represented as:

$$\begin{bmatrix} 1&0&0&1&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&0&1&0&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&1&0&0&1 \\ 0&0&0&0&0 \end{bmatrix}, \begin{bmatrix} 0&1&0&0&1 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 1&0&0&1&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&0&1&0&0 \\ 0&0&0&0&0 \end{bmatrix}, \begin{bmatrix} 0&0&1&0&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&1&0&0&1 \\ 0&0&0&0&0 \\ 0&0&0&0&0 \\ 0&0&0&0&0 \\ 0&0&0&0&0 \\ 0&0&0&0&0 \\ 0&0&0&0&0 \\ 0&0&0&0&0 \\ 1&0&0&1&0 \\ 0&0&0&0&0 \end{bmatrix}$$

respectively.

Figure 6H:
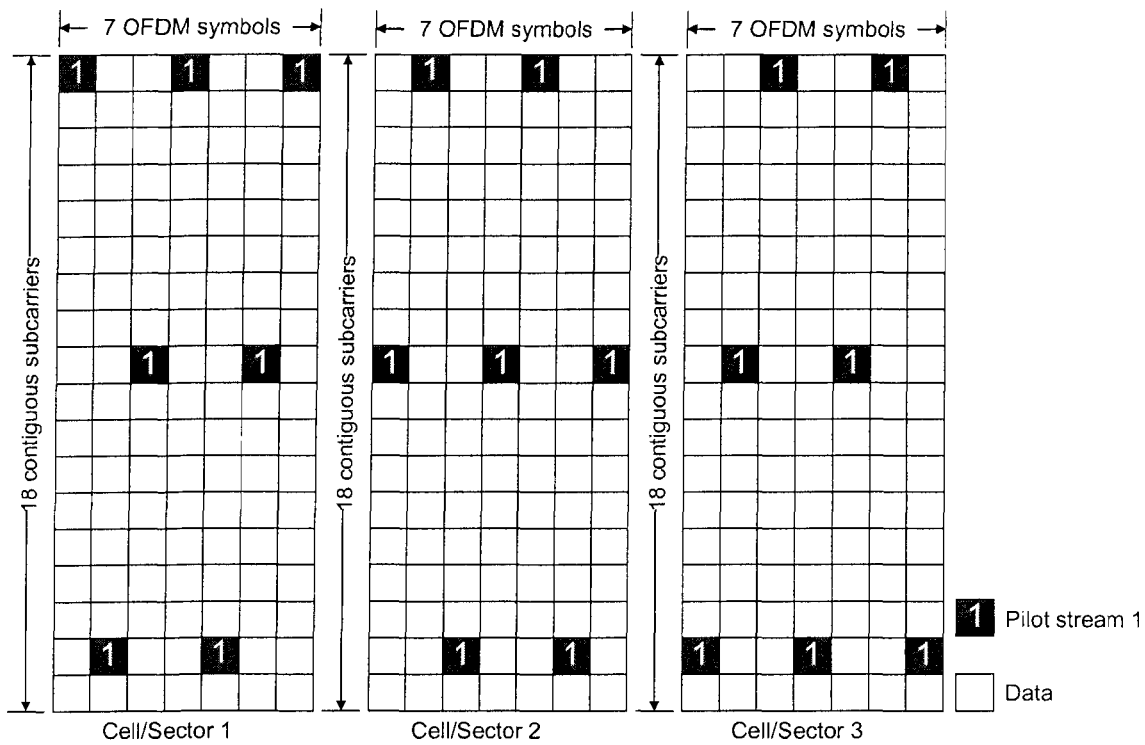
FIG. 6H illustrates another exemplary set of pilot structures consistent with embodiments of the present invention.

FIG. 6H illustrates an exemplary set of pilot structures designed for a base station or base stations using a single stream 3-sector/cell configuration for an RU size of 18×7. This set of pilot structures for cell/sector 1, cell/sector 2, and cell/sector 3 may be represented as:

$$\begin{vmatrix} 1 & 0 & 0 & 1 & 0 & 0 & 1 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 1 & 0 & 0 & 1 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 1 & 0 & 0 & 1 & 0 & 0 \\ 0 & 0 & 0 & 0 & 0 & 0 & 0 \end{vmatrix}, \begin{vmatrix} 0 & 1 & 0 & 0 & 1 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 0 & 0 & 1 & 0 & 0 & 1 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 1 & 0 & 0 & 1 & 0 \\ 0 & 0 & 0 & 0 & 0 & 0 & 0 \end{vmatrix}, \begin{vmatrix} 0 & 0 & 1 & 0 & 0 & 1 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 1 & 0 & 0 & 1 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 0 & 0 & 1 & 0 & 0 & 1 \\ 0 & 0 & 0 & 0 & 0 & 0 & 0 \end{vmatrix},$$

respectively.

All the above rules except rule 3 may be satisfied (rule 3 is partially satisfied). Rule 1 is satisfied because 6 pilots per stream within an 18×6 RU for single stream and two stream configurations. Rule 2 is satisfied because the pilot spacing in time domain is 3 OFDM symbols and the pilot spacing in frequency domain is 8 subcarriers, which can, for example, support speed mobility up to 350 km/h and a channel delay spread of no more than 5 μs. Rule 3 is partially satisfied because not all the pilots are allocated at the RU boundary in both time and frequency domains (see FIG. 6B and FIG. 6C). Rule 4 is satisfied because interlaced pilot structure is considered for different sectors/cells so that the pilot collision can be avoided. Rule 5 is satisfied because the pilot streams and pilot symbols on each of the OFDM symbols within an RU are evenly placed so that the symbol-by-symbol power fluctuation can be avoided. Rule 6 is satisfied because 6 pilot symbols per stream (antenna) are allocated so that the power fluctuation across different antennas can be avoided. Rule 7 is satisfied because the pilot structure may be generated by deleting the last time domain column (OFDM symbol) from an 18×6 RU to form a pilot structure on an 18×5 RU as shown in FIG. 6E. For an 18×7 RU, on the other hand, the pilot structure may be generated by inserting an extra column (OFDM symbol) behind an 18×6 RU by duplicating the first column on the 18×6 RU to form a pilot structure on an 18×7 RU as shown in FIG. 6F. For the single stream pilot structure, rule 7 is also satisfied (shown in FIG. 6G and FIG. 6H). Rule 8 is satisfied because the pilot symbols at the RU's boundary in frequency domain do not touch other pilot symbols of the adjacent RU in the frequency so that the IPI can be avoided. Rule 9 is satisfied because the pilot symbols on each OFDM symbol within an RU is 2 (power of 2) for 2 stream transmission. It is understood that, unless otherwise stated, this is true for all disclosed pilot structures that rules 1, 2, 6, and 9 are satisfied but rule 3 is partially satisfied.

Figure 7A:
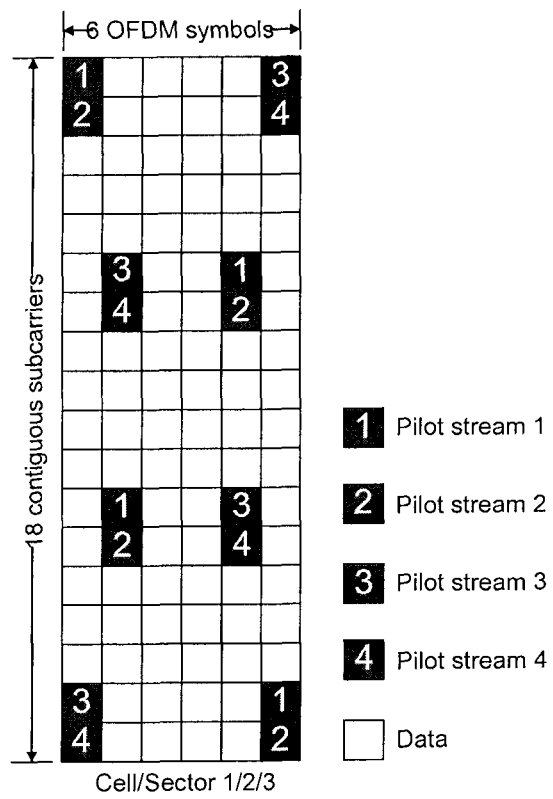
FIG. 7A illustrates an exemplary pilot structure consistent with embodiments of the present invention.
Figure 7B:
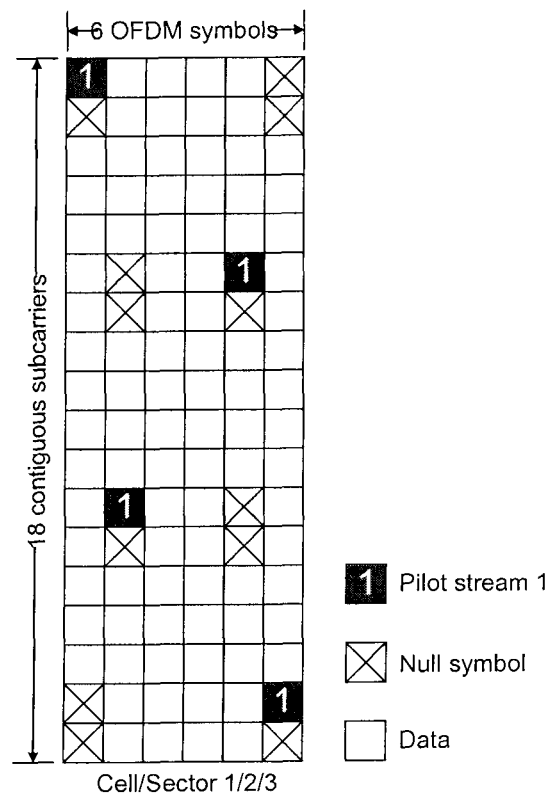
FIG. 7B illustrates another exemplary pilot structure consistent with embodiments of the present invention.
Figure 7C:
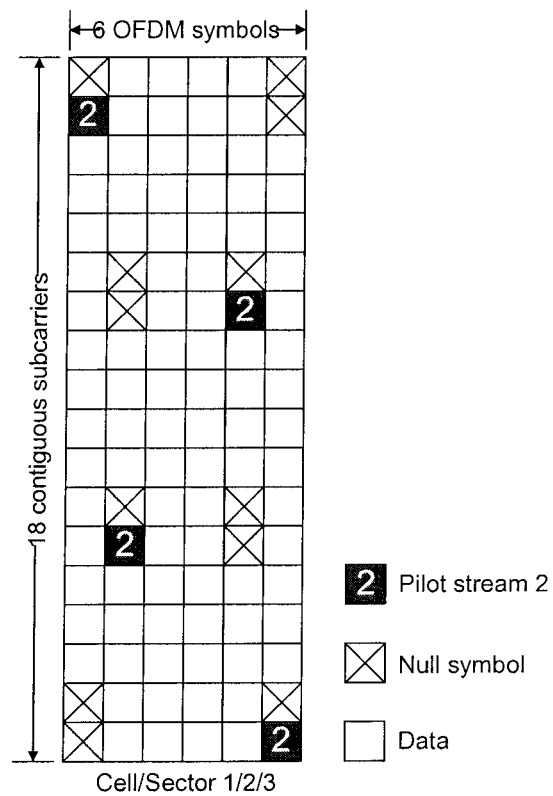
FIG. 7C illustrates another exemplary pilot structure consistent with embodiments of the present invention.
Figure 7D:
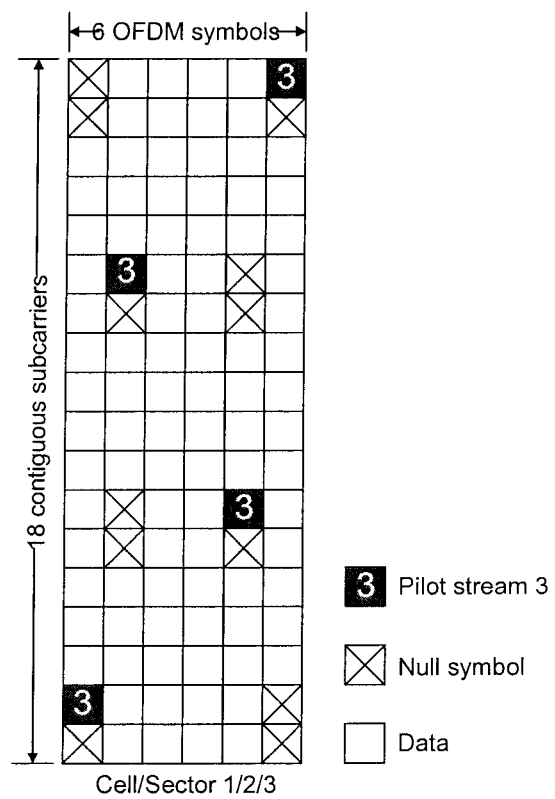
FIG. 7D illustrates another exemplary pilot structure consistent with embodiments of the present invention.
Figure 7E:
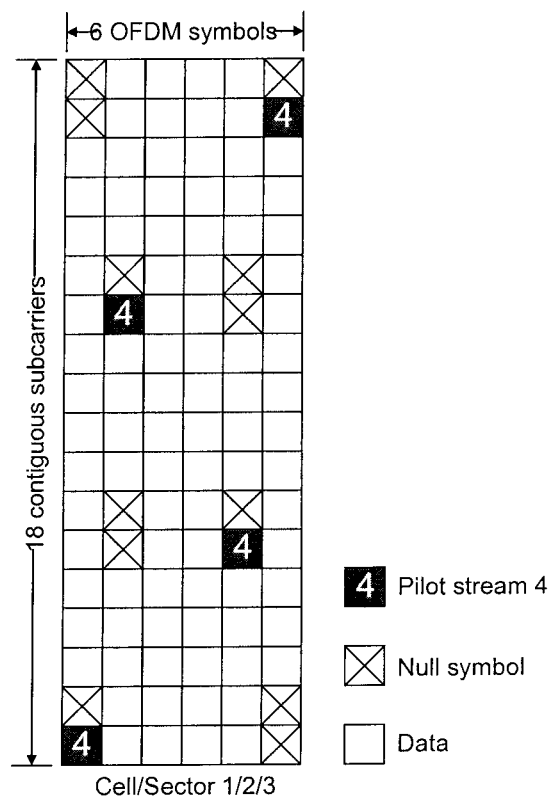
FIG. 7E illustrates another exemplary pilot structure consistent with embodiments of the present invention.
Figure 7F:
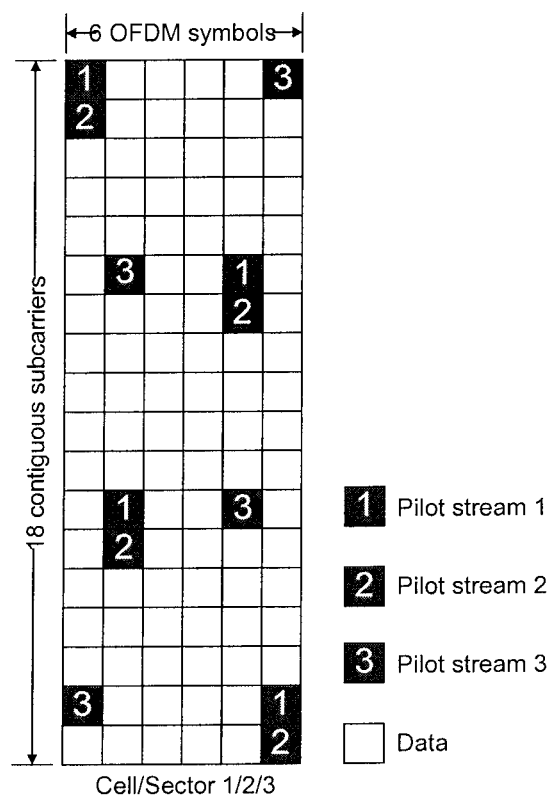
FIG. 7F illustrates another exemplary pilot structure consistent with embodiments of the present invention.
Figure 7G:
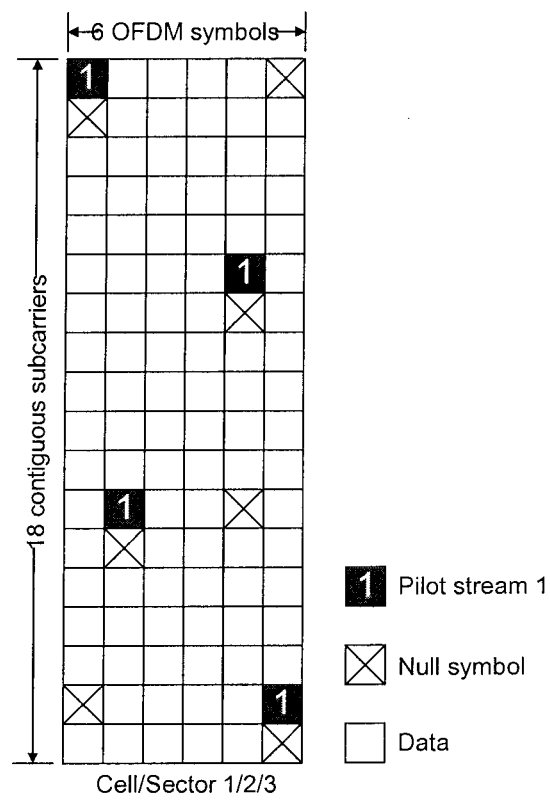
FIG. 7G illustrates another exemplary pilot structure consistent with embodiments of the present invention.
Figure 7H:
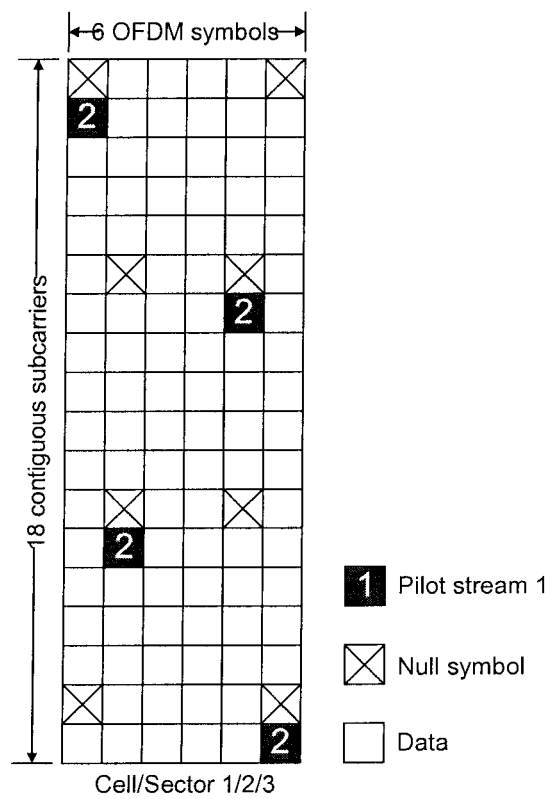
FIG. 7H illustrates another exemplary pilot structure consistent with embodiments of the present invention.
Figure 7I:
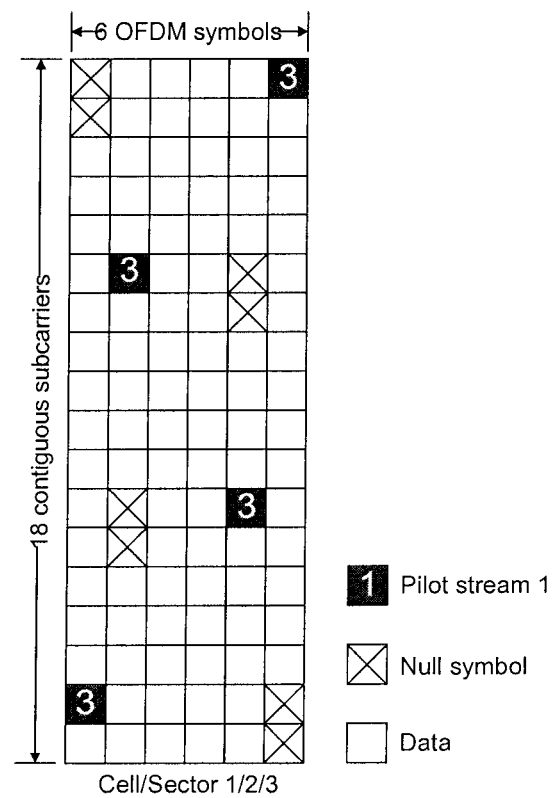
FIG. 7I illustrates another exemplary pilot structure consistent with embodiments of the present invention.
Figure 7J:
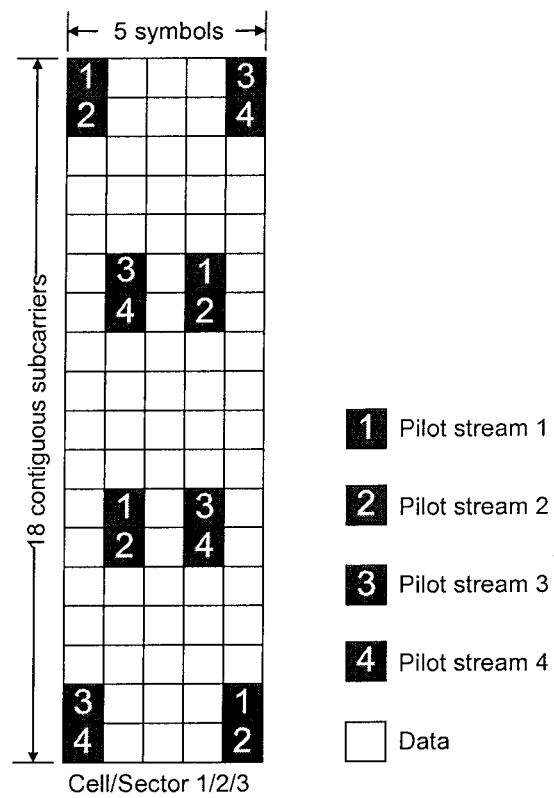
FIG. 7J illustrates another exemplary pilot structure consistent with embodiments of the present invention.
Figure 7K:
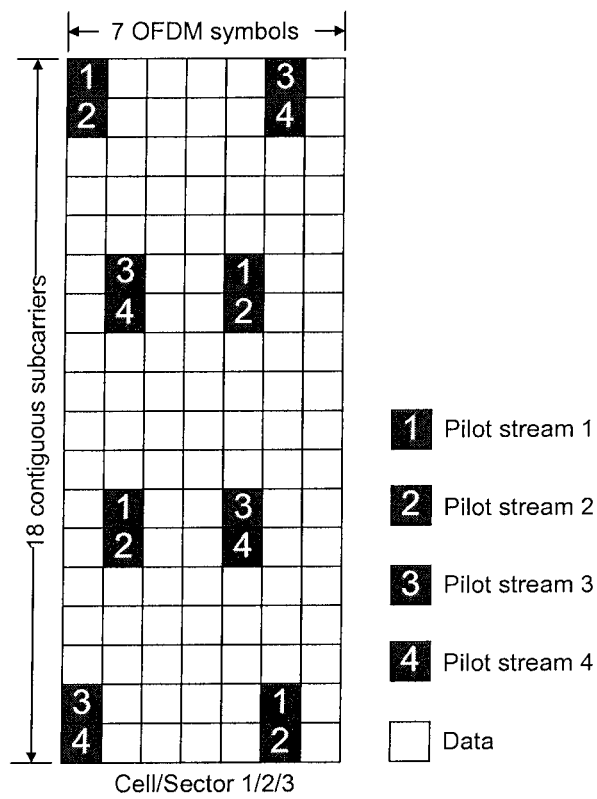
FIG. 7K illustrates another exemplary pilot structure consistent with embodiments of the present invention.
Figure 7L:
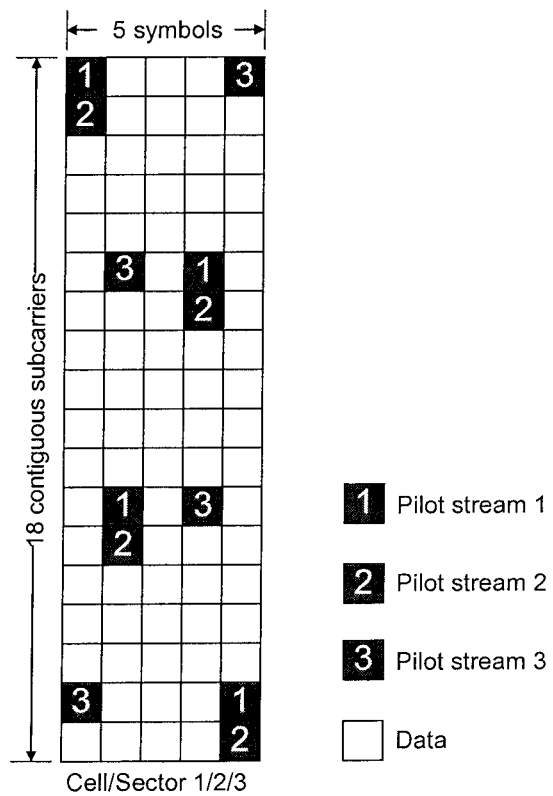
FIG. 7L illustrates another exemplary pilot structure consistent with embodiments of the present invention.
Figure 7M:
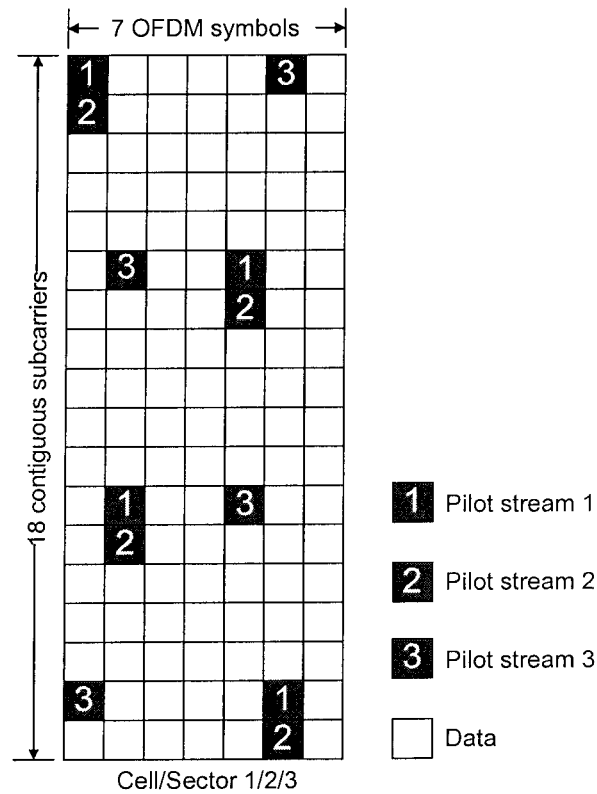
FIG. 7M illustrates another exemplary pilot structure consistent with embodiments of the present invention.

FIG. 7A and FIG. 7F illustrate multiple exemplary pilot structures designed for a base station or base stations using 4-stream and 3-stream configurations, respectively, for an RU size of 18×6. FIGS. 7B-7E illustrate the pilot structures transmitted on the $1^{st}$, $2^{nd}$, $3^{rd}$, and $4^{th}$ streams respectively for individual streams of 4-stream transmission, and FIGS. 7G-7I illustrate the pilot structures transmitted on the $1^{st}$, $2^{nd}$, and $3^{rd}$ streams respectively for individual streams of 3-stream transmission. FIG. 7J and FIG. 7L illustrate multiple exemplary pilot structures designed for a base station or base stations using 4-stream and 3-stream configurations, respectively, for an RU size of 18×5. Further, FIG. 7K and FIG. 7M illustrate multiple exemplary pilot structures designed for a base station or base stations using 4-stream and 3-stream configurations, respectively, for an RU size of 18×7.

As shown in FIG. 7A and FIG. 7F, 4-stream pilot symbols (pilot 1, pilot 2, pilot 3, and pilot 4) and 3-stream pilot symbols (pilot 1, pilot 2, and pilot 3) are respectively inserted in the 18×6 RU. Because only a single pilot structure is provided, no interlaced pilot structures are used (rule 4) for different cells/sectors. However, certain other pilot rules are satisfied. For example, rule 5 is partially satisfied because the number of pilot symbols on each OFDM symbol within an RU is substantially the same. For rule 7 in this case, it is desirable to form another pilot structures on an 18×5 RU and 18×7 RU by respectively directly deleting the center time domain column (OFDM symbol) (i.e., $3^{rd}$ or $4^{th}$ column) from an 18×6 RU as illustrated in FIG. 7J and FIG. 7L and inserting an extra time domain column (OFDM symbol) without pilot symbols within an RU behind an 18×6 RU as illustrated in FIG. 7K and FIG. 7M. Further, rule 8 is not satisfied because the staggered structure to pilot symbols located at the boundary of an RU is not considered. The pilot structures for FIGS. 7A and 7F are represented as:

$$\begin{vmatrix} 1 & 0 & 0 & 0 & 0 & 3 \\ 2 & 0 & 0 & 0 & 0 & 4 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 4 & 0 & 0 & 2 & 0 \\ 0 & 0 & 0 & 0 & 0 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 1 & 0 & 0 & 3 & 0 \\ 0 & 2 & 0 & 0 & 4 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 1 & 0 & 0 & 0 & 1 \\ 4 & 0 & 0 & 0 & 0 & 2 \end{vmatrix}, \begin{vmatrix} 1 & 0 & 0 & 0 & 1 & 3 \\ 2 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 0 & 0 & 0 & 2 & 0 \\ 0 & 0 & 0 & 0 & 0 & 0 \\ 1 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 3 & 0 \\ 0 & 2 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 0 & 0 & 0 & 0 & 1 \\ 0 & 0 & 0 & 0 & 0 & 2 \end{vmatrix},$$

respectively. Where the columns represent OFDM symbols and rows represent sub-carriers, and '1' represents pilot symbol for stream 1; '2' represents pilot symbol for stream 2, '3' represents pilot symbol for stream 3, '4' represents pilot symbol for stream 4, and '0' represents non-pilot symbol such as data symbols.

The pilot structures for FIGS. 7J and 7L are represented as:

$$\begin{vmatrix} 1 & 0 & 0 & 0 & 3 \\ 2 & 0 & 0 & 0 & 4 \\ 0 & 0 & 0 & 0 & 0 \\ 0 & 0 & 0 & 0 & 0 \\ 0 & 0 & 0 & 0 & 0 \\ 0 & 3 & 0 & 1 & 0 \\ 0 & 4 & 0 & 2 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 1 & 0 & 3 & 0 \\ 0 & 2 & 0 & 4 & 0 \\ 0 & 0 & 0 & 0 & 0 \\ 0 & 0 & 0 & 0 & 0 \\ 0 & 0 & 0 & 0 & 0 \\ 3 & 0 & 0 & 0 & 1 \\ 4 & 0 & 0 & 0 & 2 \end{vmatrix}, \begin{vmatrix} 1 & 0 & 0 & 0 & 3 \\ 2 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 3 & 0 & 1 & 0 \\ 0 & 0 & 0 & 2 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 1 & 0 & 3 & 0 \\ 0 & 2 & 0 & 0 & 0 \\ 0 & 0 & 0 & 0 & 0 \\ 0 & 0 & 0 & 0 & 0 \\ 0 & 0 & 0 & 0 & 0 \\ 3 & 0 & 0 & 0 & 1 \\ 0 & 0 & 0 & 0 & 2 \end{vmatrix},$$

respectively.

pilot structures for FIGS. 7K and 7M are represented as:

$$\begin{vmatrix} 1 & 0 & 0 & 0 & 3 & 0 \\ 2 & 0 & 0 & 0 & 4 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 4 & 0 & 0 & 2 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 3 & 0 \\ 0 & 2 & 0 & 0 & 4 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 0 & 0 & 0 & 0 & 1 \\ 4 & 0 & 0 & 0 & 0 & 2 \end{vmatrix}, \begin{vmatrix} 1 & 0 & 0 & 0 & 3 & 0 \\ 2 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 0 & 0 & 0 & 2 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 3 & 0 \\ 0 & 2 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 0 & 0 & 0 & 0 & 1 \\ 0 & 0 & 0 & 0 & 0 & 2 \end{vmatrix},$$

respectively.

Figure 8A:
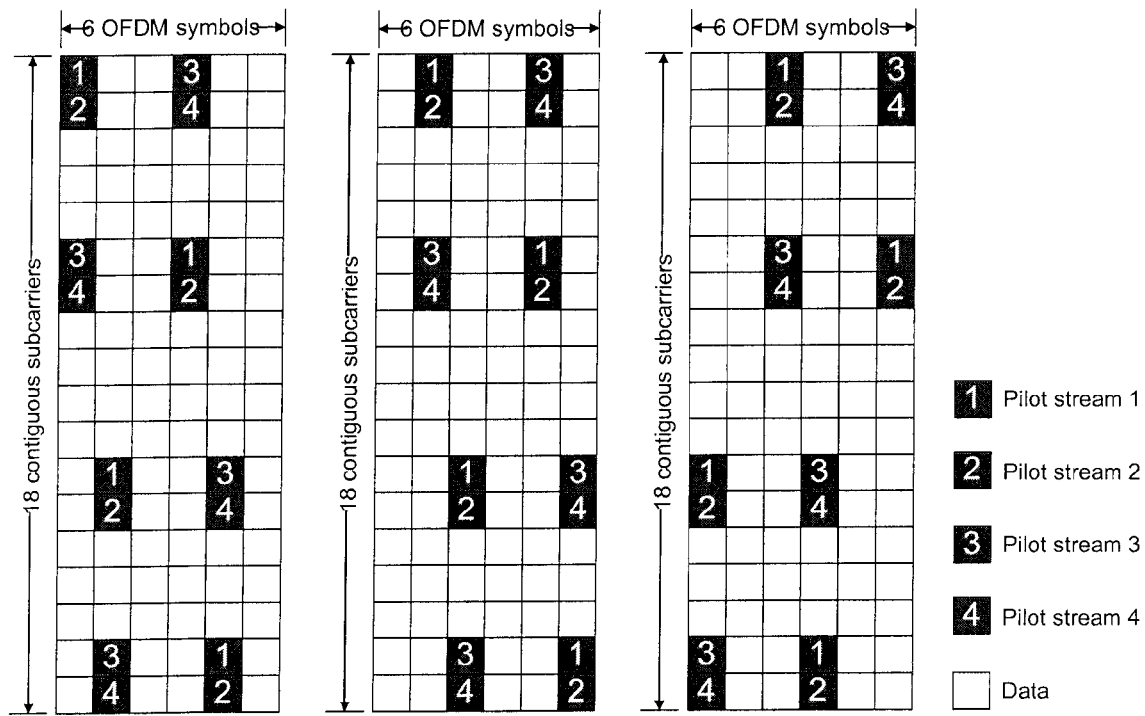
FIG. 8A illustrates an exemplary set of pilot structures consistent with embodiments of the present invention.
Figure 8B:
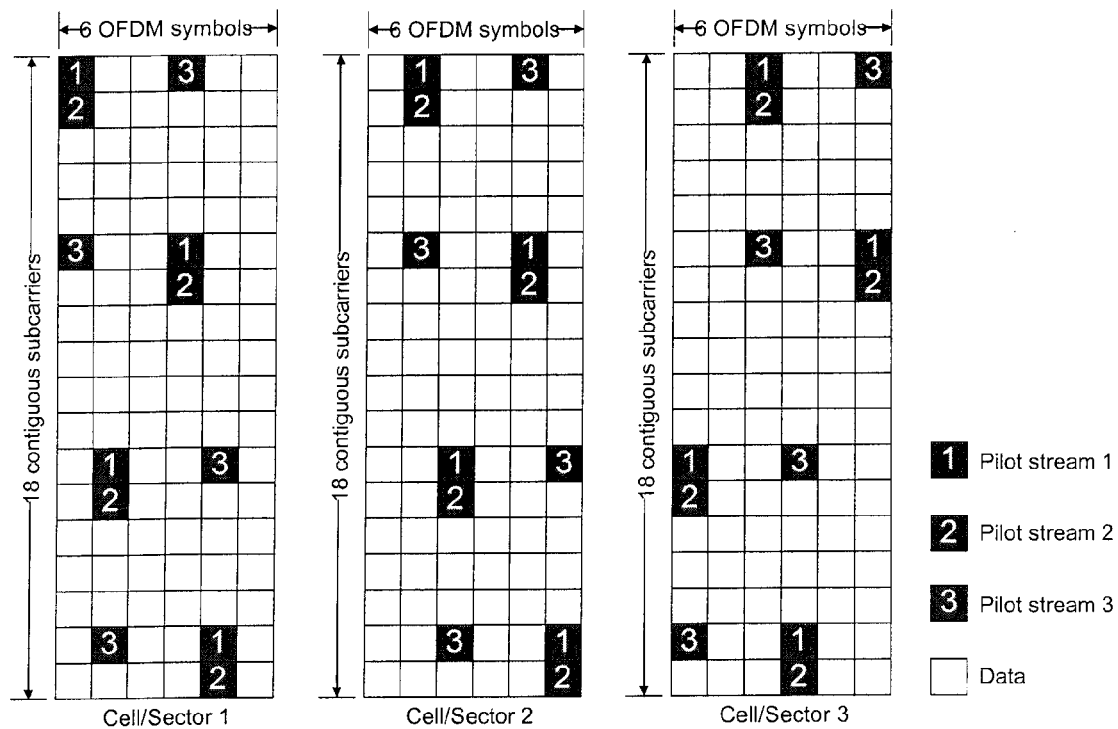
FIG. 8B illustrates another exemplary set of pilot structures consistent with embodiments of the present invention.

FIG. 8A and FIG. 8B illustrate other exemplary sets of pilot structures designed for a base station or base stations using 4-stream 3 sector/cell and 3-stream 3 sector/cell configurations, respectively, for an RU size of 18×6. As shown in FIG. 8A and FIG. 8B, 4-stream pilot symbols (pilot 1, pilot 2, pilot 3, and pilot 4) and 3-stream pilot symbols (pilot 1, pilot 2, and pilot 3) are respectively inserted in the 18×6 RU. Rule 4 is satisfied because the pilot structures are interlaced for different sectors/cells. Rule 5 is partially satisfied because the number of pilot symbols on each OFDM symbol within an RU is substantially the same. Further, rule 8 is satisfied because the IPI in the overlapped region is avoided.

The pilot structures for cell/sector 1, cell/sector 2, and cell/sector 3 in FIG. 8A can represented as:

$$\begin{vmatrix} 1 & 0 & 0 & 3 & 0 & 0 \\ 2 & 0 & 0 & 4 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 0 & 0 & 1 & 0 & 0 \\ 4 & 0 & 0 & 2 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 3 & 0 \\ 0 & 2 & 0 & 0 & 4 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 4 & 0 & 0 & 2 & 0 \end{vmatrix}, \begin{vmatrix} 0 & 1 & 0 & 0 & 3 & 0 \\ 0 & 2 & 0 & 0 & 4 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 4 & 0 & 0 & 2 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 3 \\ 0 & 0 & 2 & 0 & 0 & 4 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 3 & 0 & 0 & 1 \\ 0 & 0 & 4 & 0 & 0 & 2 \end{vmatrix}, \begin{vmatrix} 0 & 0 & 1 & 0 & 0 & 3 \\ 0 & 0 & 2 & 0 & 0 & 4 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 3 & 0 & 0 & 1 \\ 0 & 0 & 4 & 0 & 0 & 2 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & 0 & 0 & 0 & 0 \\ 2 & 0 & 0 & 3 & 0 & 0 \\ 0 & 0 & 0 & 4 & 0 & 0 \\ 0 & 0 & 0 & 0 & 0 & 0 \\ 0 & 0 & 0 & 0 & 0 & 0 \\ 3 & 0 & 0 & 1 & 0 & 0 \\ 0 & 4 & 0 & 2 & 0 & 0 \end{vmatrix},$$

respectively.

Figure 9A:
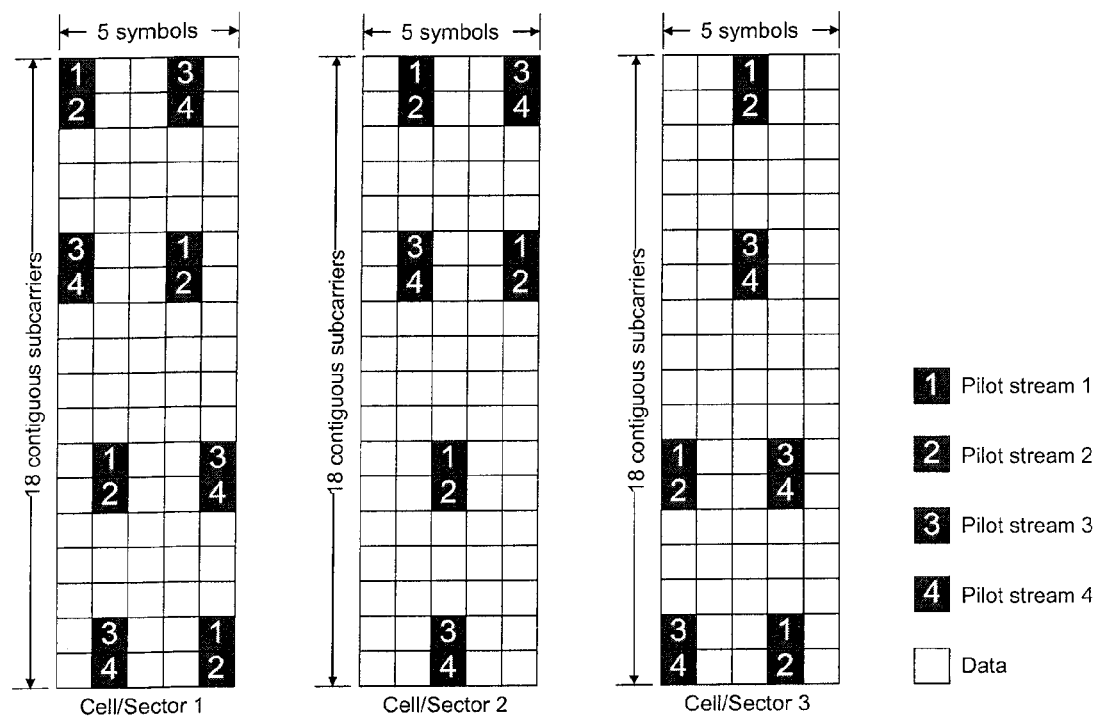
FIG. 9A illustrates another exemplary set of pilot structures consistent with embodiments of the present invention.
Figure 9B:
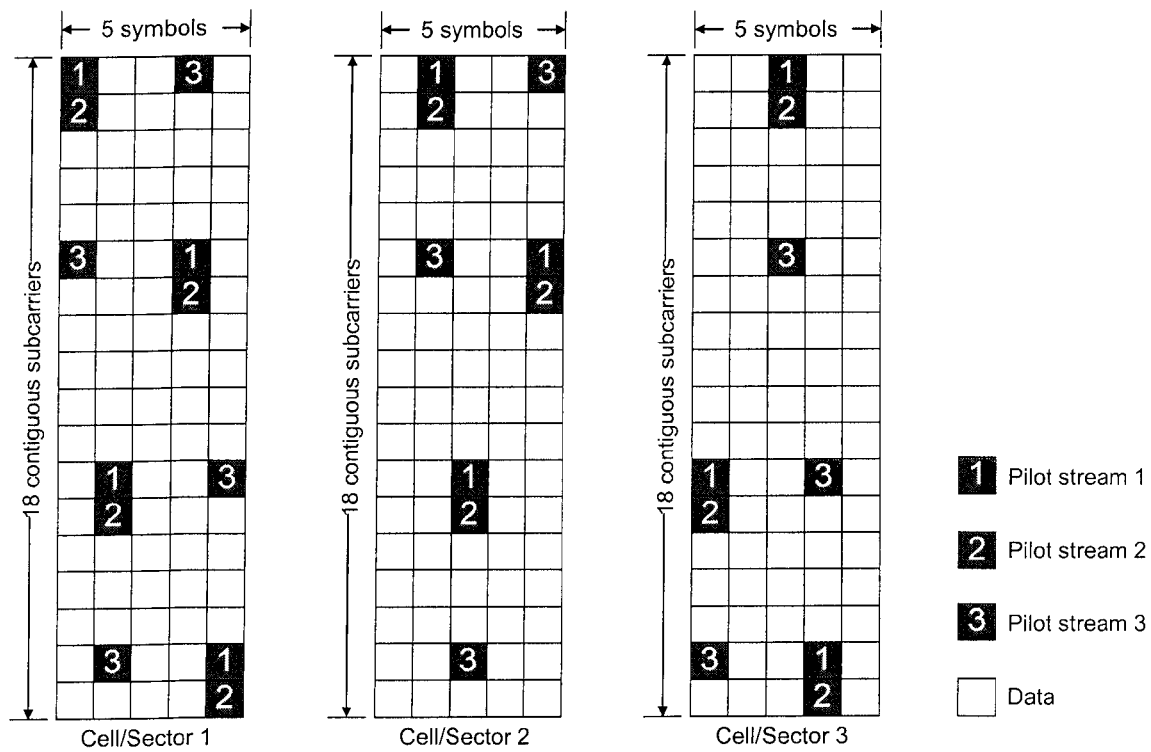
FIG. 9B illustrates another exemplary set of pilot structures consistent with embodiments of the present invention.

FIG. 9A and FIG. 9B illustrate other exemplary sets of pilot structures designed for a base station or base stations using 4-stream 3 sector/cell and 3-stream 3 sector/cell configurations, respectively, for an RU size of 18×5. As shown in FIG. 9A and FIG. 9B, 4-stream pilot symbols (pilot 1, pilot 2, pilot 3, and pilot 4) and 3-stream pilot symbol (pilot 1, pilot 2, and pilot 3) are respectively inserted in the 18×5 RU. Rule 4 is satisfied because the pilot structures are interlaced for different sectors/cells. Rule 5 is partially satisfied because the number of pilot symbols on each OFDM symbol within an RU is substantially the same. Rule 7 is satisfied because the pilot structure may be generated by deleting the last time domain column (OFDM symbol) from a regular RU (18×6) to form another pilot structure on an irregular RU (18×5). Further, rule 8 is satisfied because the IPI in the overlapped region is avoided. It is understood that the pilot overhead may be substantially different in different cells/sectors leading to an essential bias on the accuracy of channel estimation in different cells/sectors.

The pilot structures for cell/sector 1, cell/sector 2, and cell/sector 3 in FIG. 9A can represented as:

$$\begin{vmatrix} 1 & 0 & 0 & 3 & 0 \\ 2 & 0 & 0 & 4 & 0 \\ 0 & 0 & 0 & 0 & 0 \\ 0 & 0 & 0 & 0 & 0 \\ 0 & 0 & 0 & 0 & 0 \\ 3 & 0 & 0 & 1 & 0 \\ 4 & 0 & 0 & 2 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 1 & 0 & 0 & 3 \\ 0 & 2 & 0 & 0 & 4 \\ 0 & 0 & 0 & 0 & 0 \\ 0 & 0 & 0 & 0 & 0 \\ 0 & 0 & 0 & 0 & 0 \\ 0 & 3 & 0 & 0 & 1 \\ 0 & 4 & 0 & 0 & 2 \end{vmatrix} \begin{vmatrix} 0 & 1 & 0 & 0 & 3 \\ 0 & 2 & 0 & 0 & 4 \\ 0 & 0 & 0 & 0 & 0 \\ 0 & 0 & 0 & 0 & 0 \\ 0 & 0 & 0 & 0 & 0 \\ 0 & 3 & 0 & 0 & 1 \\ 0 & 4 & 0 & 0 & 2 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 1 & 0 & 0 \\ 0 & 0 & 2 & 0 & 0 \\ 0 & 0 & 0 & 0 & 0 \\ 0 & 0 & 0 & 0 & 0 \\ 0 & 0 & 0 & 0 & 0 \\ 0 & 0 & 3 & 0 & 0 \\ 0 & 0 & 4 & 0 & 0 \end{vmatrix} \begin{vmatrix} 0 & 0 & 1 & 0 & 0 \\ 0 & 0 & 2 & 0 & 0 \\ 0 & 0 & 0 & 0 & 0 \\ 0 & 0 & 0 & 0 & 0 \\ 0 & 0 & 0 & 0 & 0 \\ 0 & 0 & 3 & 0 & 0 \\ 0 & 0 & 4 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 1 & 0 & 0 & 3 & 0 \\ 2 & 0 & 0 & 4 & 0 \\ 0 & 0 & 0 & 0 & 0 \\ 0 & 0 & 0 & 0 & 0 \\ 0 & 0 & 0 & 0 & 0 \\ 3 & 0 & 0 & 1 & 0 \\ 4 & 0 & 0 & 2 & 0 \end{vmatrix},$$

respectively.

The pilot structures for cell/sector 1, cell/sector 2, and cell/sector 3 in FIG. 9B can represented as:

$$\begin{vmatrix} 1 & 0 & 0 & 3 & 0 \\ 2 & 0 & 0 & 0 & 0 \\ 0 & 0 & 0 & 0 & 0 \\ 0 & 0 & 0 & 0 & 0 \\ 0 & 0 & 0 & 0 & 0 \\ 3 & 0 & 0 & 1 & 0 \\ 0 & 0 & 0 & 2 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 1 & 0 & 0 & 3 \\ 0 & 2 & 0 & 0 & 0 \\ 0 & 0 & 0 & 0 & 0 \\ 0 & 0 & 0 & 0 & 0 \\ 0 & 0 & 0 & 0 & 0 \\ 0 & 3 & 0 & 0 & 1 \\ 0 & 0 & 0 & 0 & 2 \end{vmatrix} \begin{vmatrix} 0 & 1 & 0 & 0 & 3 \\ 0 & 2 & 0 & 0 & 0 \\ 0 & 0 & 0 & 0 & 0 \\ 0 & 0 & 0 & 0 & 0 \\ 0 & 0 & 0 & 0 & 0 \\ 0 & 3 & 0 & 0 & 1 \\ 0 & 0 & 0 & 0 & 2 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 1 & 0 & 0 \\ 0 & 0 & 2 & 0 & 0 \\ 0 & 0 & 0 & 0 & 0 \\ 0 & 0 & 0 & 0 & 0 \\ 0 & 0 & 0 & 0 & 0 \\ 0 & 0 & 3 & 0 & 0 \\ 0 & 0 & 0 & 0 & 0 \end{vmatrix} \begin{vmatrix} 0 & 0 & 1 & 0 & 0 \\ 0 & 0 & 2 & 0 & 0 \\ 0 & 0 & 0 & 0 & 0 \\ 0 & 0 & 0 & 0 & 0 \\ 0 & 0 & 0 & 0 & 0 \\ 0 & 0 & 3 & 1 & 0 \\ 0 & 0 & 0 & 2 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 1 & 0 & 0 & 3 & 0 \\ 2 & 0 & 0 & 0 & 0 \\ 0 & 0 & 0 & 0 & 0 \\ 0 & 0 & 0 & 0 & 0 \\ 0 & 0 & 0 & 0 & 0 \\ 3 & 0 & 0 & 1 & 0 \\ 0 & 0 & 0 & 2 & 0 \end{vmatrix},$$

respectively.

Figure 10A:
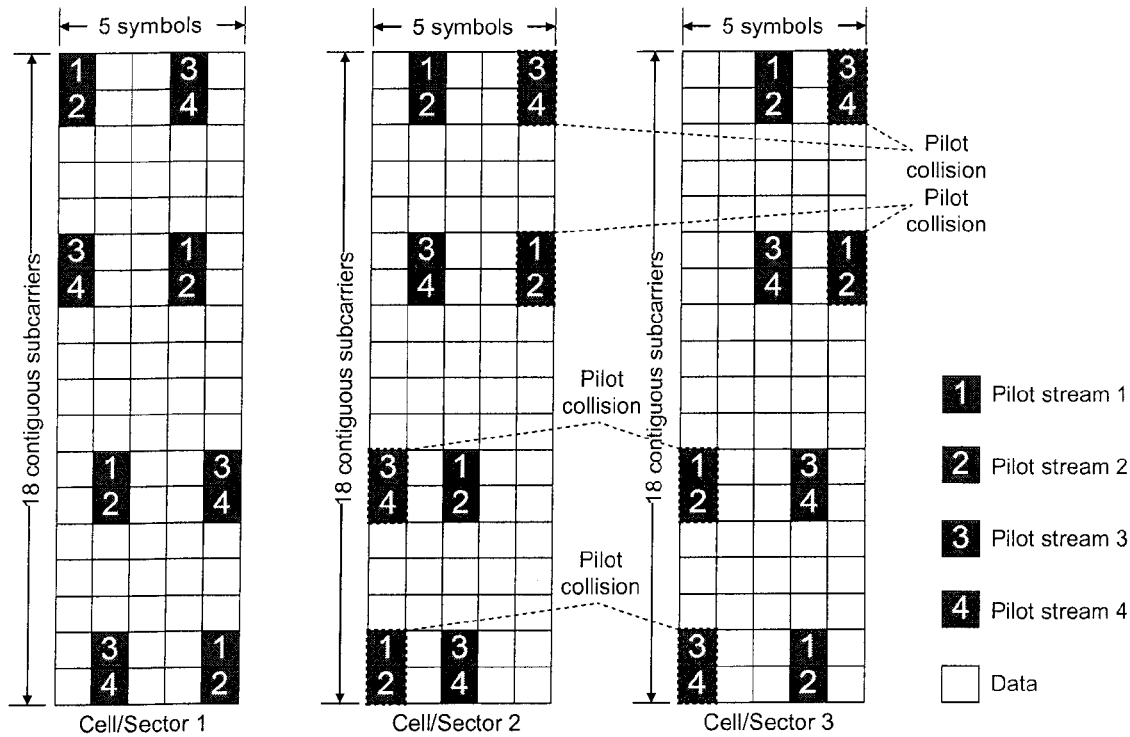
FIG. 10A illustrates another exemplary set of pilot structures consistent with embodiments of the present invention.
Figure 10B:
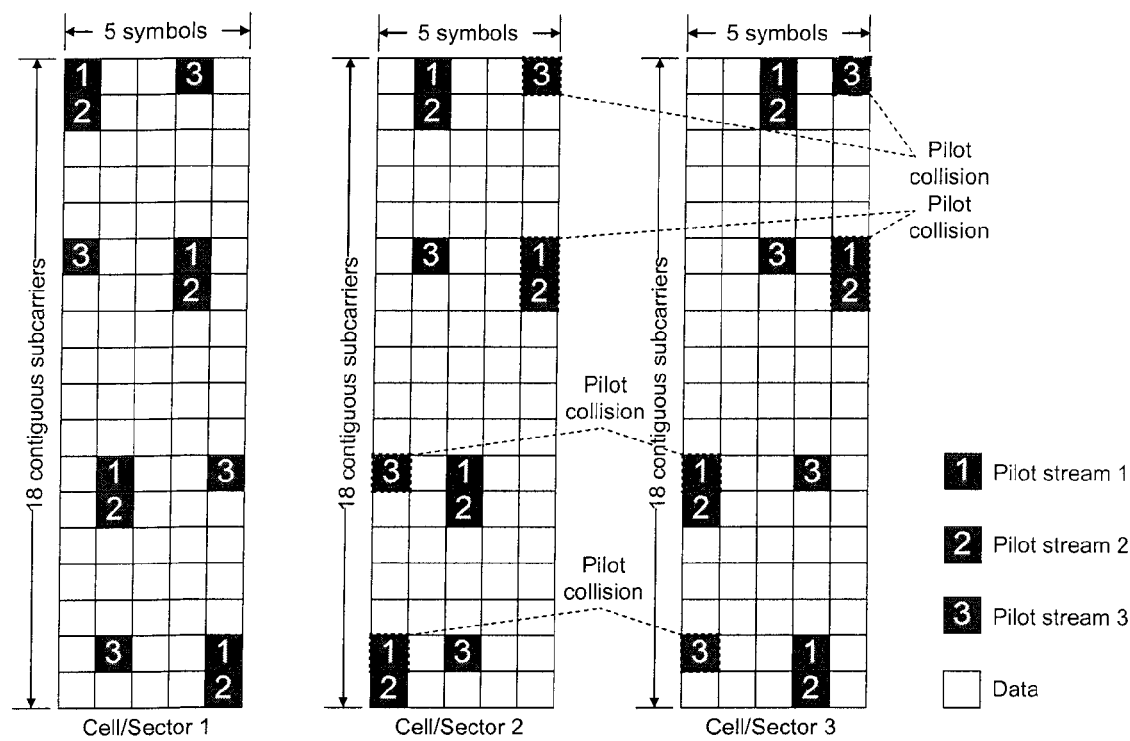
FIG. 10B illustrates another exemplary set of pilot structures consistent with embodiments of the present invention.

FIG. 10A and FIG. 10B illustrate other exemplary sets of pilot structures designed for a base station or base stations using 4-stream 3 sector/cell and 3-stream 3 sector/cell configurations, respectively, for an RU size of 18×5. As shown in FIG. 10A and FIG. 10B, 4-stream pilot symbols (pilot 1, pilot 2, pilot 3, and pilot 4) and 3-stream pilot symbols (pilot 1, pilot 2, and pilot 3) are respectively inserted in the 18×5 RU. Rule 4 is partially satisfied because pilot collision occurs on some of pilot symbols for different sectors/cells due to extra pilot symbols inserted in sectors/cells 2 (lower-left corner) and 3 (top-right corner). Further, rule 5 is partially satisfied because the number of pilot symbols on each OFDM symbol within an RU is substantially the same. Rule 7 is satisfied because the pilot structure may be generated by deleting the last time domain column (OFDM symbol) from a regular RU (18×6) to form another pilot structure on an irregular RU (18×5). Also, rule 8 is satisfied because the IPI in the overlapped region is avoided.

The pilot structures for cell/sector 1, cell/sector 2, and cell/sector 3 in FIG. 10A can represented as:

$$\begin{vmatrix} 1 & 0 & 0 & 3 & 0 \\ 2 & 0 & 0 & 4 & 0 \\ 0 & 0 & 0 & 0 & 0 \\ 0 & 0 & 0 & 0 & 0 \\ 0 & 0 & 0 & 0 & 0 \\ 3 & 0 & 0 & 1 & 0 \\ 4 & 0 & 0 & 2 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 1 & 0 & 0 & 3 \\ 0 & 2 & 0 & 0 & 4 \\ 0 & 0 & 0 & 0 & 0 \\ 0 & 0 & 0 & 0 & 0 \\ 0 & 0 & 0 & 0 & 0 \\ 0 & 3 & 0 & 0 & 1 \\ 0 & 4 & 0 & 0 & 2 \end{vmatrix} \begin{vmatrix} 0 & 1 & 0 & 0 & 3 \\ 0 & 2 & 0 & 0 & 4 \\ 0 & 0 & 0 & 0 & 0 \\ 0 & 0 & 0 & 0 & 0 \\ 0 & 0 & 0 & 0 & 0 \\ 0 & 3 & 0 & 0 & 1 \\ 0 & 4 & 0 & 0 & 2 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 3 & 0 & 1 & 0 & 0 \\ 4 & 0 & 2 & 0 & 0 \\ 0 & 0 & 0 & 0 & 0 \\ 0 & 0 & 0 & 0 & 0 \\ 0 & 0 & 0 & 0 & 0 \\ 1 & 0 & 3 & 0 & 0 \\ 2 & 0 & 4 & 0 & 0 \end{vmatrix} \begin{vmatrix} 0 & 0 & 1 & 0 & 3 \\ 0 & 0 & 2 & 0 & 4 \\ 0 & 0 & 0 & 0 & 0 \\ 0 & 0 & 0 & 0 & 0 \\ 0 & 0 & 0 & 0 & 0 \\ 0 & 0 & 3 & 0 & 1 \\ 0 & 0 & 4 & 0 & 2 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 1 & 0 & 0 & 3 & 0 \\ 2 & 0 & 0 & 4 & 0 \\ 0 & 0 & 0 & 0 & 0 \\ 0 & 0 & 0 & 0 & 0 \\ 0 & 0 & 0 & 0 & 0 \\ 3 & 0 & 0 & 1 & 0 \\ 4 & 0 & 0 & 2 & 0 \end{vmatrix},$$

respectively.

The pilot structures for cell/sector 1, cell/sector 2, and cell/sector 3 in FIG. 10B can represented as:

$$\begin{vmatrix} 1 & 0 & 0 & 3 & 0 \\ 2 & 0 & 0 & 0 & 0 \\ 0 & 0 & 0 & 0 & 0 \\ 0 & 0 & 0 & 0 & 0 \\ 0 & 0 & 0 & 0 & 0 \\ 3 & 0 & 0 & 1 & 0 \\ 0 & 0 & 0 & 2 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 1 & 0 & 0 & 3 \\ 0 & 2 & 0 & 0 & 0 \\ 0 & 0 & 0 & 0 & 0 \\ 0 & 0 & 0 & 0 & 0 \\ 0 & 0 & 0 & 0 & 0 \\ 0 & 3 & 0 & 0 & 1 \\ 0 & 0 & 0 & 0 & 2 \end{vmatrix} \begin{vmatrix} 0 & 1 & 0 & 0 & 3 \\ 0 & 2 & 0 & 0 & 0 \\ 0 & 0 & 0 & 0 & 0 \\ 0 & 0 & 0 & 0 & 0 \\ 0 & 0 & 0 & 0 & 0 \\ 0 & 3 & 0 & 0 & 1 \\ 0 & 0 & 0 & 0 & 2 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 3 & 0 & 1 & 0 & 0 \\ 0 & 0 & 2 & 0 & 0 \\ 0 & 0 & 0 & 0 & 0 \\ 0 & 0 & 0 & 0 & 0 \\ 0 & 0 & 0 & 0 & 0 \\ 1 & 0 & 3 & 0 & 0 \\ 2 & 0 & 0 & 0 & 0 \end{vmatrix} \begin{vmatrix} 0 & 0 & 1 & 0 & 3 \\ 0 & 0 & 2 & 0 & 0 \\ 0 & 0 & 0 & 0 & 0 \\ 0 & 0 & 0 & 0 & 0 \\ 0 & 0 & 0 & 0 & 0 \\ 0 & 0 & 3 & 0 & 1 \\ 0 & 0 & 0 & 0 & 2 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 1 & 0 & 0 & 3 & 0 \\ 2 & 0 & 0 & 0 & 0 \\ 0 & 0 & 0 & 0 & 0 \\ 0 & 0 & 0 & 0 & 0 \\ 0 & 0 & 0 & 0 & 0 \\ 3 & 0 & 0 & 1 & 0 \\ 0 & 0 & 0 & 2 & 0 \end{vmatrix},$$

respectively.

Figure 11A:
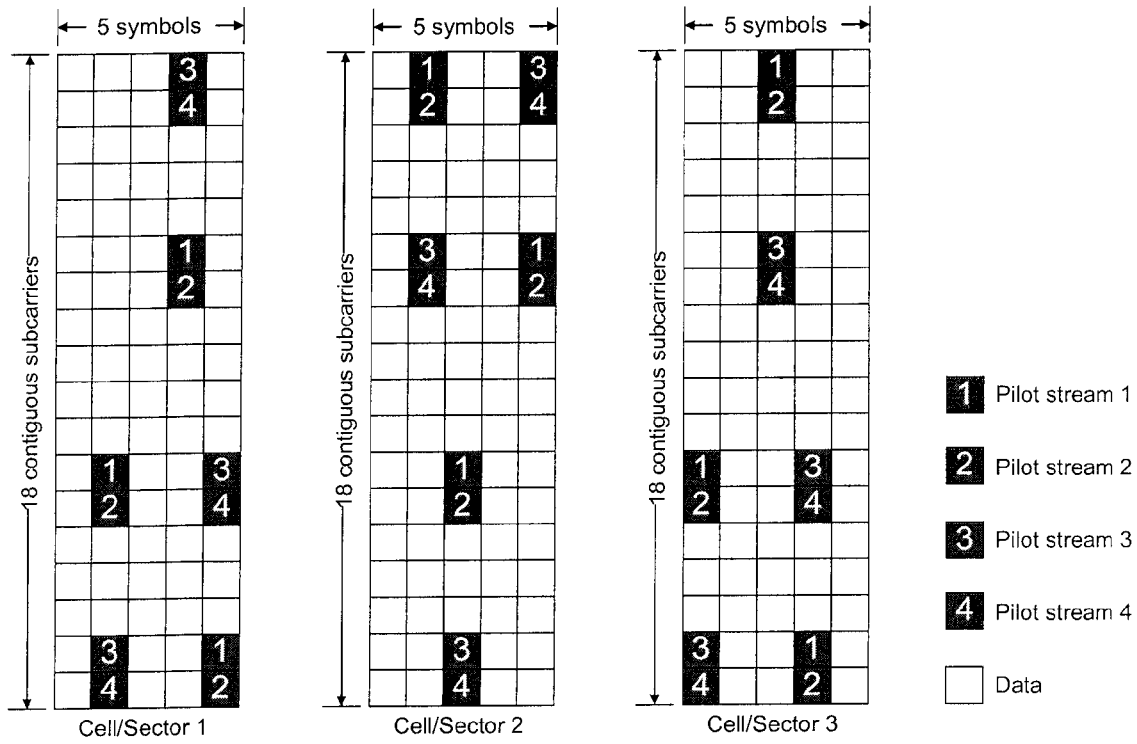
FIG. 11A illustrates another exemplary set of pilot structures consistent with embodiments of the present invention.
Figure 11B:
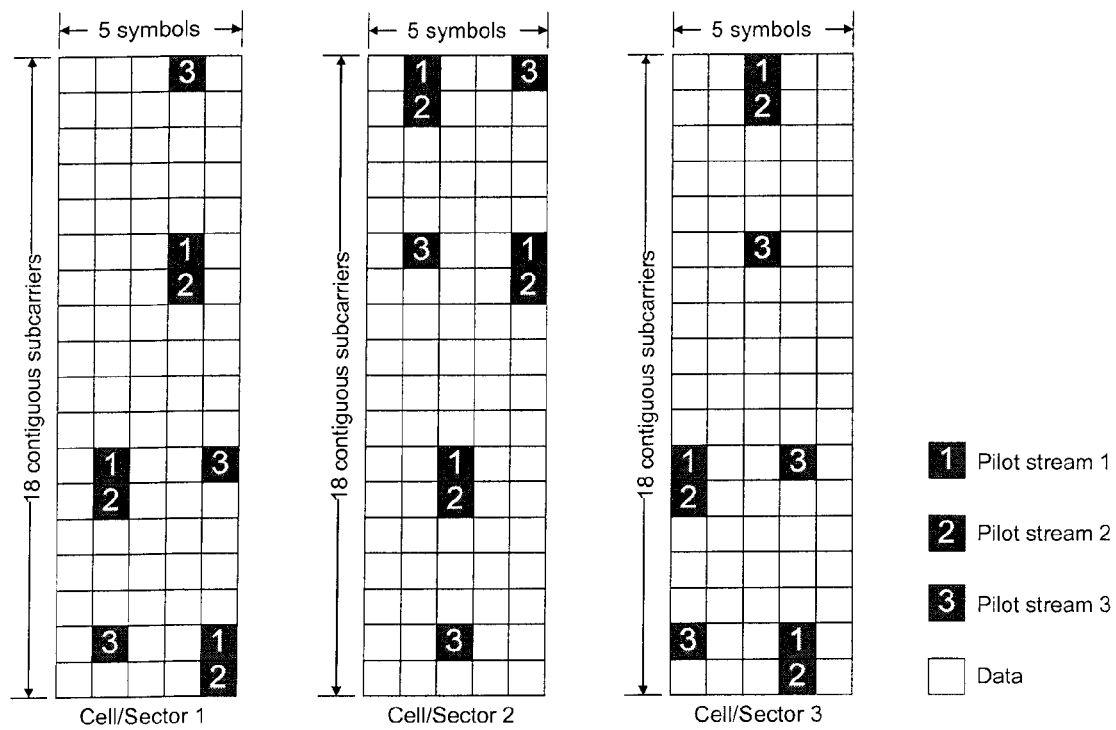
FIG. 11B illustrates another exemplary set of pilot structures consistent with embodiments of the present invention.

FIG. 11A and FIG. 11B illustrate other exemplary sets of pilot structures designed for a base station or base stations using 4-stream 3 sector/cell and 3-stream 3 sector/cell configurations, respectively, for an RU size of 18×5. As shown in FIG. 11A and FIG. 11B, 4-stream pilot symbols (pilot 1, pilot 2, pilot 3, and pilot 4) and 3-stream pilot symbols (pilot 1, pilot 2, and pilot 3) are respectively inserted in the 18×5 RU.

Comparing the configurations shown in FIG. 9A (and FIG. 9B) and FIG. 11A (and FIG. 11B), the pilot structures shown in FIG. 11A (and FIG. 11B) is similar to these shown in FIG. 9A (and FIG. 9B), except that the pilot symbols in the first column (OFDM symbol) with an RU in sector/cell 1 from FIG. 9A (and FIG. 9B) are removed from FIG. 11A (and FIG. 11B). Thus all properties possessed by FIG. 9A (and FIG. 9B) may also be possessed by FIG. 11A (and FIG. 11B). Further, the pilot overhead in the pilot structures shown in FIG. 11A (and FIG. 11B) is the same in all cells/sectors.

The pilot structures for cell/sector 1, cell/sector 2, and cell/sector 3 in FIG. 11A can represented as:

$$\begin{vmatrix} 0&0&0&3&0 \\ 0&0&0&4&0 \\ 0&0&0&0&0 \\ 0&0&0&0&0 \\ 0&0&0&0&0 \\ 0&0&0&1&0 \\ 0&0&0&2&0 \\ 0&0&0&0&0 \\ 0&0&0&0&0 \\ 0&0&0&0&0 \\ 0&0&0&0&0 \\ 0&1&0&0&3 \\ 0&2&0&0&4 \\ 0&0&0&0&0 \\ 0&0&0&0&0 \\ 0&0&0&0&0 \\ 0&3&0&0&1 \\ 0&4&0&0&2 \end{vmatrix} \begin{vmatrix} 0&1&0&0&3 \\ 0&2&0&0&4 \\ 0&0&0&0&0 \\ 0&0&0&0&0 \\ 0&0&0&0&0 \\ 0&3&0&0&1 \\ 0&4&0&0&2 \\ 0&0&0&0&0 \\ 0&0&0&0&0 \\ 0&0&0&0&0 \\ 0&0&0&0&0 \\ 0&0&1&0&0 \\ 0&0&2&0&0 \\ 0&0&0&0&0 \\ 0&0&0&0&0 \\ 0&0&0&0&0 \\ 0&0&3&0&0 \\ 0&0&4&0&0 \end{vmatrix} \begin{vmatrix} 0&0&1&0&0 \\ 0&0&2&0&0 \\ 0&0&0&0&0 \\ 0&0&0&0&0 \\ 0&0&0&0&0 \\ 0&0&3&0&0 \\ 0&0&4&0&0 \\ 0&0&0&0&0 \\ 0&0&0&0&0 \\ 0&0&0&0&0 \\ 0&0&0&0&0 \\ 1&0&0&3&0 \\ 2&0&0&4&0 \\ 0&0&0&0&0 \\ 0&0&0&0&0 \\ 0&0&0&0&0 \\ 3&0&0&1&0 \\ 4&0&0&2&0 \end{vmatrix},$$

respectively.

The pilot structures for cell/sector 1, cell/sector 2, and cell/sector 3 in FIG. 11B can represented as:

$$\begin{vmatrix} 0&0&0&3&0 \\ 0&0&0&0&0 \\ 0&0&0&0&0 \\ 0&0&0&0&0 \\ 0&0&0&0&0 \\ 0&0&0&1&0 \\ 0&0&0&2&0 \\ 0&0&0&0&0 \\ 0&0&0&0&0 \\ 0&0&0&0&0 \\ 0&0&0&0&0 \\ 0&1&0&0&3 \\ 0&2&0&0&0 \\ 0&0&0&0&0 \\ 0&0&0&0&0 \\ 0&0&0&0&0 \\ 0&3&0&0&1 \\ 0&0&0&0&2 \end{vmatrix} \begin{vmatrix} 0&1&0&0&3 \\ 0&2&0&0&0 \\ 0&0&0&0&0 \\ 0&0&0&0&0 \\ 0&0&0&0&0 \\ 0&3&0&0&1 \\ 0&0&0&0&2 \\ 0&0&0&0&0 \\ 0&0&0&0&0 \\ 0&0&0&0&0 \\ 0&0&0&0&0 \\ 0&0&1&0&0 \\ 0&0&2&0&0 \\ 0&0&0&0&0 \\ 0&0&0&0&0 \\ 0&0&0&0&0 \\ 0&0&3&0&0 \\ 0&0&0&0&0 \end{vmatrix} \begin{vmatrix} 0&0&1&0&0 \\ 0&0&2&0&0 \\ 0&0&0&0&0 \\ 0&0&0&0&0 \\ 0&0&0&0&0 \\ 0&0&3&0&0 \\ 0&0&0&0&0 \\ 0&0&0&0&0 \\ 0&0&0&0&0 \\ 0&0&0&0&0 \\ 0&0&0&0&0 \\ 1&0&0&3&0 \\ 2&0&0&0&0 \\ 0&0&0&0&0 \\ 0&0&0&0&0 \\ 0&0&0&0&0 \\ 3&0&0&1&0 \\ 0&0&0&2&0 \end{vmatrix},$$

respectively.

Figure 12A:
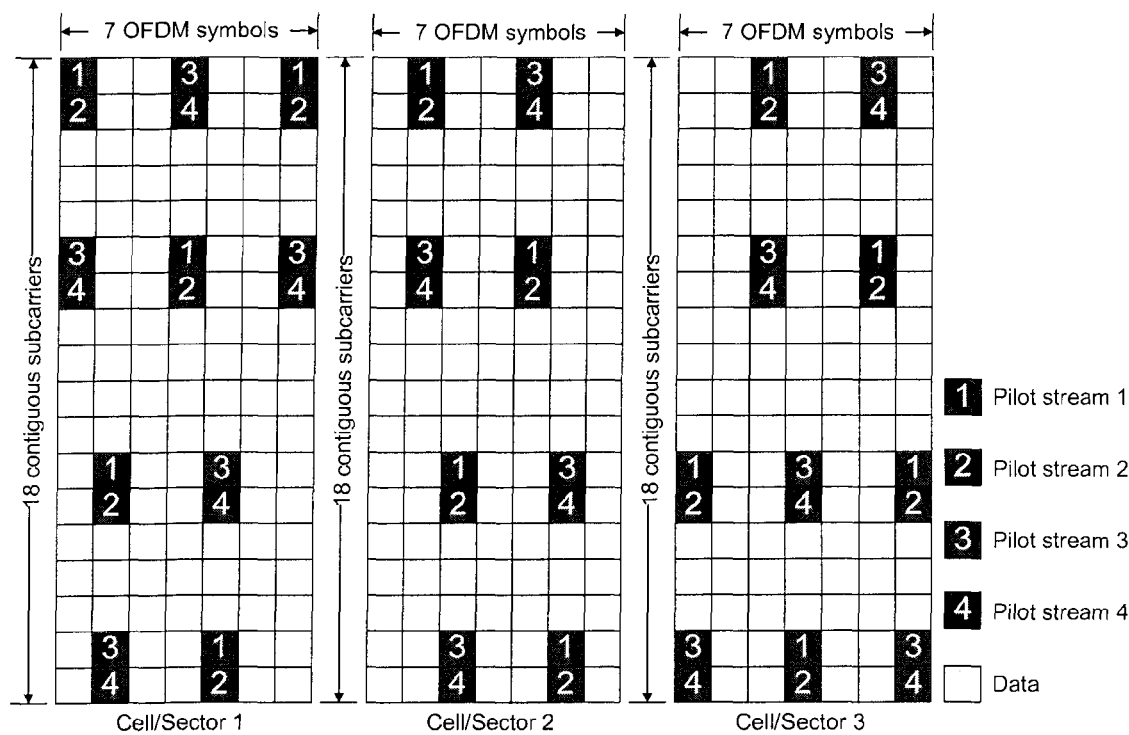
FIG. 12A illustrates another exemplary set of pilot structures consistent with embodiments of the present invention.
Figure 12B:
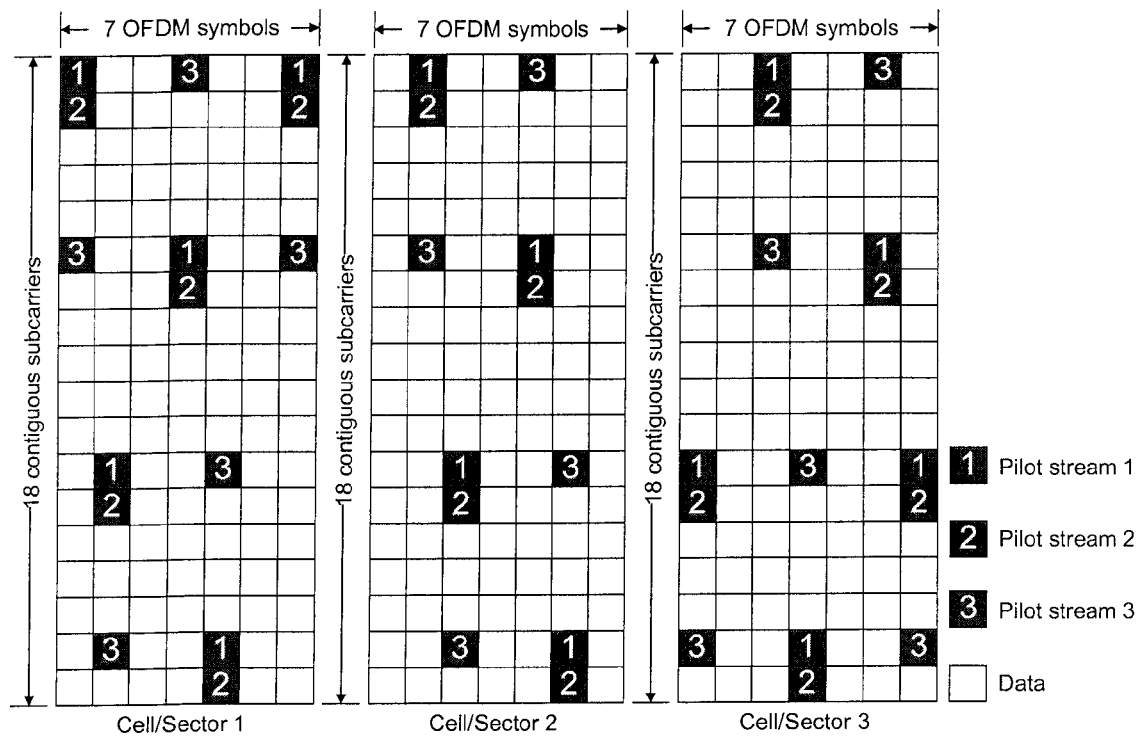
FIG. 12B illustrates another exemplary set of pilot structures consistent with embodiments of the present invention.

FIG. 12A and FIG. 12B illustrate other exemplary sets of pilot structures designed for a base station or base stations using 4-stream 3 sector/cell and 3-stream 3 sector/cell configurations, respectively, for an RU size of 18×7. As shown in FIG. 12A and FIG. 12B, 4-stream pilot symbols (pilot 1, pilot 2, pilot 3, and pilot 4) and 3-stream pilot symbols (pilot 1, pilot 2, and pilot 3) are respectively inserted in the 18×7 RU. Rule 4 is satisfied because the pilot structures are interlaced for different sectors/cells. Rule 5 is partially satisfied because the number of pilot symbols on each OFDM symbol within an RU is partially the same. Rule 7 is satisfied because the pilot structure may be generated by inserting an extra column (OFDM symbol) behind a regular RU (18×6) by duplicating the first column on the regular RU to form another pilot structure on an irregular RU (18×7). Further, rule 8 is satisfied because the IPI in the overlapped region is avoided. Also, the pilot overhead may be substantially different in different cells/sectors and may make an essential bias on the accuracy of channel estimation in cells/sectors.

The pilot structures for cell/sector 1, cell/sector 2, and cell/sector 3 shown in FIG. 12A can be represented as:

$$\begin{vmatrix} 1&0&0&3&0&0&1 \\ 2&0&0&4&0&0&2 \\ 0&0&0&0&0&0&0 \\ 0&0&0&0&0&0&0 \\ 0&0&0&0&0&0&0 \\ 3&0&0&1&0&0&3 \\ 4&0&0&2&0&0&4 \\ 0&0&0&0&0&0&0 \\ 0&0&0&0&0&0&0 \\ 0&0&0&0&0&0&0 \\ 0&0&0&0&0&0&0 \\ 0&1&0&0&3&0&0 \\ 0&2&0&0&4&0&0 \\ 0&0&0&0&0&0&0 \\ 0&0&0&0&0&0&0 \\ 0&0&0&0&0&0&0 \\ 0&3&0&0&1&0&0 \\ 0&4&0&0&2&0&0 \end{vmatrix} \begin{vmatrix} 0&1&0&0&3&0&0 \\ 0&2&0&0&4&0&0 \\ 0&0&0&0&0&0&0 \\ 0&0&0&0&0&0&0 \\ 0&0&0&0&0&0&0 \\ 0&3&0&0&1&0&0 \\ 0&4&0&0&2&0&0 \\ 0&0&0&0&0&0&0 \\ 0&0&0&0&0&0&0 \\ 0&0&0&0&0&0&0 \\ 0&0&0&0&0&0&0 \\ 0&0&1&0&0&0&0 \\ 0&0&2&0&0&3&0 \\ 0&0&0&0&0&4&0 \\ 0&0&0&0&0&0&0 \\ 0&0&0&0&0&0&0 \\ 0&0&3&0&0&1&0 \\ 0&0&4&0&0&2&0 \end{vmatrix} \begin{vmatrix} 0&0&1&0&0&3&0 \\ 0&0&2&0&0&4&0 \\ 0&0&0&0&0&0&0 \\ 0&0&0&0&0&0&0 \\ 0&0&0&0&0&0&0 \\ 0&0&3&0&0&1&0 \\ 0&0&4&0&0&2&0 \\ 0&0&0&0&0&0&0 \\ 0&0&0&0&0&0&0 \\ 0&0&0&0&0&0&0 \\ 0&0&0&0&0&0&0 \\ 1&0&0&3&0&0&1 \\ 2&0&0&4&0&0&2 \\ 0&0&0&0&0&0&0 \\ 0&0&0&0&0&0&0 \\ 0&0&0&0&0&0&0 \\ 3&0&0&1&0&1&3 \\ 4&0&0&2&0&2&4 \end{vmatrix},$$

respectively.

The pilot structures for cell/sector 1, cell/sector 2, and cell/sector 3 shown in FIG. 12B can be represented as:

$$\begin{vmatrix} 1&0&0&3&0&0&1 \\ 2&0&0&0&0&0&2 \\ 0&0&0&0&0&0&0 \\ 0&0&0&0&0&0&0 \\ 0&0&0&0&0&0&0 \\ 3&0&0&1&0&0&3 \\ 0&0&0&2&0&0&0 \\ 0&0&0&0&0&0&0 \\ 0&0&0&0&0&0&0 \\ 0&0&0&0&0&0&0 \\ 0&0&0&0&0&0&0 \\ 0&1&0&0&3&0&0 \\ 0&2&0&0&0&0&0 \\ 0&0&0&0&0&0&0 \\ 0&0&0&0&0&0&0 \\ 0&0&0&0&0&0&0 \\ 0&3&0&0&1&0&0 \\ 0&0&0&0&2&0&0 \end{vmatrix} \begin{vmatrix} 0&1&0&0&3&0&0 \\ 0&2&0&0&0&0&0 \\ 0&0&0&0&0&0&0 \\ 0&0&0&0&0&0&0 \\ 0&0&0&0&0&0&0 \\ 0&3&0&0&1&0&0 \\ 0&0&0&0&2&0&0 \\ 0&0&0&0&0&0&0 \\ 0&0&0&0&0&0&0 \\ 0&0&0&0&0&0&0 \\ 0&0&0&0&0&0&0 \\ 0&0&1&0&0&0&0 \\ 0&0&2&0&0&3&0 \\ 0&0&0&0&0&0&0 \\ 0&0&0&0&0&0&0 \\ 0&0&0&0&0&0&0 \\ 0&0&3&0&0&1&0 \\ 0&0&0&0&0&2&0 \end{vmatrix} \begin{vmatrix} 0&0&1&0&0&3&0 \\ 0&0&2&0&0&0&0 \\ 0&0&0&0&0&0&0 \\ 0&0&0&0&0&0&0 \\ 0&0&0&0&0&0&0 \\ 0&0&3&0&0&1&0 \\ 0&0&0&0&0&2&0 \\ 0&0&0&0&0&0&0 \\ 0&0&0&0&0&0&0 \\ 0&0&0&0&0&0&0 \\ 0&0&0&0&0&0&0 \\ 1&0&0&3&0&0&1 \\ 2&0&0&4&0&0&2 \\ 0&0&0&0&0&0&0 \\ 0&0&0&0&0&0&0 \\ 0&0&0&0&0&0&0 \\ 3&0&0&1&0&1&3 \\ 0&0&0&0&2&0&0 \end{vmatrix},$$

respectively.

Figure 13A:
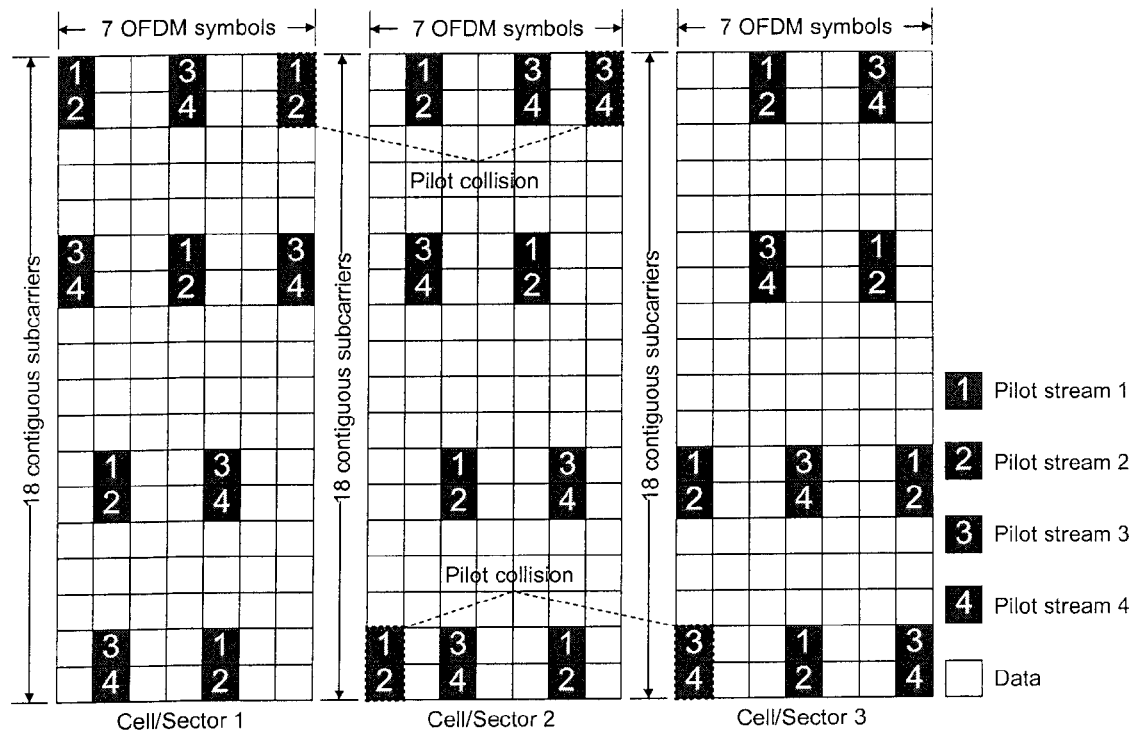
FIG. 13A illustrates another exemplary set of pilot structures consistent with embodiments of the present invention.
Figure 13B:
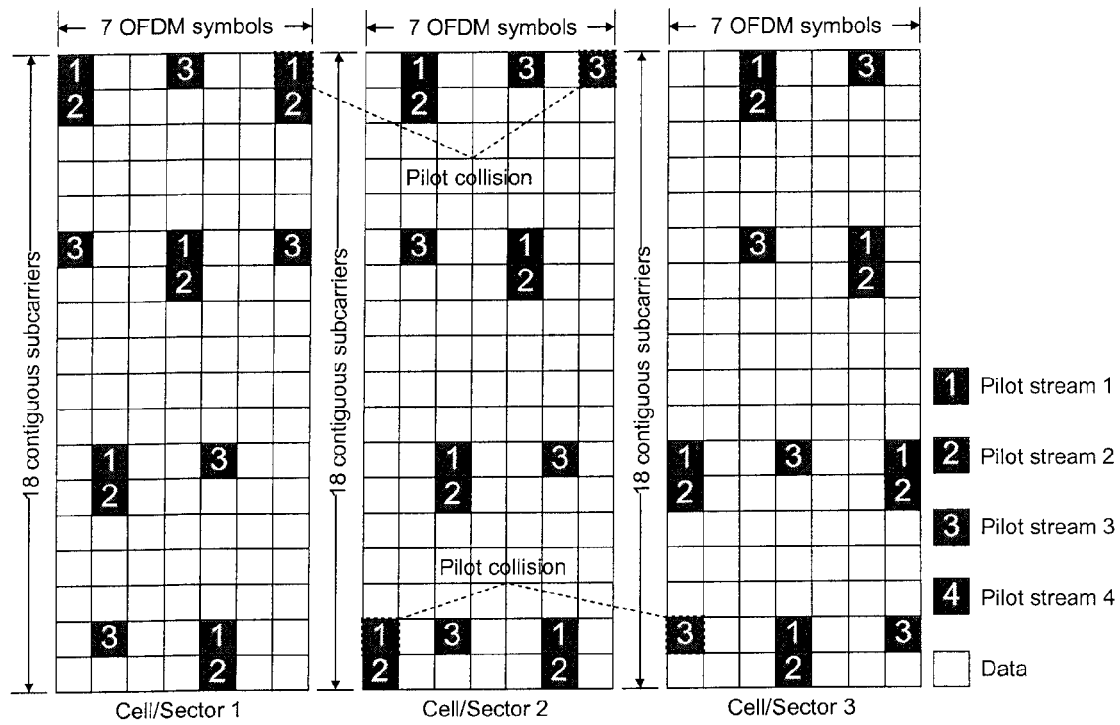
FIG. 13B illustrates another exemplary set of pilot structures consistent with embodiments of the present invention.

FIG. 13A and FIG. 13B illustrate other exemplary sets of pilot structures designed for a base station or base stations using 4-stream 3 sector/cell and 3-stream 3 sector/cell configurations, respectively, for an RU size of 18×7. As shown in FIG. 13A and FIG. 13B, 4-stream pilot symbols (pilot 1, pilot 2, pilot 3, and pilot 4) and 3-stream pilot symbols (pilot 1, pilot 2, and pilot 3) are respectively inserted in the 18×7 RU. Rule 4 is partially satisfied because pilot collision occurs on some of pilot symbols for different sectors/cells due to extra pilot symbols inserted in sector/cell 2 (lower-left and top-right corners). Rule 5 is partially satisfied because the number of pilot symbols on each OFDM symbol within an RU is partially the same. Rule 7 is partially satisfied because the pilot structure in sector/cell 2 is not generated by duplicating the first column (OFDM symbol) on the 18×6 RU behind it to form the pilot structure on the 18×7 RU. Further, rule 8 is satisfied because the IPI in the overlapped region is avoided.

The pilot structures for cell/sector 1, cell/sector 2, and cell/sector 3 shown in FIG. 13A can be represented as:

$$\begin{vmatrix} 1 & 0 & 0 & 3 & 0 & 0 & 1 \\ 2 & 0 & 0 & 4 & 0 & 0 & 2 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 3 & 0 & 0 & 1 & 0 & 0 & 3 \\ 4 & 0 & 0 & 2 & 0 & 0 & 4 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 1 & 0 & 0 & 3 & 0 & 0 \\ 0 & 2 & 0 & 0 & 4 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 3 & 0 & 0 & 1 & 0 & 0 \\ 0 & 4 & 0 & 0 & 2 & 0 & 0 \end{vmatrix}, \begin{vmatrix} 0 & 1 & 0 & 0 & 3 & 0 & 3 \\ 0 & 2 & 0 & 0 & 4 & 0 & 4 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 3 & 0 & 0 & 1 & 0 & 0 \\ 0 & 4 & 0 & 0 & 2 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 1 & 0 & 0 & 0 & 0 \\ 0 & 0 & 2 & 0 & 0 & 3 & 0 \\ 0 & 0 & 0 & 0 & 0 & 4 & 0 \\ 0 & 0 & 0 & 0 & 0 & 0 & 0 \\ 0 & 0 & 0 & 0 & 0 & 0 & 0 \\ 1 & 0 & 3 & 0 & 0 & 1 & 0 \\ 2 & 0 & 4 & 0 & 0 & 2 & 0 \end{vmatrix}, \begin{vmatrix} 0 & 0 & 1 & 0 & 0 & 3 & 0 \\ 0 & 0 & 2 & 0 & 0 & 4 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 3 & 0 & 0 & 1 & 0 \\ 0 & 0 & 4 & 0 & 0 & 2 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 0 & 0 & 3 & 0 & 0 & 1 \\ 2 & 0 & 0 & 4 & 0 & 0 & 2 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 3 & 0 & 0 & 1 & 0 & 1 & 3 \\ 4 & 0 & 0 & 2 & 0 & 2 & 4 \end{vmatrix}$$

respectively.

The pilot structures for cell/sector 1, cell/sector 2, and cell/sector 3 shown in FIG. 13B can be represented as:

$$\begin{vmatrix} 1 & 0 & 0 & 3 & 0 & 0 & 1 \\ 2 & 0 & 0 & 0 & 0 & 0 & 2 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 3 & 0 & 0 & 1 & 0 & 0 & 3 \\ 0 & 0 & 0 & 2 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 1 & 0 & 0 & 3 & 0 & 0 \\ 0 & 2 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 3 & 0 & 0 & 1 & 0 & 0 \\ 0 & 0 & 0 & 0 & 2 & 0 & 0 \end{vmatrix}, \begin{vmatrix} 0 & 1 & 0 & 0 & 3 & 0 & 3 \\ 0 & 2 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 3 & 0 & 0 & 1 & 0 & 0 \\ 0 & 0 & 0 & 0 & 2 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 1 & 0 & 0 & 0 & 0 \\ 0 & 0 & 2 & 0 & 0 & 3 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 0 & 3 & 0 & 0 & 1 & 0 \\ 2 & 0 & 0 & 0 & 0 & 2 & 0 \end{vmatrix}, \begin{vmatrix} 0 & 0 & 1 & 0 & 0 & 3 & 0 \\ 0 & 0 & 2 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 3 & 0 & 0 & 1 & 0 \\ 0 & 0 & 0 & 0 & 0 & 2 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 0 & 0 & 3 & 0 & 0 & 1 \\ 2 & 0 & 0 & 0 & 0 & 0 & 2 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 3 & 0 & 0 & 1 & 0 & 1 & 3 \\ 0 & 0 & 0 & 2 & 0 & 2 & 0 \end{vmatrix}$$

respectively.

Figure 14A:
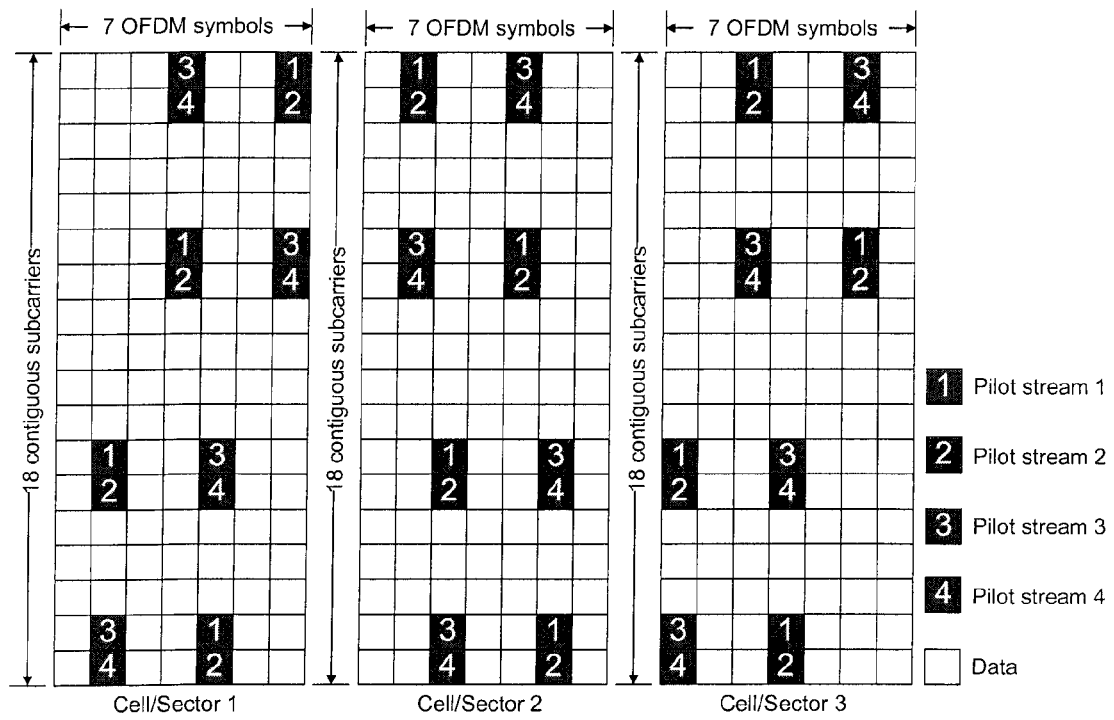
FIG. 14A illustrates another exemplary set of pilot structures consistent with embodiments of the present invention.
Figure 14B:
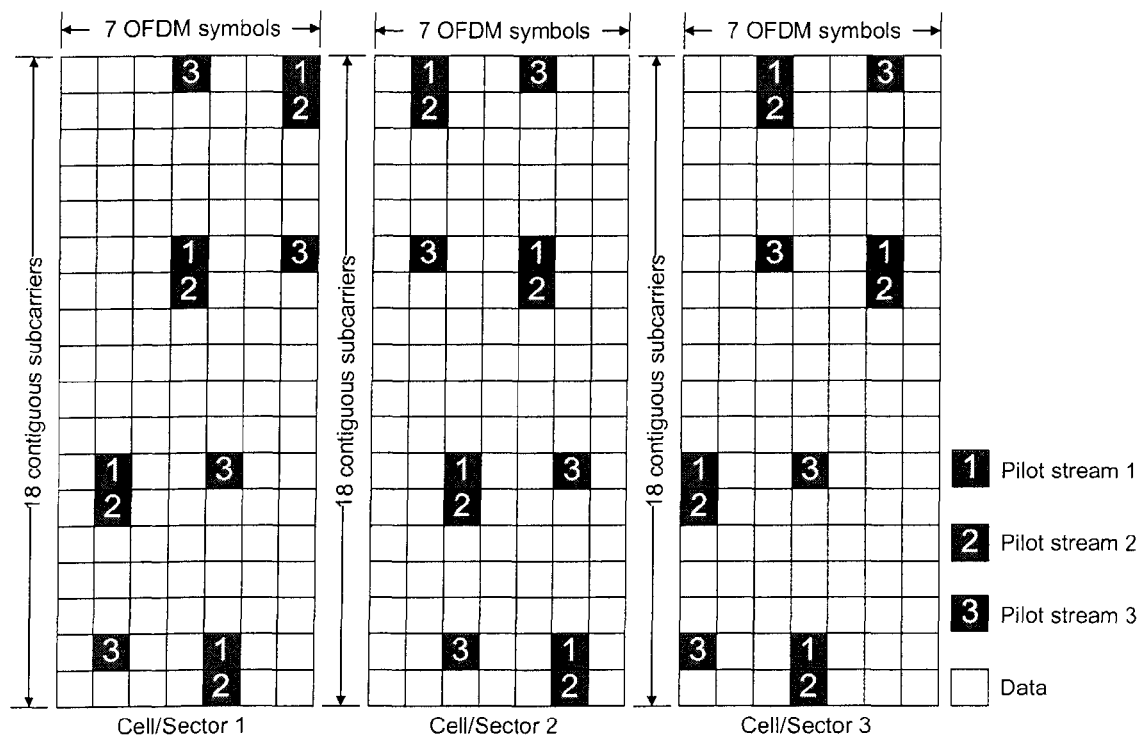
FIG. 14B illustrates another exemplary set of pilot structures consistent with embodiments of the present invention.

FIG. 14A and FIG. 14B illustrate other exemplary sets of pilot structures designed for a base station or base stations using 4-stream 3 sector/cell and 3-stream 3 sector/cell configurations, respectively, for an RU size of 18×7. As shown in FIG. 14A and FIG. 14B, 4-stream pilot symbols (pilot 1, pilot 2, pilot 3, and pilot 4) and 3-stream pilot symbols (pilot 1, pilot 2, and pilot 3) are respectively inserted in the 18×7 RU. Comparing the two configurations shown in FIG. 12A (and FIG. 12B) and FIG. 14A (and FIG. 14B), the pilot structures of the configurations shown in FIG. 14A (and FIG. 14B) are similar to these shown in FIG. 12A (and FIG. 12B), except that the pilot symbols in the first column (OFDM symbol) with an RU in sector/cell 1 and the pilot symbols in the last column (OFDM symbol) with an RU in sector/cell 3 that shown in FIG. 12A (and FIG. 12B) are removed in FIG. 14A (and FIG. 14B). Thus, the properties possessed by the pilot structures shown in FIG. 12A (and FIG. 12B) may also be possessed by those shown in FIG. 14A (and FIG. 14B). However, as shown in FIG. 14A (and FIG. 14B), the pilot overhead is the same in all cells/sectors, and thus rule 7 is partially satisfied.

The pilot structures for cell/sector 1, cell/sector 2, and cell/sector 3 shown in FIG. 14A can be represented as:

$$\begin{vmatrix} 0 & 0 & 3 & 0 & 0 & 1 \\ 0 & 0 & 4 & 0 & 0 & 2 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 3 \\ 0 & 0 & 2 & 0 & 0 & 4 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 3 & 0 \\ 0 & 2 & 0 & 0 & 4 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 & 0 \\ 0 & 4 & 0 & 0 & 2 & 0 & 0 \end{vmatrix}, \begin{vmatrix} 0 & 1 & 0 & 0 & 3 & 0 \\ 0 & 2 & 0 & 0 & 4 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 4 & 0 & 0 & 2 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 0 \\ 0 & 0 & 2 & 0 & 0 & 3 & 0 \\ 0 & 0 & 0 & 0 & 0 & 4 & 0 \\ 0 & 0 & 0 & 0 & 0 & 0 \\ 0 & 0 & 0 & 0 & 0 & 0 \\ 0 & 0 & 3 & 0 & 0 & 1 & 0 \\ 0 & 0 & 4 & 0 & 0 & 2 & 0 \end{vmatrix}, \begin{vmatrix} 0 & 0 & 1 & 0 & 0 & 3 & 0 \\ 0 & 0 & 2 & 0 & 0 & 4 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 3 & 0 & 0 & 1 & 0 \\ 0 & 0 & 4 & 0 & 0 & 2 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & 0 & 3 & 0 & 0 \\ 2 & 0 & 0 & 4 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 0 & 0 & 1 & 0 & 1 & 0 \\ 4 & 0 & 0 & 2 & 0 & 2 & 0 \end{vmatrix}$$

respectively.

The pilot structures for cell/sector 1, cell/sector 2, and cell/sector 3 shown in FIG. 14B can be represented as:

$$\begin{vmatrix} 0 & 0 & 3 & 0 & 0 & 1 \\ 0 & 0 & 0 & 0 & 0 & 2 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 3 \\ 0 & 0 & 2 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 3 & 0 \\ 0 & 2 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 0 & 0 & 0 & 2 & 0 \end{vmatrix}, \begin{vmatrix} 0 & 1 & 0 & 0 & 3 & 0 \\ 0 & 2 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 0 & 0 & 0 & 2 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 0 \\ 0 & 0 & 2 & 0 & 0 & 3 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 3 & 0 & 0 & 1 \\ 0 & 0 & 0 & 0 & 0 & 2 \end{vmatrix}, \begin{vmatrix} 0 & 0 & 1 & 0 & 0 & 3 & 0 \\ 0 & 0 & 2 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 3 & 0 & 0 & 1 & 0 \\ 0 & 0 & 0 & 0 & 0 & 2 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & 0 & 3 & 0 & 0 \\ 2 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 0 & 0 & 1 & 0 & 0 \\ 0 & 0 & 0 & 2 & 0 & 0 \end{vmatrix}$$

respectively.

FIGS. 15A, 15B, 15C, and 15D illustrate multiple exemplary sets of pilot structures designed for a base station or base stations using 4-stream, single stream, 2-stream, and 3-stream 3 sector/cell configurations, respectively, for an RU size of 6×6. As shown in FIGS. 15A, 15B, 15C, and 15D, 4-stream (pilot 1, pilot 2, pilot 3, an pilot 4), single stream, 2-stream (pilot 1 and pilot 2) and 3-stream (pilot 1, pilot 2, and pilot 3) pilot symbols are respectively inserted in the 6×6 RU. Due to a particular 6×6 RU size, the pilot density rule (rule 1) may be redesigned and may be different from the cases described above. For example, in a 6×6 RU, at most 4 pilot symbols per stream may be used due to the pilot density (overhead). Rule 4 is partially satisfied because the pilot structures are interlaced in different sectors/cells only for single stream (FIG. 15B) and 2-stream (FIG. 15C) configurations. For 3-stream (FIG. 15D) and 4-stream (FIG. 15A) configurations, pilot collision may occur on some pilot symbols. Rule 5 is partially satisfied because the number of pilot symbols on each OFDM symbol within an RU is partially the same. Further, rule 8 is satisfied for single stream and 2-stream configurations but may not be satisfied for 3-stream and 4-stream configurations.

Figure 15A:
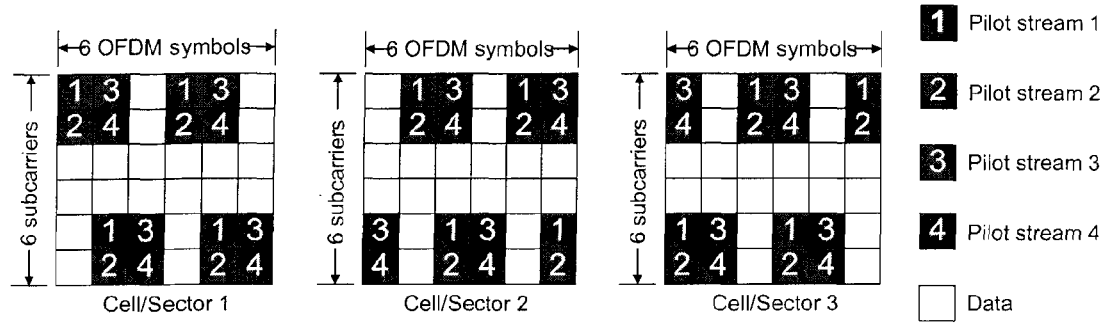
FIG. 15A illustrates another exemplary set of pilot structures consistent with embodiments of the present invention.

The pilot structures for cell/sector 1, cell/sector 2, and cell/sector 3 shown in FIG. 15A can be represented as:

$$\begin{vmatrix} 1 & 3 & 0 & 1 & 3 & 0 \\ 2 & 4 & 0 & 2 & 4 & 0 \\ 0 & 0 & 0 & 0 & 0 & 0 \\ 0 & 0 & 0 & 0 & 0 & 0 \\ 0 & 1 & 3 & 0 & 1 & 3 \\ 0 & 2 & 4 & 0 & 2 & 4 \end{vmatrix} \begin{vmatrix} 0 & 1 & 3 & 0 & 1 & 3 \\ 0 & 2 & 4 & 0 & 2 & 4 \\ 0 & 0 & 0 & 0 & 0 & 0 \\ 0 & 0 & 0 & 0 & 0 & 0 \\ 3 & 0 & 1 & 3 & 0 & 1 \\ 4 & 0 & 2 & 4 & 0 & 2 \end{vmatrix} \begin{vmatrix} 3 & 0 & 1 & 3 & 0 & 1 \\ 4 & 0 & 2 & 4 & 0 & 2 \\ 0 & 0 & 0 & 0 & 0 & 0 \\ 0 & 0 & 0 & 0 & 0 & 0 \\ 1 & 3 & 0 & 1 & 3 & 0 \\ 2 & 4 & 0 & 2 & 4 & 0 \end{vmatrix},$$

respectively.

Figure 15B:
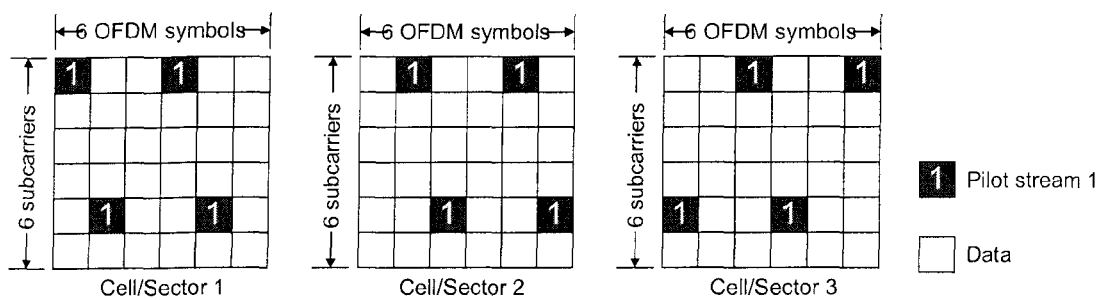
FIG. 15B illustrates another exemplary set of pilot structures consistent with embodiments of the present invention.

The pilot structures for cell/sector 1, cell/sector 2, and cell/sector 3 shown in FIG. 15B can be represented as:

$$\begin{vmatrix} 1 & 0 & 0 & 1 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 1 & 0 \\ 0 & 0 & 0 & 0 & 0 & 0 \end{vmatrix} \begin{vmatrix} 0 & 1 & 0 & 0 & 1 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 1 \\ 0 & 0 & 0 & 0 & 0 & 0 \end{vmatrix} \begin{vmatrix} 0 & 0 & 1 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & 0 & 1 & 0 & 0 \\ 0 & 0 & 0 & 0 & 0 & 0 \end{vmatrix},$$

respectively.

Figure 15C:
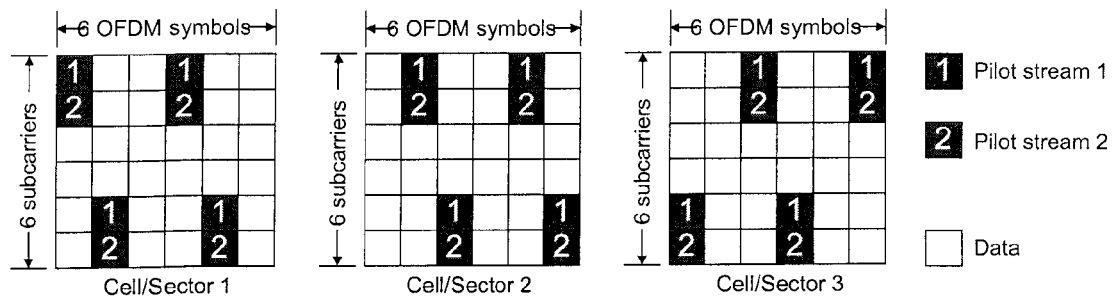
FIG. 15C illustrates another exemplary set of pilot structures consistent with embodiments of the present invention.

The pilot structures for cell/sector 1, cell/sector 2, and cell/sector 3 shown in FIG. 15C can be represented as:

$$\begin{vmatrix} 1 & 0 & 0 & 1 & 0 & 0 \\ 2 & 0 & 0 & 2 & 0 & 0 \\ 0 & 0 & 0 & 0 & 0 & 0 \\ 0 & 0 & 0 & 0 & 0 & 0 \\ 0 & 1 & 0 & 0 & 1 & 0 \\ 0 & 2 & 0 & 0 & 2 & 0 \end{vmatrix} \begin{vmatrix} 0 & 1 & 0 & 0 & 1 & 0 \\ 0 & 2 & 0 & 0 & 2 & 0 \\ 0 & 0 & 0 & 0 & 0 & 0 \\ 0 & 0 & 0 & 0 & 0 & 0 \\ 0 & 0 & 1 & 0 & 0 & 1 \\ 0 & 0 & 2 & 0 & 0 & 2 \end{vmatrix} \begin{vmatrix} 0 & 0 & 1 & 0 & 0 & 1 \\ 0 & 0 & 2 & 0 & 0 & 2 \\ 0 & 0 & 0 & 0 & 0 & 0 \\ 0 & 0 & 0 & 0 & 0 & 0 \\ 1 & 0 & 0 & 1 & 0 & 0 \\ 2 & 0 & 0 & 2 & 0 & 0 \end{vmatrix},$$

respectively.

Figure 15D:
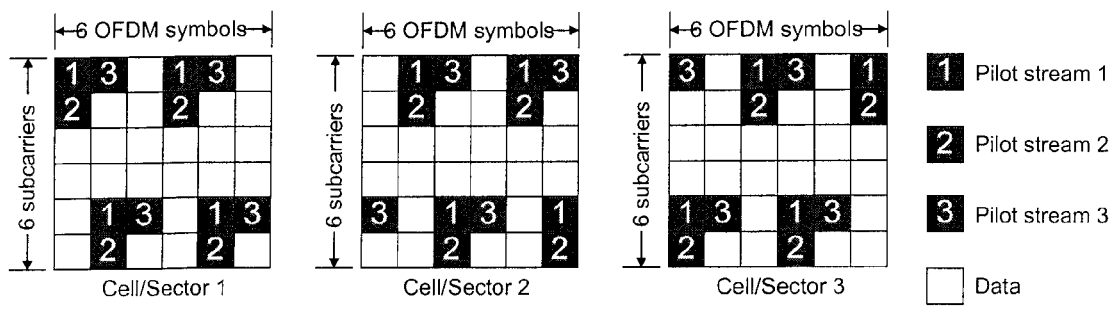
FIG. 15D illustrates another exemplary set of pilot structures consistent with embodiments of the present invention.

The pilot structures shown in FIG. 15D can be represented as:

$$\begin{vmatrix} 1 & 3 & 0 & 1 & 3 & 0 \\ 2 & 0 & 0 & 2 & 0 & 0 \\ 0 & 0 & 0 & 0 & 0 & 0 \\ 0 & 0 & 0 & 0 & 0 & 0 \\ 0 & 1 & 3 & 0 & 1 & 3 \\ 0 & 2 & 0 & 0 & 2 & 0 \end{vmatrix} \begin{vmatrix} 0 & 1 & 3 & 0 & 1 & 3 \\ 0 & 2 & 0 & 0 & 2 & 0 \\ 0 & 0 & 0 & 0 & 0 & 0 \\ 0 & 0 & 0 & 0 & 0 & 0 \\ 3 & 0 & 1 & 3 & 0 & 1 \\ 0 & 0 & 2 & 0 & 0 & 2 \end{vmatrix} \begin{vmatrix} 3 & 0 & 1 & 3 & 0 & 1 \\ 0 & 0 & 2 & 0 & 0 & 2 \\ 0 & 0 & 0 & 0 & 0 & 0 \\ 0 & 0 & 0 & 0 & 0 & 0 \\ 1 & 3 & 0 & 1 & 3 & 0 \\ 2 & 0 & 0 & 2 & 0 & 0 \end{vmatrix},$$

respectively.

FIGS. 15E, 15F, 15G, and 15H illustrate exemplary multiple pilot structures designed for a base station or base stations using 4-stream, single stream, 2-stream, and 3-stream 3 sector/cell configurations respectively for an RU size of 6×6. As shown in FIGS. 15E, 15F, 15G, and 15H, 4-stream (pilot 1, pilot 2, pilot 3, and pilot 4), single stream, 2-stream (pilot 1 and pilot 2) and 3-stream (pilot 1, pilot 2, and pilot 3) pilot symbols are respectively inserted in the 6×6 RU, and a single pilot structure is used in each configuration shown in FIGS. 15E, 15F, 15G, and 15H. Further, FIG. 15I and FIG. 15J illustrate the pilot structures transmitted on the $1^{st}$ and $2^{nd}$ streams respectively for individual streams of 2-stream transmission shown in FIG. 15G.

With respect to rule 1, for 6×6 RU, at most 4 pilot symbols per stream may be used. Further, due to the small-size RU (6×6), rule 4 is no longer considered for the 6×6 RU. Rule 5 is also partially satisfied because the number of pilot symbols on each OFDM symbol within an RU is partially the same. Further, rule 8 is satisfied for single stream and 2-stream configurations but may not be satisfied for 3-stream and 4-stream configurations.

Figure 15E:
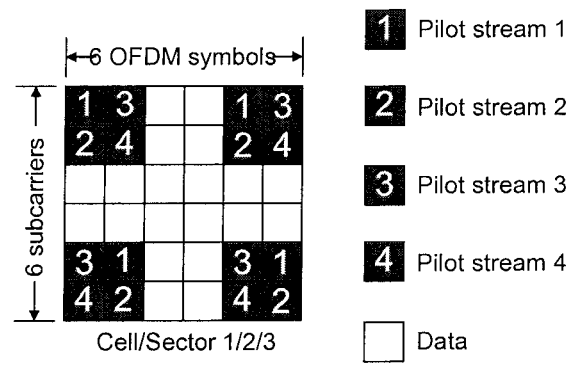
FIG. 15E illustrates another exemplary set of pilot structures consistent with embodiments of the present invention.

The pilot structures for all cells/sectors shown in FIG. 15E can be represented as:

$$\begin{vmatrix} 1 & 3 & 0 & 0 & 1 & 3 \\ 2 & 4 & 0 & 0 & 2 & 4 \\ 0 & 0 & 0 & 0 & 0 & 0 \\ 0 & 0 & 0 & 0 & 0 & 0 \\ 3 & 1 & 0 & 0 & 3 & 1 \\ 4 & 2 & 0 & 0 & 4 & 2 \end{vmatrix}$$

Figure 15F:
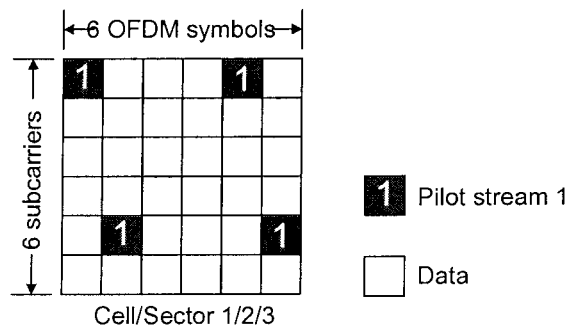
FIG. 15F illustrates another exemplary set of pilot structures consistent with embodiments of the present invention.

The pilot structures for all cells/sectors shown in FIG. 15F can be represented as:

$$\begin{vmatrix} 1 & 0 & 0 & 0 & 1 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 0 & 1 \\ 0 & 0 & 0 & 0 & 0 & 0 \end{vmatrix}$$

Figure 15G:
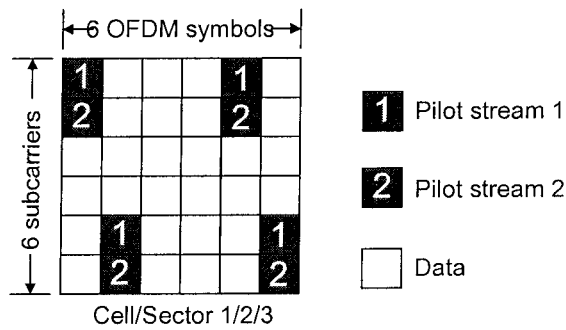
FIG. 15G illustrates another exemplary set of pilot structures consistent with embodiments of the present invention.

The pilot structures for all cells/sectors shown in FIG. 15G can be represented as:

$$\begin{vmatrix} 1 & 0 & 0 & 0 & 1 & 0 \\ 2 & 0 & 0 & 0 & 2 & 0 \\ 0 & 0 & 0 & 0 & 0 & 0 \\ 0 & 0 & 0 & 0 & 0 & 0 \\ 0 & 1 & 0 & 0 & 0 & 1 \\ 0 & 2 & 0 & 0 & 0 & 2 \end{vmatrix}$$

Figure 15H:
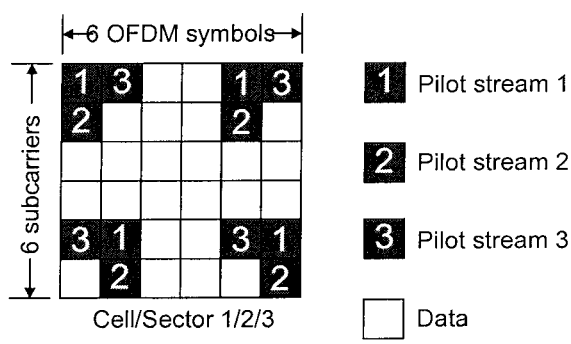
FIG. 15H illustrates another exemplary set of pilot structures consistent with embodiments of the present invention.
Figure 15I:
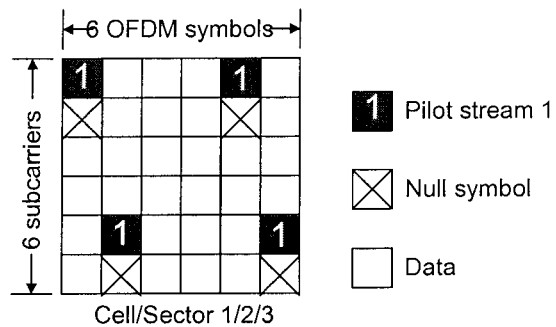
FIG. 15I illustrates another exemplary set of pilot structures consistent with embodiments of the present invention.
Figure 15J:
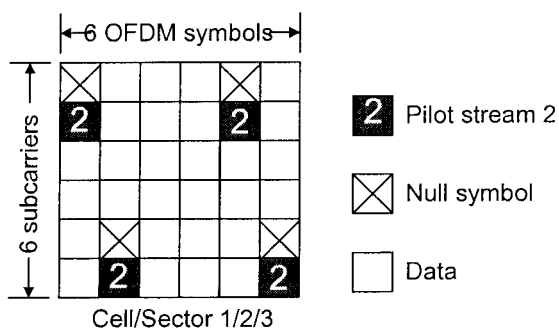
FIG. 15J illustrates another exemplary set of pilot structures consistent with embodiments of the present invention.

The pilot structures for all cells/sectors shown in FIG. 15H can be represented as:

$$\begin{vmatrix} 1 & 3 & 0 & 0 & 1 & 3 \\ 2 & 0 & 0 & 0 & 2 & 0 \\ 0 & 0 & 0 & 0 & 0 & 0 \\ 0 & 0 & 0 & 0 & 0 & 0 \\ 3 & 1 & 0 & 0 & 3 & 1 \\ 0 & 2 & 0 & 0 & 0 & 2 \end{vmatrix}$$

FIGS. 16A, 16B, 16C, and 16D illustrate multiple exemplary pilot structures designed for a base station or base stations using 4-stream, single stream, 2-stream, and 3-stream 3 sector/cell configurations, respectively, for an RU size of 6×5. As shown in FIGS. 16A, 16B, 16C, and 16D, 4-stream (pilot 1, pilot 2, pilot 3, and pilot 4), single stream, 2-stream (pilot 1 and pilot 2) and 3-stream (pilot 1, pilot 2, and pilot 3) pilot symbols are respectively inserted in the 6×5 RU. With respect to rule 1, for a 6×5 RU, at most 4 pilot symbols per stream may be used. Further, due to a small-size RU (6×5), rule 4 may not be considered for the 6×5 RU. Rule 5 is also partially satisfied because the number of pilot symbols on each OFDM symbol within an RU is partially the same. However, rule 7 is not satisfied because the pilot structures for the 6×5 RU size is formed by deleting the center time domain column (OFDM symbol) (i.e., $3^{rd}$ or $4^{th}$ column) from a 6×6 RU. Also, rule 8 is satisfied for single stream and 2-stream configurations but not for 3-stream and 4-stream configurations.

Figure 16A:
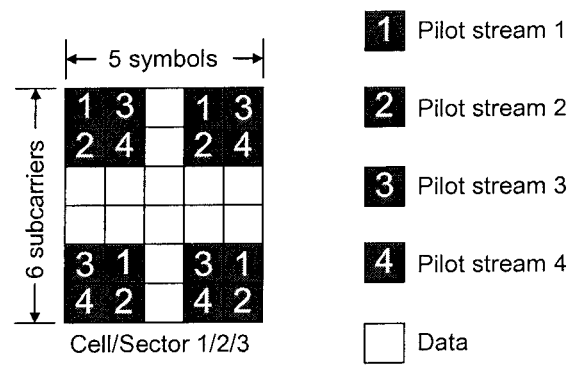
FIG. 16A illustrates an exemplary pilot structure consistent with embodiments of the present invention.

The pilot structures for all cells/sectors shown in FIG. 16A can be represented as:

$$\begin{vmatrix} 1 & 3 & 0 & 1 & 3 \\ 2 & 4 & 0 & 2 & 4 \\ 0 & 0 & 0 & 0 & 0 \\ 0 & 0 & 0 & 0 & 0 \\ 3 & 1 & 0 & 3 & 1 \\ 4 & 2 & 0 & 4 & 2 \end{vmatrix}$$

Figure 16B:
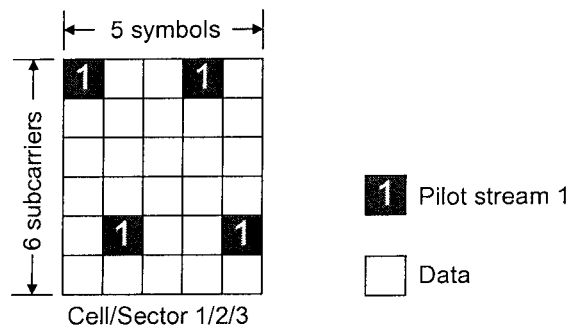
FIG. 16B illustrates an exemplary pilot structure consistent with embodiments of the present invention.

The pilot structures for all cells/sectors shown in FIG. 16B can be represented as:

$$\begin{vmatrix} 1 & 0 & 0 & 1 & 0 \\ 0 & 0 & 0 & 0 & 0 \\ 0 & 0 & 0 & 0 & 0 \\ 0 & 0 & 0 & 0 & 0 \\ 0 & 1 & 0 & 0 & 1 \\ 0 & 0 & 0 & 0 & 0 \end{vmatrix}$$

Figure 16C:
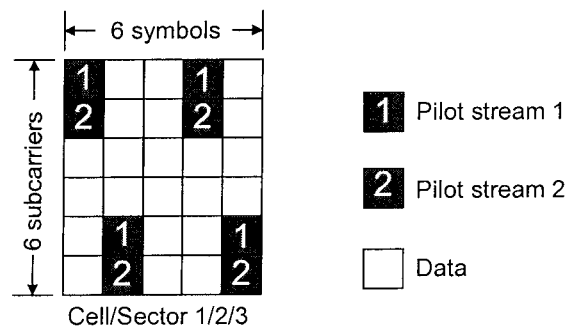
FIG. 16C illustrates an exemplary pilot structure consistent with embodiments of the present invention.

The pilot structures for all cells/sectors shown in FIG. 16C can be represented as:

$$\begin{vmatrix} 1 & 0 & 0 & 1 & 0 \\ 2 & 0 & 0 & 2 & 0 \\ 0 & 0 & 0 & 0 & 0 \\ 0 & 0 & 0 & 0 & 0 \\ 0 & 1 & 0 & 0 & 1 \\ 0 & 2 & 0 & 0 & 2 \end{vmatrix}$$

Figure 16D:
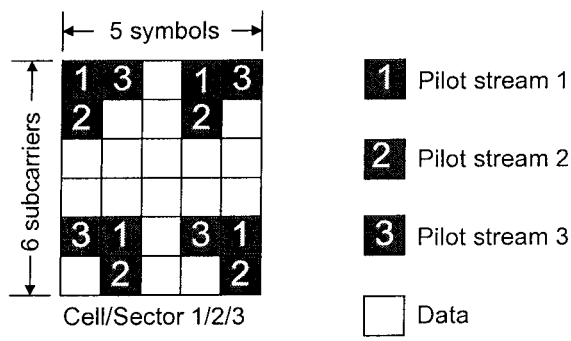
FIG. 16D illustrates an exemplary pilot structure consistent with embodiments of the present invention.

The pilot structures for all cells/sectors shown in FIG. 16D can be represented as:

$$\begin{vmatrix} 1 & 3 & 0 & 1 & 3 \\ 2 & 0 & 0 & 2 & 0 \\ 0 & 0 & 0 & 0 & 0 \\ 0 & 0 & 0 & 0 & 0 \\ 3 & 1 & 0 & 3 & 1 \\ 0 & 2 & 0 & 0 & 2 \end{vmatrix}$$

In the following descriptions, it is understood that 3-stream, 2-stream, and single stream pilot structures can be obtained from 4-stream pilot structures by removing pilot symbols of the $4^{th}$ stream, $4^{th}$ and $3^{rd}$ streams, and $4^{th}$, $3^{rd}$, and $2^{nd}$ streams from the 4-stream pilot structures, respectively. The places of removed pilot symbols may be allocated for data transmission. Therefore, single, 2-stream, and 3-stream configurations are disclosed herein although the illustrations thereof are omitted for the simplicity purpose for the disclosure below.

Figure 17:
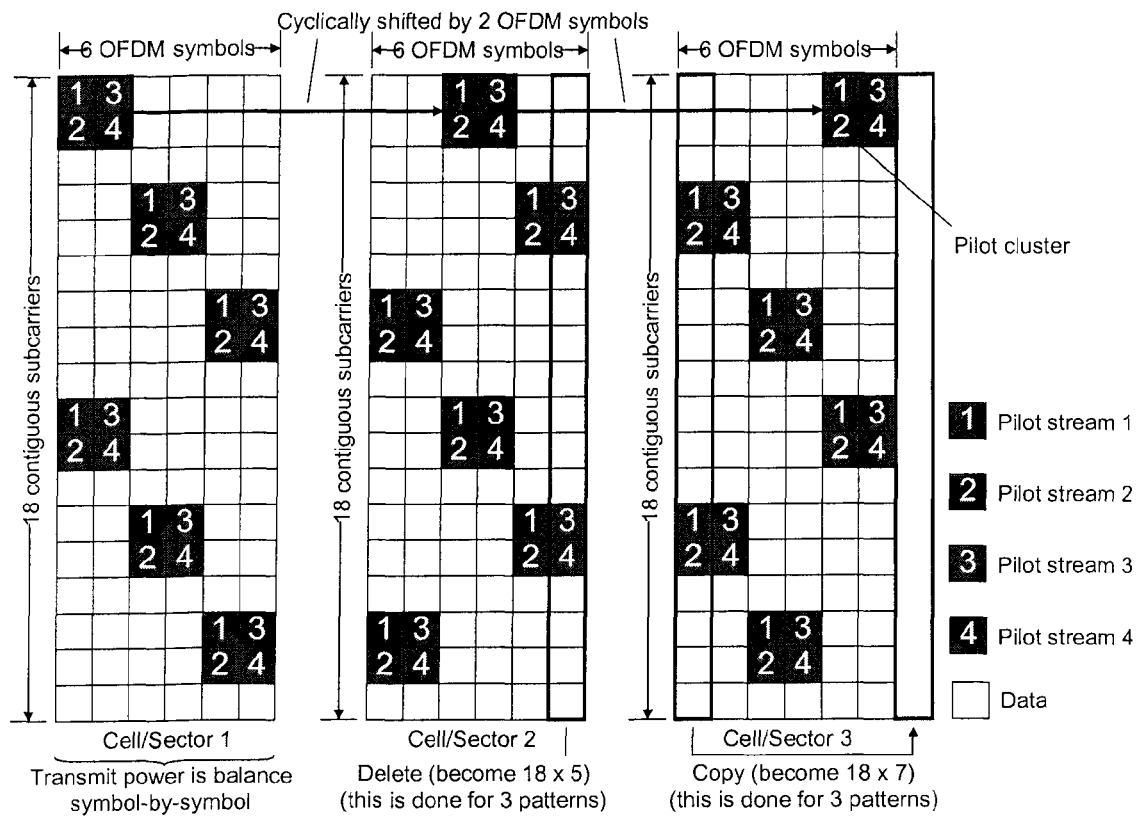
FIG. 17 illustrates an exemplary set of pilot structures consistent with embodiments of the present invention.

FIG. 17 illustrates an exemplary set of pilot structures designed for a base station or base stations using a 4-stream 3 sector/cell configuration, as well as exemplary steps for creating these unified pilot structures for different RU sizes. As shown in FIG. 17, an RU size of 18×6 is used, and four types of pilot symbols (pilot 1, pilot 2, pilot 3, and pilot 4) are inserted in the 18×6 RU. A pilot cluster, a group of pilot symbols, may be used to create these unified pilot structures.

As shown in FIG. 17, a pilot cluster size of 2×2 (2×1 in a 2-stream configuration, not shown) is used. It is understood that, although only one pilot cluster in one RU is shown, the same cluster size is used in the same RU to group all pilot symbols in the RU into the same size clusters. Further, as shown in FIG. 17, pilot structures of different cells and/or of different sizes may be created from a common pilot structure. For example, a pilot structure for an RU size of 18×5 may be created by deleting the last column in time domain (OFDM symbol) with an RU to create an 18×5 RU pilot structure as shown in Sector/Cell 2. Also for example, a pilot structure for an RU size of 18×7 may be created by copying the first column in time domain (OFDM symbol) within an RU as the end column of the new 18×7 RU to create an 18×7 RU pilot structure as shown in Sector/Cell 3. As a result, rule 7 is satisfied.

Further, in FIG. 17 (and also FIGS. 18-22), the number of pilot symbols per stream is six and the pilot overheads are thus 5.56%, 11.11%, 16.67%, and 22.22% for single stream, 2-stream, 3-stream, and 4-stream configurations, respectively. Rule 3 is not substantially satisfied because the pilot symbols are only partially allocated near or at the RU boundaries.

For these unified pilot structures for the 18×6, 18×5, and 18×7 RUs, rule 4 is satisfied because the pilot structures are interlaced for different sectors/cells, i.e., by cyclically shifting the pilot clusters in the 18×6 RU by 2 OFDM symbols, as shown by the arrowed line from the pilot pattern for Sector/Cell 1 to the pilot pattern for Sector/Cell 2, as shown by the framed column in the pilot pattern for Sector/Cell 2, or twice cyclically shifting the pilot clusters in the 18×6 RU by 2 OFDM symbols, as shown by the arrowed lines from the pilot pattern for Sector/Cell 1 to the pilot pattern for Sector/Cell 2 and to the pilot pattern for Sector/Cell 3. Other methods may also be used. Rule 5 is satisfied (but not satisfied for single stream, 2-stream, and 3-stream configurations) because the pilot symbols are evenly placed for each of the OFDM symbols within the RU. Rule 7 is satisfied as mentioned above. Rue 8 is also satisfied because the IPI in the overlapped region is avoided.

Figure 18:
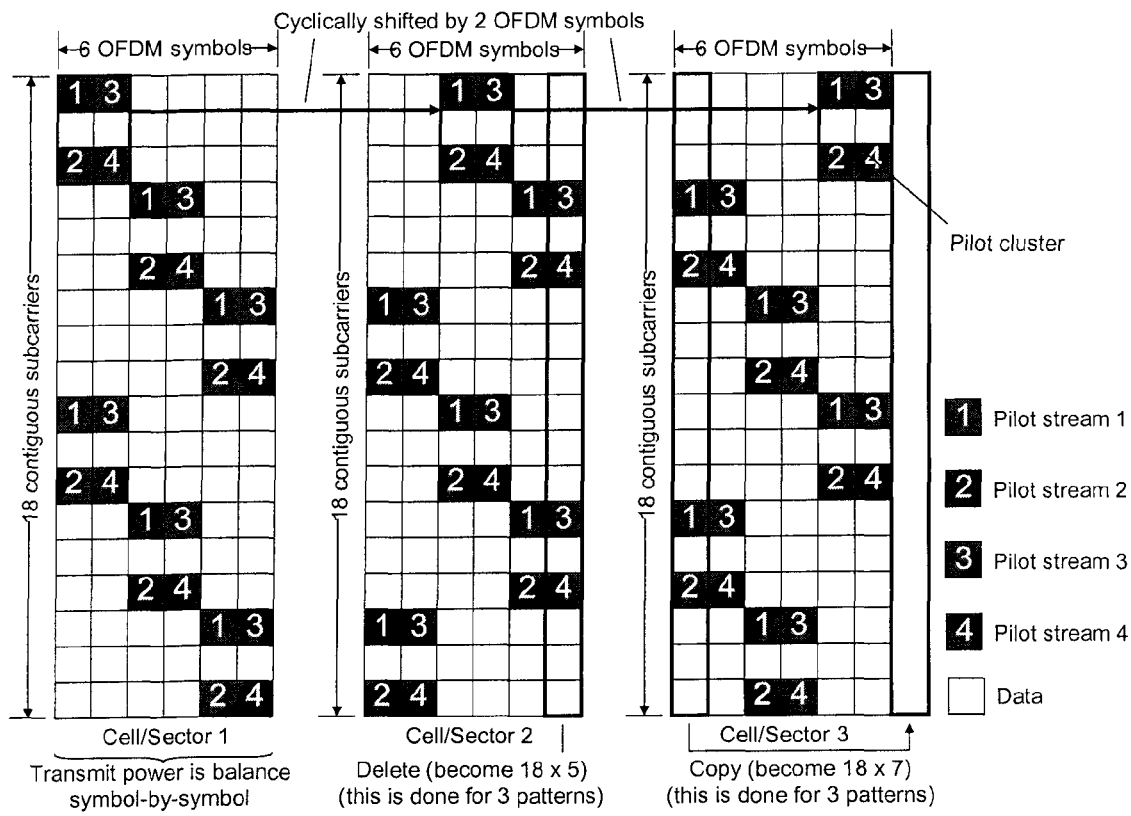
FIG. 18 illustrates another exemplary set of pilot structures consistent with embodiments of the present invention.
Figure 19:
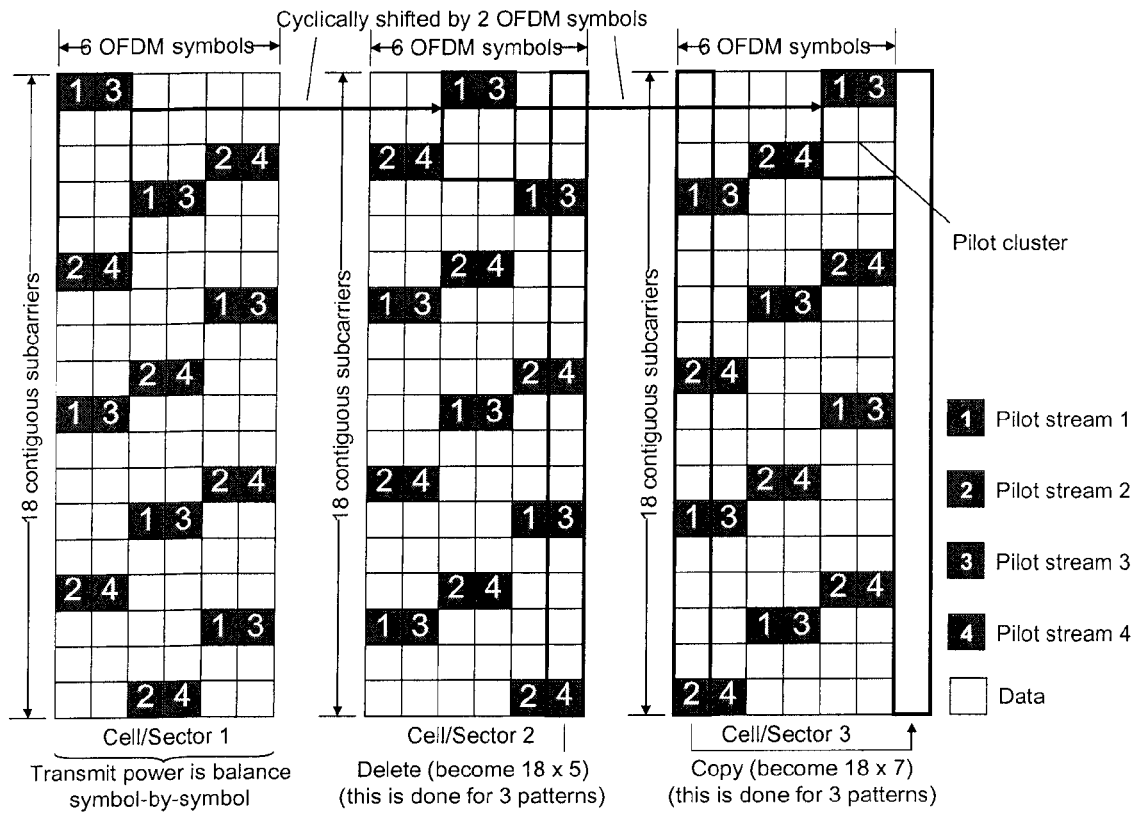
FIG. 19 illustrates another exemplary set of pilot structures consistent with embodiments of the present invention.

FIG. 18 and FIG. 19 illustrate exemplary set of pilot structures designed for a base station or base stations using a 4-stream 3 sector/cell configuration, as well as exemplary steps for creating these unified pilot structures for different RU sizes. As shown in FIG. 18 and FIG. 19, an RU size of 18×6 is used and four types of pilot symbols (pilot 1, pilot 2, pilot 3, and pilot 4) are inserted in the 18×6 RU, and a pilot cluster size of 3×2 (3×1 in a 2-stream configuration, not shown) is used. Similar to the configurations shown in FIG. 17, rules 4-8 are satisfied for the configurations shown in FIG. 18 and FIG. 19.

Figure 20:
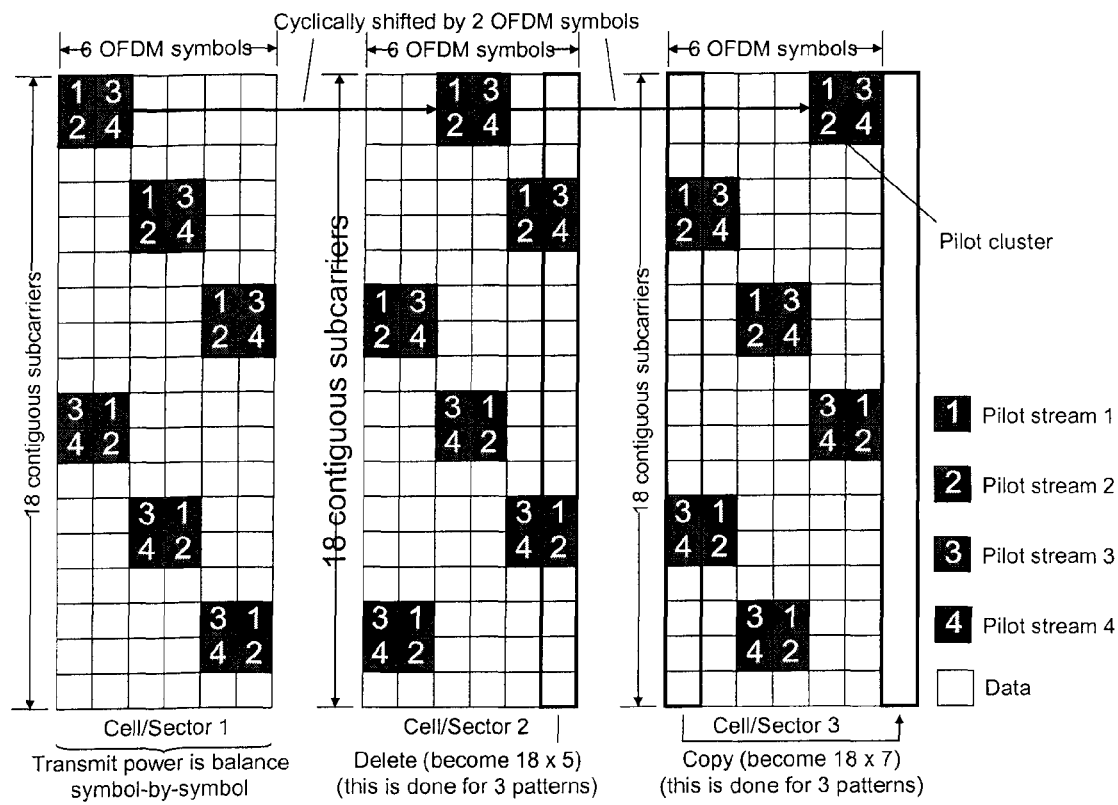
FIG. 20 illustrates another exemplary set of pilot structures consistent with embodiments of the present invention.

FIG. 20 illustrates another exemplary set of pilot structures designed for a base station or base stations using a 4-stream 3 sector/cell configuration, as well as exemplary steps for creating these unified pilot structures for different RU sizes. As shown in FIG. 20, an RU size of 18×6 is used and four types of pilot symbols (pilot 1, pilot 2, pilot 3, and pilot 4) are inserted in the 18×6 RU. As shown in FIG. 20, a pilot cluster size of 2×2 (2×1 in a 2-stream configuration, not shown) is used.

Also as shown in FIG. 20, columns (OFDM symbols) within an RU in the lower half of the pilot clusters (shown as un-framed pilot clusters in RUs for Sector/Cell 1, Sector/Cell 2, and Sector/Cell 3) are interchanged. That is, columns and/or rows of a pilot cluster are switched in a certain way. For example, in a un-framed pilot cluster of the RU for Sector/Cell 1, the column containing pilot 1 and pilot 2 is interchanged with the column containing pilot 3 and pilot 4. Other interchange arrangements, however, may also be used. The interchanged pilot symbols may improve power boosting on pilots (rule 5) for single stream, 2-stream, and 3-stream configurations. Similar to the configurations shown in FIG. 17, rules 4-8 are satisfied for the configurations shown in FIG. 20.

Figure 21:
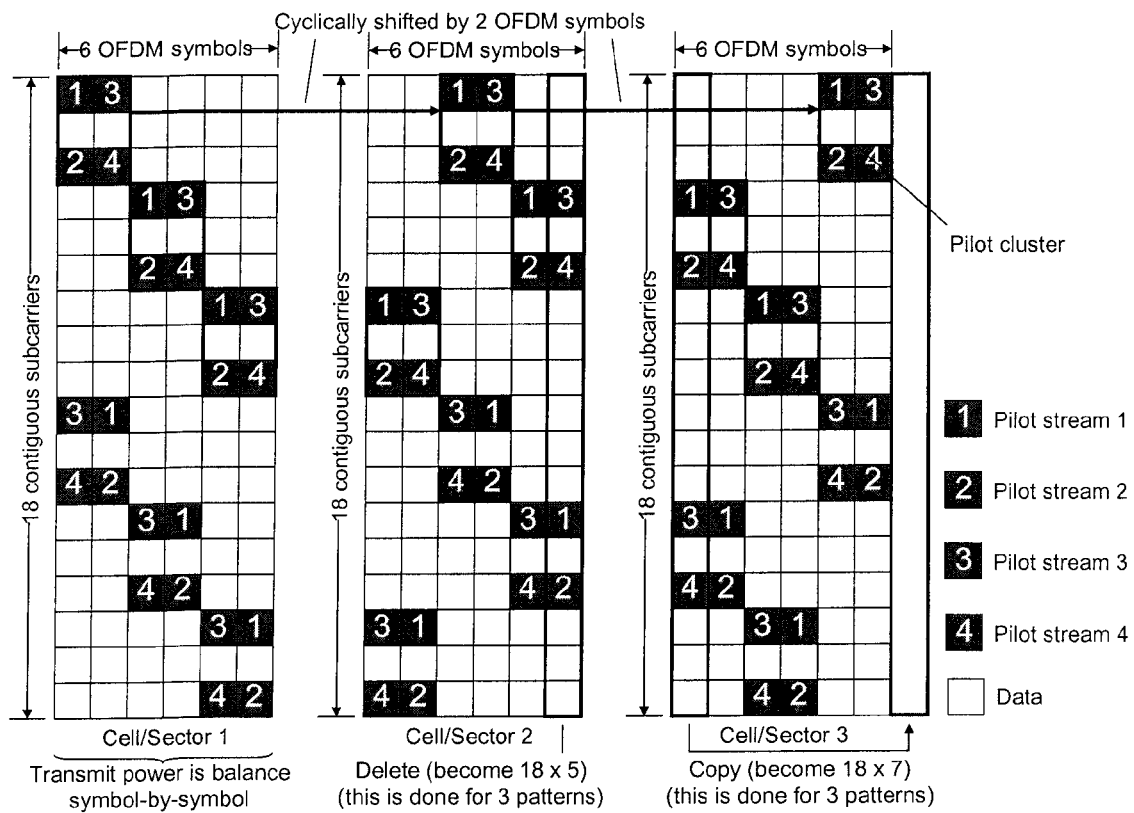
FIG. 21 illustrates another exemplary set of pilot structures consistent with embodiments of the present invention.
Figure 22:
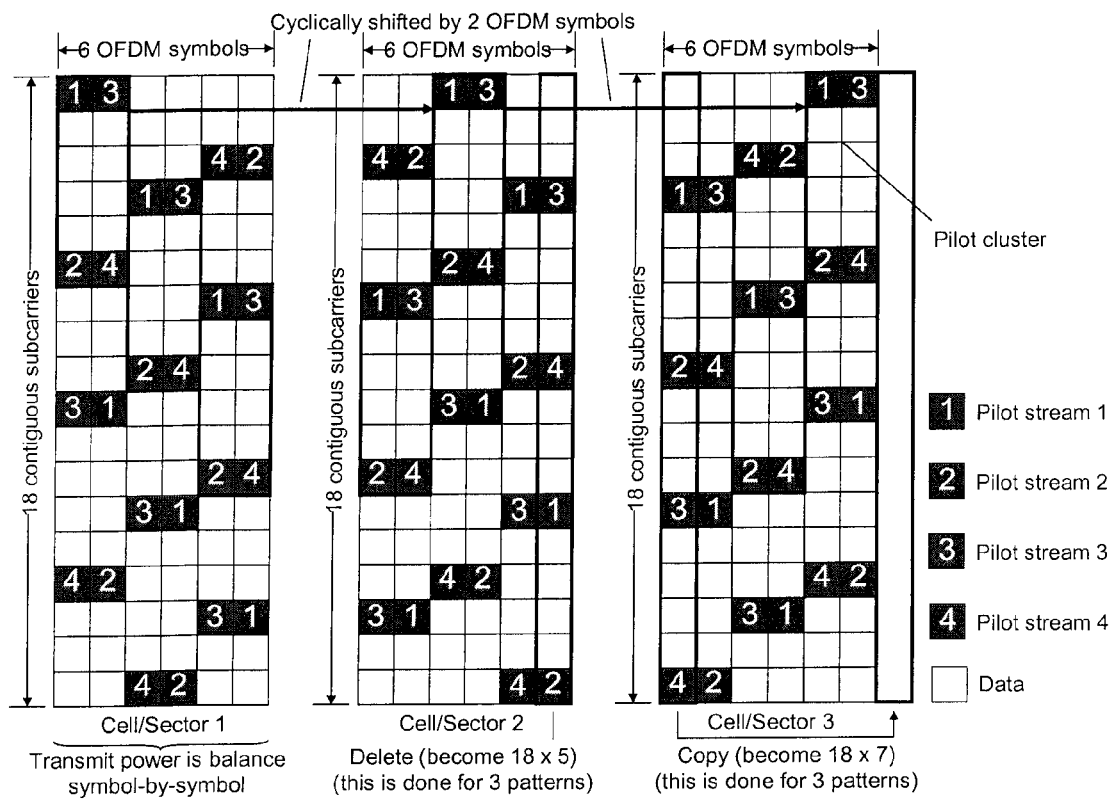
FIG. 22 illustrates another exemplary set of pilot structures consistent with embodiments of the present invention.

FIG. 21 and FIG. 22 illustrate exemplary set of pilot structures designed for a base station or base stations using a 4-stream 3 sector/cell configuration, as well as exemplary steps for creating these unified pilot structures for different RU sizes. As shown in FIG. 21 and FIG. 22, an RU size of 18×6 is used, and four types of pilot symbols (pilot 1, pilot 2, pilot 3, and pilot 4) are inserted in the 18×6 RU.

Further, in FIG. 21, a pilot cluster size of 3×2 (3×1 in a 2-stream configuration, not shown) is used, and columns in the lower half of the pilot clusters (shown as un-framed pilot clusters in RUs for Sector/Cell 1, Sector/Cell 2, and Sector/Cell 3) with an RU are interchanged. In FIG. 22, a pilot cluster size of 6×2 (6×1 in a 2-stream configuration, not shown) is used, and columns in half of the pilot clusters (shown as un-framed pilot clusters in RUs for Sector/Cell 1, Sector/Cell 2, and Sector/Cell 3) with an RU are interchanged. Similar to the configurations shown in FIG. 20, rules 4-8 are satisfied for the configurations shown in FIG. 21 and FIG. 22.

Figure 23:
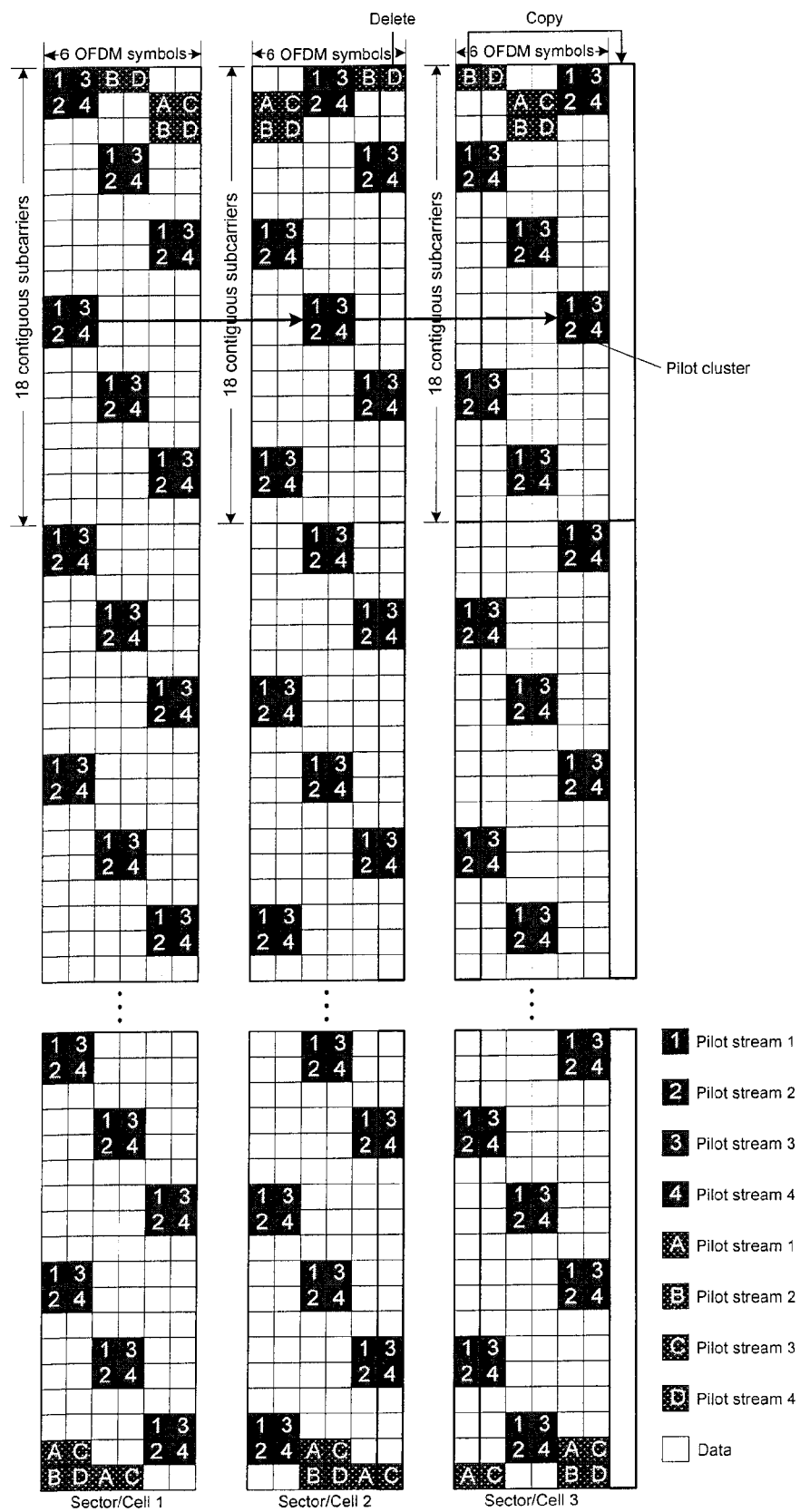
FIG. 23 illustrates an exemplary set of pilot structures consistent with embodiments of the present invention.

FIG. 23 illustrates an exemplary set of pilot structures designed for a base station or base stations using a 4-stream 3 sector/cell configuration based on contiguous RUs, as well as exemplary steps for creating these unified pilot structures for different RU sizes. Contiguous RUs, as used herein, may refer to a series of RUs used in a sequence by a sector or by a cell. For example, FIG. 23 shows contiguous RUs (each including a plurality of continuous RUs) for each of Sector/Cell 1, Sector/Cell 2, and Sector/Cell 3.

As shown in FIG. 23, an RU size of 18×6 is used and four types of pilot symbols (pilot 1, pilot 2, pilot 3, and pilot 4) are inserted in the plurality of contiguous 18×6 RUs. Four types of pilot symbols (pilot A, pilot B, pilot C, and pilot D) are also used at the boundaries of the contiguous RUs. Pilot A may be the same pattern as or different pattern from pilot 1; Pilot B may be the same pattern as or different pattern from pilot 2; Pilot C may be the same pattern as or different pattern from pilot 3; and Pilot D may be the same pattern as or different pattern from pilot 4. As shown in FIG. 23, a pilot cluster size of 2×2 (2×1 in a 2-stream configuration, not shown) is used.

Operations on individual RUs of the plurality of contiguous RUs, e.g., pilot clustering, cyclically shifting, deleting, and/or copying, may be the same as those described in FIG. 17. Further, at the boundaries of the plurality of contiguous RUs, three clusters of pilot symbols (e.g., pilot A, pilot B, pilot C, and pilot D) are inserted. The inserted boundary pilot symbols may be used to avoid extrapolation for channel estimation to improve channel estimation accuracy (rule 3).

Also shown in FIG. 23, a pilot structure for a plurality of contiguous 18×5 RUs may be created by deleting the last OFDM symbol within a plurality of contiguous 18×6 RUs to create the 18×5 RU pilot structure. Further, a pilot structure for a plurality of contiguous 18×7 RUs may be created by copying the first OFDM symbol within a plurality of contiguous 18×6 RUs as the end OFDM symbol of the new 18×7 RUs to create the 18×7 RU pilot structure. Thus, rule 7 is satisfied. Other methods may also be used.

In FIG. 23 (and also FIGS. 24 and 25), the number of pilot symbols per stream is greater than six and the pilot overheads are thus larger than 5.56%, 11.11%, 16.67%, and 22.22% for single stream, 2-stream, 3-stream, and 4-stream configurations, respectively. Rule 3 is substantially satisfied because the pilot symbols are allocated near or at the RU boundaries. Rule 4 is partially satisfied because, although the pilot structures are interlaced for different sectors/cells, i.e., by shifting pilot clusters in time domain by, for example, 2 OFDM symbols, the boundary pilots are not shifted and pilot collision may occur on some of the boundary pilots. Rule 5 is satisfied because the pilot symbols are substantially evenly placed for each of the OFDM symbols. Rule 8 is partially satisfied because IPI may be induced after the boundary pilots being inserted.

Figure 24:
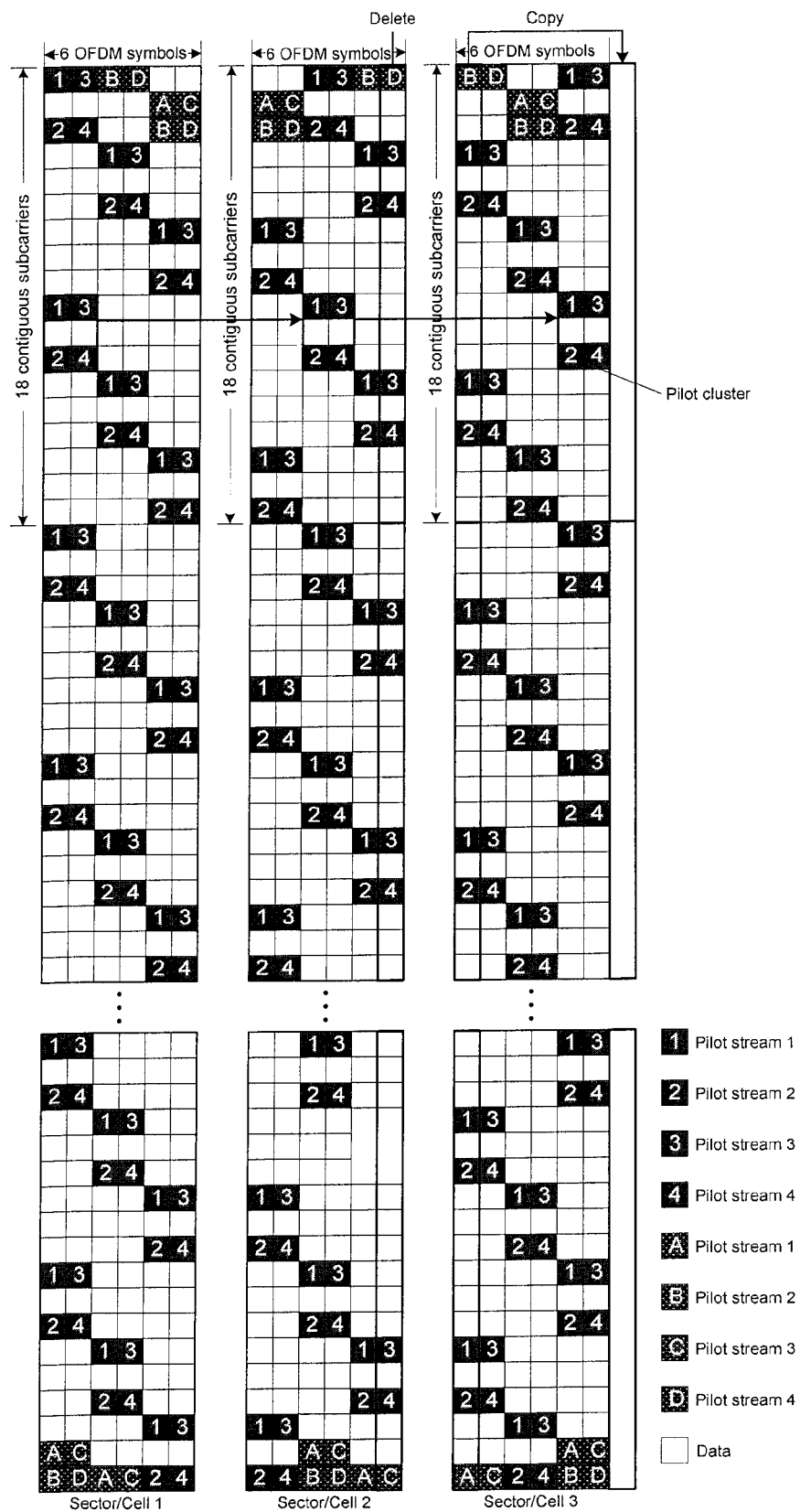
FIG. 24 illustrates another exemplary set of pilot structures consistent with embodiments of the present invention.

FIG. 24 illustrates another exemplary set of pilot structures designed for a base station or base stations using a 4-stream 3 sector/cell configuration based on contiguous RUs, as well as exemplary steps for creating these unified pilot structures for different RU sizes. As shown in FIG. 24, the set of pilot structures are the same as those shown in FIG. 23, except that a pilot cluster size of 3×2 (3×1 in a 2-stream configuration, not shown) is used.

Figure 25:
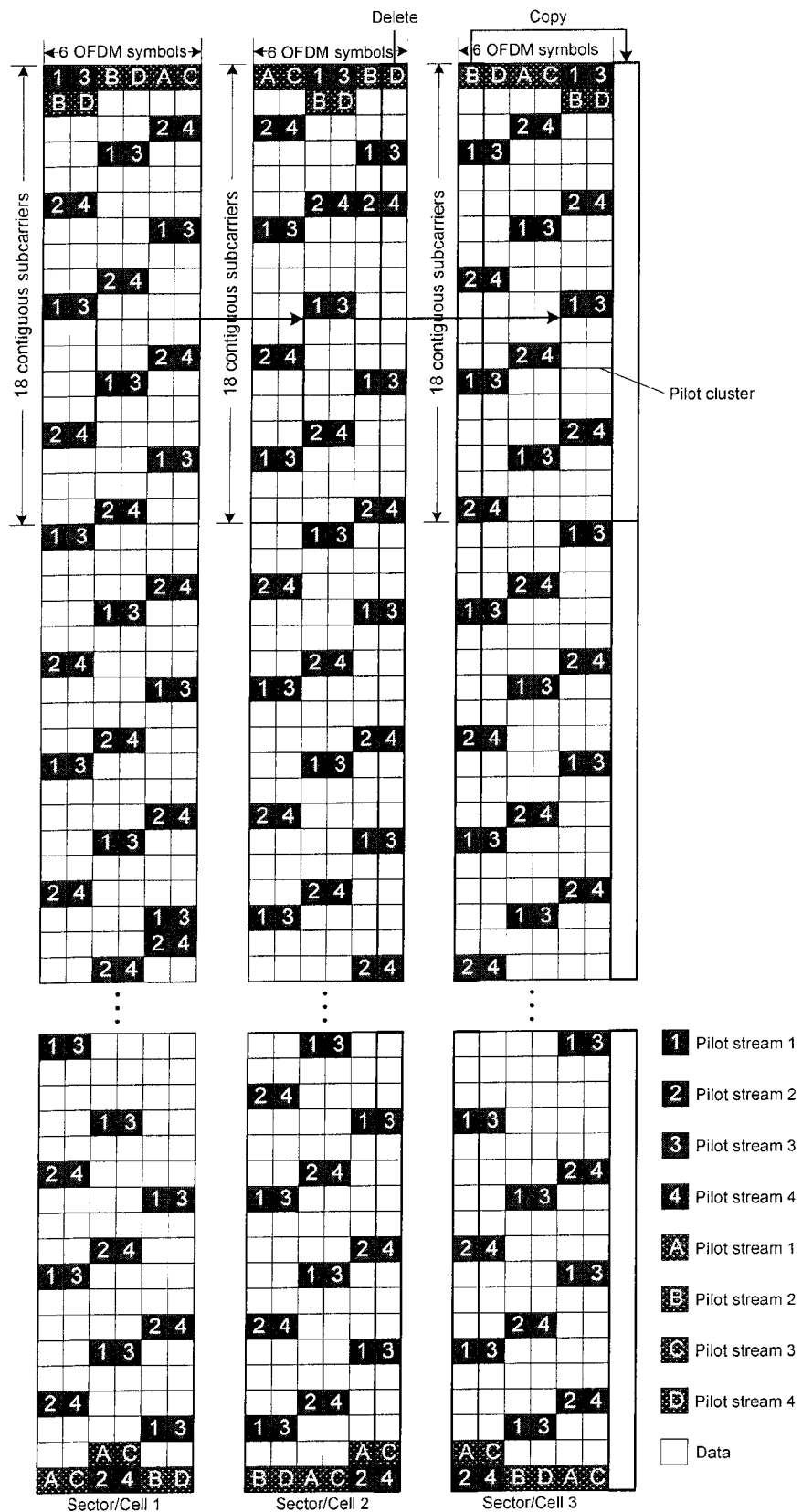
FIG. 25 illustrates another exemplary set of pilot structures consistent with embodiments of the present invention.

FIG. 25 illustrates another exemplary set of pilot structures designed for a base station or base stations using a 4-stream 3 sector/cell configuration based on contiguous RUs, as well as exemplary steps for creating these unified pilot structures for different RU sizes. As shown in FIG. 25, the set of pilot structures are the same as those shown in FIG. 23, except that a pilot cluster size of 6×2 (6×1 in a 2-stream configuration, not shown) is used.

Returning to FIG. 5, after evaluating the selected pilot rules to create a desired pilot structure or a set of pilot structures (step 508), processor 202 may use the desired pilot structure or a set of pilot structures in the radio communication (step 510). For example, processor 202 may cause transceiver 112 and/or transceiver 122 to insert the desired pilot structure or a set of pilot structures in the signals to be transmitted over various wireless communication channels and to remove the inserted desired pilot structure or a set of pilot structures in the signals received from the various wireless communication channels. The desired pilot structure or a set of pilot structures in the signals may be used to perform various operations to facilitate the wireless communication, such as performing time and frequency synchronization, measuring channel information, performing interference mitigation or cancellation, and/or providing time/frequency offset estimation, etc.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method used in a wireless communication apparatus based on reference signals, comprising:
    obtaining a plurality of pilot rules;
    obtaining radio channel information of a radio channel between the wireless communication apparatus and another wireless communication apparatus in an area including at least one cell and using one or more data streams;
    selecting applicable pilot rules from the plurality of pilot rules based on the radio channel information;
    creating at least one pilot structure to be used in the radio channel; and
    using the created at least one pilot structure to transmit data over the radio channel,
    wherein the plurality of pilot rules include:
        deleting a last OFDM symbol from a first resource unit including data symbols and pilot symbols to form pilot symbols for a second resource unit;
        duplicating a first OFDM symbol of the first resource unit and inserting an extra OFDM symbol behind the first resource unit to form pilot symbols for a third resource unit; and
        keeping a same pilot density for the first resource unit, the second resource unit, and the third resource unit to reduce power fluctuation.

2. The method according to claim 1, wherein the plurality of pilot rules include:
    including 6 pilot symbols in a transmission data stream within a regular 18×6 resource unit.

3. The method according to claim 1, wherein the plurality of pilot rules include:
    limiting a maximum pilot spacing to no more than 3 OFDM symbols in time domain and no more than 9 sub-carriers in frequency domain.

4. The method according to claim 1, wherein the plurality of pilot rules include:
    allocating pilot symbols or a set of pilot symbols near or at resource unit boundaries to avoid channel estimation extrapolation.

5. The method according to claim 1, wherein the plurality of pilot rules include:
    preserving an orthogonal property of pilot symbols used in each of sectors or cells; and
    interlacing the pilot symbols for each of the sectors or cells.

6. The method according to claim 5, wherein interlacing includes:
    cyclically shifting a pilot cluster of a pilot structure of a first sector/cell by a number of OFDM symbols and/or a number of subcarriers of the pilot cluster within at least one resource unit to form a pilot structure of a second sector/cell.

7. The method according to claim 1, wherein the plurality of pilot rules include:
    boosting power of pilot symbols to enhance channel estimation accuracy; and
    evenly placing the one or more streams and the pilot symbols within a resource unit.

8. The method according to claim 1, wherein the plurality of pilot rules include:
    boosting power of the pilot symbols to enhance channel estimation accuracy; and
    evenly allocating the pilot symbols on each of antennas.

9. The method according to claim 1, wherein
    the first resource unit is a resource unit with a size of 18×6;
    the second resource unit is a resource unit with a size of 18×5; and
    the third resource unit is a resource unit with a size of 18×7.

10. The method according to claim 1, wherein the plurality of pilot rules include:
    applying a staggered structure to pilot symbols located at a boundary of a resource unit.

11. The method according to claim 1, wherein the plurality of pilot rules include:
    making the number of pilot symbols on each OFDM symbol with an RU be power of two.

12. A wireless communication apparatus, comprising:
    at least one antenna;
    a transceiver configured to communicate with an external wireless communication apparatus through a radio channel between the wireless communication apparatus and the external wireless communication apparatus in an area including at least one cell or sector, using one or more data streams,
    wherein the transceiver uses at least one unified pilot structure provided to be used in the at least one cell or sector by the one or more data streams, and
    a processor obtains a plurality of pilot rules and selects applicable pilot rules from the plurality of pilot rules to create the at least one unified pilot structure
    wherein the plurality of pilot rules include:
        deleting a last OFDM symbol from a first resource unit including data symbols and pilot symbols to form pilot symbols for a second resource unit;
        duplicating a first OFDM symbol of the first resource unit and inserting an extra OFDM symbol behind the first resource unit to form pilot symbols for a third resource unit; and
        keeping a same pilot density for the first resource unit, the second resource unit, and the third resource unit to reduce power fluctuation.

13. The wireless communication apparatus according to claim 12, wherein, provided that columns represent OFDM symbols and rows represent sub-carriers; '1' represents pilot symbols for data stream 1; and '0' represents data symbols, the unified pilot structure for a first cell/sector, a second cell/sector, and a third cell/sector includes:

respectively.

14. The wireless communication apparatus according to claim 12, wherein, provided that columns represent OFDM symbols and rows represent sub-carriers; '1' represents pilot symbols for data stream 1; and '0' represents data symbols, the unified pilot structure for a first cell/sector, a second cell/sector, and a third cell/sector includes:

$$\begin{bmatrix} 1 & 0 & 0 & 1 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 1 & 0 \\ 0 & 0 & 0 & 0 & 0 & 0 \end{bmatrix}, \begin{bmatrix} 0 & 1 & 0 & 0 & 1 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & 0 & 1 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 1 \\ 0 & 0 & 0 & 0 & 0 & 0 \end{bmatrix}, \begin{bmatrix} 0 & 0 & 1 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 1 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & 0 & 1 & 0 & 0 \\ 0 & 0 & 0 & 0 & 0 & 0 \end{bmatrix}$$

respectively.

15. The wireless communication apparatus according to claim 12, wherein, provided that columns represent OFDM symbols and rows represent sub-carriers; '1' represents pilot symbols for data stream 1; and '0' represents data symbols, the unified pilot structure for a first cell/sector, a second cell/sector, and a third cell/sector includes:

$$\begin{bmatrix} 1 & 0 & 0 & 1 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 1 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 1 & 0 & 0 & 1 \\ 0 & 0 & 0 & 0 & 0 \end{bmatrix}, \begin{bmatrix} 0 & 1 & 0 & 0 & 1 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 1 & 0 & 0 & 1 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 1 & 0 & 0 \\ 0 & 0 & 0 & 0 & 0 \end{bmatrix}, \begin{bmatrix} 0 & 0 & 1 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 1 & 0 & 0 & 1 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 1 & 0 & 0 & 1 & 0 \\ 0 & 0 & 0 & 0 & 0 \end{bmatrix}$$

respectively.

16. The wireless communication apparatus according to claim 12, wherein, provided that columns represent OFDM symbols and rows represent sub-carriers; '1' represents pilot symbols for data stream 1; '2' represents pilot symbols for data stream 2; and '0' represents data symbols, the unified pilot structure for a first cell/sector, a second cell/sector, and a third cell/sector includes:

$$\begin{bmatrix} 1 & 0 & 0 & 1 & 0 & 0 & 1 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 1 & 0 & 0 & 1 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 1 & 0 & 0 & 1 & 0 & 0 \\ 0 & 0 & 0 & 0 & 0 & 0 & 0 \end{bmatrix}, \begin{bmatrix} 0 & 1 & 0 & 0 & 1 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 0 & 0 & 1 & 0 & 0 & 1 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 1 & 0 & 0 & 1 & 0 \\ 0 & 0 & 0 & 0 & 0 & 0 & 0 \end{bmatrix}, \begin{bmatrix} 0 & 0 & 1 & 0 & 0 & 1 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 1 & 0 & 0 & 1 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 0 & 0 & 1 & 0 & 0 & 1 \\ 0 & 0 & 0 & 0 & 0 & 0 & 0 \end{bmatrix}$$

respectively.

17. The wireless communication apparatus according to claim 12, wherein, provided that columns represent OFDM symbols and rows represent sub-carriers; '1' represents pilot symbols for data stream 1; '2' represents pilot symbols for data stream 2; and '0' represents data symbols, the unified pilot structure for a first cell/sector, a second cell/sector, and a third cell/sector includes:

$$\begin{bmatrix} 1 & 0 & 0 & 1 & 0 & 0 \\ 2 & 0 & 0 & 2 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 1 \\ 0 & 0 & 2 & 0 & 0 & 2 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 1 & 0 \\ 0 & 2 & 0 & 0 & 2 & 0 \end{bmatrix}, \begin{bmatrix} 0 & 1 & 0 & 0 & 1 & 0 \\ 0 & 2 & 0 & 0 & 2 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & 0 & 1 & 0 & 0 \\ 2 & 0 & 0 & 2 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 1 \\ 0 & 0 & 2 & 0 & 0 & 2 \end{bmatrix}, \begin{bmatrix} 0 & 0 & 1 & 0 & 0 & 1 \\ 0 & 0 & 2 & 0 & 0 & 2 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 1 & 0 \\ 0 & 2 & 0 & 0 & 2 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & 0 & 1 & 0 & 0 \\ 2 & 0 & 0 & 2 & 0 & 0 \end{bmatrix}$$

respectively.

$$\begin{bmatrix} 1 & 0 & 0 & 1 & 0 \\ 2 & 0 & 0 & 2 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 1 & 0 & 0 \\ 0 & 0 & 2 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 1 & 0 & 0 & 1 \\ 0 & 2 & 0 & 0 & 2 \end{bmatrix}, \begin{bmatrix} 0 & 1 & 0 & 0 & 1 \\ 0 & 2 & 0 & 0 & 2 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 1 & 0 & 0 & 1 & 0 \\ 2 & 0 & 0 & 2 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 1 & 0 & 0 \\ 0 & 0 & 2 & 0 & 0 \end{bmatrix}, \begin{bmatrix} 0 & 0 & 1 & 0 & 0 \\ 0 & 0 & 2 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 1 & 0 & 0 & 1 \\ 0 & 2 & 0 & 0 & 2 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 1 & 0 & 0 & 1 & 0 \\ 2 & 0 & 0 & 2 & 0 \end{bmatrix},$$

respectively.

18. The wireless communication apparatus according to claim 12, wherein, provided that columns represent OFDM symbols and rows represent sub-carriers; '1' represents pilot symbols for data stream 1; '2' represents pilot symbols for data stream 2; and '0' represents data symbols, the unified pilot structure for a first cell/sector, a second cell/sector, and a third cell/sector includes:

$$\begin{bmatrix} 1 & 0 & 0 & 1 & 0 & 0 & 1 \\ 2 & 0 & 0 & 2 & 0 & 0 & 2 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 1 & 0 & 0 & 1 & 0 \\ 0 & 0 & 2 & 0 & 0 & 2 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 1 & 0 & 0 & 1 & 0 & 0 \\ 0 & 2 & 0 & 0 & 2 & 0 & 0 \end{bmatrix}, \begin{bmatrix} 0 & 1 & 0 & 0 & 1 & 0 & 0 \\ 0 & 2 & 0 & 0 & 2 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 0 & 0 & 1 & 0 & 0 & 1 \\ 2 & 0 & 0 & 2 & 0 & 0 & 2 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 1 & 0 & 0 & 1 & 0 \\ 0 & 0 & 2 & 0 & 0 & 2 & 0 \end{bmatrix}, \begin{bmatrix} 0 & 0 & 1 & 0 & 0 & 1 & 0 \\ 0 & 0 & 2 & 0 & 0 & 2 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 1 & 0 & 0 & 1 & 0 & 0 \\ 0 & 2 & 0 & 0 & 2 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 0 & 0 & 1 & 0 & 0 & 1 \\ 2 & 0 & 0 & 2 & 0 & 0 & 2 \end{bmatrix},$$

respectively.

19. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; and '0' represents data symbols, the unified pilot structure for all cells or sectors includes:

$$\begin{bmatrix} 1 & 0 & 0 & 0 & 1 & 3 \\ 2 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 0 & 0 & 0 & 2 & 0 \\ 0 & 0 & 0 & 0 & 0 & 0 \\ 1 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 3 & 0 \\ 0 & 2 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 0 & 0 & 0 & 0 & 1 \\ 0 & 0 & 0 & 0 & 0 & 2 \end{bmatrix}.$$

20. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; and '0' represents data symbols, the unified pilot structure for all cells or sectors includes:

$$\begin{bmatrix} 1 & 0 & 0 & 0 & 3 \\ 2 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 3 & 0 & 1 & 0 \\ 0 & 0 & 0 & 2 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 1 & 0 & 3 & 0 \\ 0 & 2 & 0 & 0 & 0 \\ 0 & 0 & 0 & 0 & 0 \\ 0 & 0 & 0 & 0 & 0 \\ 0 & 0 & 0 & 0 & 0 \\ 3 & 0 & 0 & 0 & 1 \\ 0 & 0 & 0 & 0 & 2 \end{bmatrix}.$$

21. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; and '0' represents data symbols, the unified pilot structure for all cells or sectors includes:

$$\begin{vmatrix} 1 & 0 & 0 & 0 & 0 & 3 & 0 \\ 2 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 3 & 0 & 0 & 1 & 0 & 0 \\ 0 & 0 & 0 & 0 & 2 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 1 & 0 & 0 & 3 & 0 & 0 \\ 0 & 2 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 3 & 0 & 0 & 0 & 0 & 1 & 0 \\ 0 & 0 & 0 & 0 & 0 & 2 & 0 \end{vmatrix}.$$

$$\begin{vmatrix} 1 & 0 & 0 & 0 & 3 \\ 2 & 0 & 0 & 0 & 4 \\ 0 & 0 & 0 & 0 & 0 \\ 0 & 0 & 0 & 0 & 0 \\ 0 & 0 & 0 & 0 & 0 \\ 0 & 3 & 0 & 1 & 0 \\ 0 & 4 & 0 & 2 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 1 & 0 & 3 & 0 \\ 0 & 2 & 0 & 4 & 0 \\ 0 & 0 & 0 & 0 & 0 \\ 0 & 0 & 0 & 0 & 0 \\ 0 & 0 & 0 & 0 & 0 \\ 3 & 0 & 0 & 0 & 1 \\ 4 & 0 & 0 & 0 & 2 \end{vmatrix}.$$

22. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; '4' represents pilot symbols for data stream 4; and '0' represents data symbols, the unified pilot structure for all cells or sectors includes:

24. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; '4' represents pilot symbols for data stream 4; and '0' represents data symbols, the unified pilot structure for all cells or sectors includes:

$$\begin{vmatrix} 1 & 0 & 0 & 0 & 3 \\ 2 & 0 & 0 & 0 & 4 \\ 0 & 0 & 0 & 0 & 0 \\ 0 & 0 & 0 & 0 & 0 \\ 0 & 0 & 0 & 0 & 0 \\ 0 & 3 & 0 & 0 & 1 & 0 \\ 0 & 4 & 0 & 0 & 2 & 0 \\ 0 & 0 & 0 & 0 & 0 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 1 & 0 & 0 & 3 & 0 \\ 0 & 2 & 0 & 0 & 4 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 1 & 0 & 0 & 0 & 1 \\ 4 & 0 & 0 & 0 & 0 & 2 \end{vmatrix}.$$

$$\begin{vmatrix} 1 & 0 & 0 & 0 & 3 & 0 \\ 2 & 0 & 0 & 0 & 4 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 & 0 \\ 0 & 4 & 0 & 0 & 2 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 1 & 0 & 0 & 3 & 0 & 0 \\ 0 & 2 & 0 & 0 & 4 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 3 & 0 & 0 & 0 & 0 & 1 & 0 \\ 4 & 0 & 0 & 0 & 0 & 2 & 0 \end{vmatrix}.$$

23. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; '4' represents pilot symbols for data stream 4; and '0' represents data symbols, the unified pilot structure for all cells or sectors includes:

25. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; and '0' represents data symbols, the unified pilot structure for a first cell/sector, a second cell/sector, and a third cell/sector includes:

$$\begin{vmatrix} 1&0&0&3&0&0 \\ 2&0&0&0&0&0 \\ 0&0&0&0&0&0 \\ 0&0&0&0&0&0 \\ 0&0&0&0&0&0 \\ 3&0&0&1&0&0 \\ 0&0&0&2&0&0 \\ 0&0&0&0&0&0 \\ 0&0&0&0&0&0 \\ 0&0&0&0&0&0 \\ 0&0&0&0&0&0 \\ 0&1&0&0&3&0 \\ 0&2&0&0&0&0 \\ 0&0&0&0&0&0 \\ 0&0&0&0&0&0 \\ 0&0&0&0&0&0 \\ 0&3&0&0&1&0 \\ 0&0&0&0&2&0 \end{vmatrix}, \begin{vmatrix} 0&1&0&0&3&0 \\ 0&2&0&0&0&0 \\ 0&0&0&0&0&0 \\ 0&0&0&0&0&0 \\ 0&0&0&0&0&0 \\ 0&3&0&0&1&0 \\ 0&0&0&0&2&0 \\ 0&0&0&0&0&0 \\ 0&0&0&0&0&0 \\ 0&0&0&0&0&0 \\ 0&0&0&0&0&0 \\ 0&0&1&0&0&3 \\ 0&0&2&0&0&0 \\ 0&0&0&0&0&0 \\ 0&0&0&0&0&0 \\ 0&0&0&0&0&0 \\ 0&0&3&0&0&1 \\ 0&0&0&0&0&2 \end{vmatrix}, \begin{vmatrix} 0&0&1&0&0&3 \\ 0&0&2&0&0&0 \\ 0&0&0&0&0&0 \\ 0&0&0&0&0&0 \\ 0&0&0&0&0&0 \\ 0&0&3&0&0&1 \\ 0&0&0&0&0&2 \\ 0&0&0&0&0&0 \\ 0&0&0&0&0&0 \\ 0&0&0&0&0&0 \\ 0&0&0&0&0&0 \\ 1&0&0&0&0&0 \\ 2&0&0&3&0&0 \\ 0&0&0&0&0&0 \\ 0&0&0&0&0&0 \\ 0&0&0&0&0&0 \\ 3&0&0&1&0&0 \\ 0&0&0&2&0&0 \end{vmatrix},$$

respectively.

26. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; '4' represents pilot symbols for data stream 4; and '0' represents data symbols, the unified pilot structure for a first cell/sector, a second cell/sector, and a third cell/sector includes:

$$\begin{vmatrix} 1&0&0&3&0&0 \\ 2&0&0&4&0&0 \\ 0&0&0&0&0&0 \\ 0&0&0&0&0&0 \\ 0&0&0&0&0&0 \\ 3&0&0&1&0&0 \\ 4&0&0&2&0&0 \\ 0&0&0&0&0&0 \\ 0&0&0&0&0&0 \\ 0&0&0&0&0&0 \\ 0&0&0&0&0&0 \\ 0&1&0&0&3&0 \\ 0&2&0&0&4&0 \\ 0&0&0&0&0&0 \\ 0&0&0&0&0&0 \\ 0&0&0&0&0&0 \\ 0&3&0&0&1&0 \\ 0&4&0&0&2&0 \end{vmatrix}, \begin{vmatrix} 0&1&0&0&3&0 \\ 0&2&0&0&4&0 \\ 0&0&0&0&0&0 \\ 0&0&0&0&0&0 \\ 0&0&0&0&0&0 \\ 0&3&0&0&1&0 \\ 0&4&0&0&2&0 \\ 0&0&0&0&0&0 \\ 0&0&0&0&0&0 \\ 0&0&0&0&0&0 \\ 0&0&0&0&0&0 \\ 0&0&1&0&0&3 \\ 0&0&2&0&0&4 \\ 0&0&0&0&0&0 \\ 0&0&0&0&0&0 \\ 0&0&0&0&0&0 \\ 0&0&3&0&0&1 \\ 0&0&4&0&0&2 \end{vmatrix}, \begin{vmatrix} 0&0&1&0&0&3 \\ 0&0&2&0&0&4 \\ 0&0&0&0&0&0 \\ 0&0&0&0&0&0 \\ 0&0&0&0&0&0 \\ 0&0&3&0&0&1 \\ 0&0&4&0&0&2 \\ 0&0&0&0&0&0 \\ 0&0&0&0&0&0 \\ 0&0&0&0&0&0 \\ 0&0&0&0&0&0 \\ 1&0&0&0&0&0 \\ 2&0&0&3&0&0 \\ 0&0&0&0&0&0 \\ 0&0&0&0&0&0 \\ 0&0&0&0&0&0 \\ 3&0&0&1&0&0 \\ 4&0&0&2&0&0 \end{vmatrix},$$

respectively.

27. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; and '0' represents data symbols, the unified pilot structure for a first cell/sector, a second cell/sector, and a third cell/sector includes:

$$\begin{vmatrix} 0&0&0&3&0 \\ 0&0&0&0&0 \\ 0&0&0&0&0 \\ 0&0&0&0&0 \\ 0&0&0&0&0 \\ 0&0&0&1&0 \\ 0&0&0&2&0 \\ 0&0&0&0&0 \\ 0&0&0&0&0 \\ 0&0&0&0&0 \\ 0&0&0&0&0 \\ 0&1&0&0&3 \\ 0&2&0&0&0 \\ 0&0&0&0&0 \\ 0&0&0&0&0 \\ 0&0&0&0&0 \\ 0&3&0&0&1 \\ 0&0&0&0&2 \end{vmatrix}, \begin{vmatrix} 0&1&0&0&3 \\ 0&2&0&0&0 \\ 0&0&0&0&0 \\ 0&0&0&0&0 \\ 0&0&0&0&0 \\ 0&3&0&0&1 \\ 0&0&0&0&2 \\ 0&0&0&0&0 \\ 0&0&0&0&0 \\ 0&0&0&0&0 \\ 0&0&0&0&0 \\ 0&0&1&0&0 \\ 0&0&2&0&0 \\ 0&0&0&0&0 \\ 0&0&0&0&0 \\ 0&0&0&0&0 \\ 0&0&3&0&0 \\ 0&0&0&0&0 \end{vmatrix}, \begin{vmatrix} 0&0&1&0&0 \\ 0&0&2&0&0 \\ 0&0&0&0&0 \\ 0&0&0&0&0 \\ 0&0&0&0&0 \\ 0&0&3&0&0 \\ 0&0&0&0&0 \\ 0&0&0&0&0 \\ 0&0&0&0&0 \\ 0&0&0&0&0 \\ 0&0&0&0&0 \\ 1&0&0&3&0 \\ 2&0&0&0&0 \\ 0&0&0&0&0 \\ 0&0&0&0&0 \\ 0&0&0&0&0 \\ 3&0&0&1&0 \\ 0&0&0&2&0 \end{vmatrix},$$

respectively.

28. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; '4' represents pilot symbols for data stream 4; and '0' represents data symbols, the unified pilot structure for a first cell/sector, a second cell/sector, and a third cell/sector includes:

$$\begin{vmatrix} 0&0&0&3&0 \\ 0&0&0&4&0 \\ 0&0&0&0&0 \\ 0&0&0&0&0 \\ 0&0&0&0&0 \\ 0&0&0&1&0 \\ 0&0&0&2&0 \\ 0&0&0&0&0 \\ 0&0&0&0&0 \\ 0&0&0&0&0 \\ 0&0&0&0&0 \\ 0&1&0&0&3 \\ 0&2&0&0&4 \\ 0&0&0&0&0 \\ 0&0&0&0&0 \\ 0&0&0&0&0 \\ 0&3&0&0&1 \\ 0&4&0&0&2 \end{vmatrix}, \begin{vmatrix} 0&1&0&0&3 \\ 0&2&0&0&4 \\ 0&0&0&0&0 \\ 0&0&0&0&0 \\ 0&0&0&0&0 \\ 0&3&0&0&1 \\ 0&4&0&0&2 \\ 0&0&0&0&0 \\ 0&0&0&0&0 \\ 0&0&0&0&0 \\ 0&0&0&0&0 \\ 0&0&1&0&0 \\ 0&0&2&0&0 \\ 0&0&0&0&0 \\ 0&0&0&0&0 \\ 0&0&0&0&0 \\ 0&0&3&0&0 \\ 0&0&4&0&0 \end{vmatrix}, \begin{vmatrix} 0&0&1&0&0 \\ 0&0&2&0&0 \\ 0&0&0&0&0 \\ 0&0&0&0&0 \\ 0&0&0&0&0 \\ 0&0&3&0&0 \\ 0&0&4&0&0 \\ 0&0&0&0&0 \\ 0&0&0&0&0 \\ 0&0&0&0&0 \\ 0&0&0&0&0 \\ 1&0&0&3&0 \\ 2&0&0&4&0 \\ 0&0&0&0&0 \\ 0&0&0&0&0 \\ 0&0&0&0&0 \\ 3&0&0&1&0 \\ 4&0&0&2&0 \end{vmatrix},$$

respectively.

29. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; and '0' represents data symbols, the unified pilot structure for a first cell/sector, a second cell/sector, and a third cell/sector includes:

$$\begin{vmatrix} 0 & 0 & 0 & 3 & 0 & 0 & 1 \\ 0 & 0 & 0 & 0 & 0 & 0 & 2 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 1 & 0 & 0 & 3 \\ 0 & 0 & 0 & 2 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 1 & 0 & 0 & 3 & 0 & 0 \\ 0 & 2 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 3 & 0 & 0 & 1 & 0 & 0 \\ 0 & 0 & 0 & 0 & 2 & 0 & 0 \end{vmatrix}, \begin{vmatrix} 0 & 1 & 0 & 0 & 3 & 0 & 0 \\ 0 & 2 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 3 & 0 & 0 & 1 & 0 & 0 \\ 0 & 0 & 0 & 0 & 2 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 1 & 0 & 0 & 0 & 0 \\ 0 & 0 & 2 & 0 & 0 & 3 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 3 & 0 & 0 & 1 & 0 \\ 0 & 0 & 0 & 0 & 0 & 2 & 0 \end{vmatrix}, \begin{vmatrix} 0 & 0 & 1 & 0 & 0 & 3 & 0 \\ 0 & 0 & 2 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 3 & 0 & 0 & 1 & 0 \\ 0 & 0 & 0 & 0 & 0 & 2 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 0 & 0 & 3 & 0 & 0 & 0 \\ 2 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 3 & 0 & 0 & 1 & 0 & 0 & 0 \\ 0 & 0 & 0 & 2 & 0 & 0 & 0 \end{vmatrix},$$

respectively.

30. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; '4' represents pilot symbols for data stream 4; and '0' represents data symbols, the unified pilot structure for a first cell/sector, a second cell/sector, and a third cell/sector includes:

$$\begin{vmatrix} 0 & 0 & 0 & 3 & 0 & 0 & 1 \\ 0 & 0 & 0 & 4 & 0 & 0 & 2 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 1 & 0 & 0 & 3 \\ 0 & 0 & 0 & 2 & 0 & 0 & 4 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 1 & 0 & 0 & 3 & 0 & 0 \\ 0 & 2 & 0 & 0 & 4 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 3 & 0 & 0 & 1 & 0 & 0 \\ 0 & 4 & 0 & 0 & 2 & 0 & 0 \end{vmatrix}, \begin{vmatrix} 0 & 1 & 0 & 0 & 3 & 0 & 0 \\ 0 & 2 & 0 & 0 & 4 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 3 & 0 & 0 & 1 & 0 & 0 \\ 0 & 4 & 0 & 0 & 2 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 1 & 0 & 0 & 0 & 0 \\ 0 & 0 & 2 & 0 & 0 & 3 & 0 \\ 0 & 0 & 0 & 0 & 0 & 4 & 0 \\ 0 & 0 & 0 & 0 & 0 & 0 & 0 \\ 0 & 0 & 0 & 0 & 0 & 0 & 0 \\ 0 & 0 & 3 & 0 & 0 & 1 & 0 \\ 0 & 0 & 4 & 0 & 0 & 2 & 0 \end{vmatrix}, \begin{vmatrix} 0 & 0 & 1 & 0 & 0 & 3 & 0 \\ 0 & 0 & 2 & 0 & 0 & 4 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 3 & 0 & 0 & 1 & 0 \\ 0 & 0 & 4 & 0 & 0 & 2 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 0 & 0 & 3 & 0 & 0 & 0 \\ 2 & 0 & 0 & 4 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 3 & 0 & 0 & 1 & 0 & 1 & 0 \\ 4 & 0 & 0 & 2 & 0 & 2 & 0 \end{vmatrix},$$

respectively.

31. The wireless communication apparatus according to claim 12, wherein, provided that columns represent OFDM symbols and rows represent sub-carriers; '1' represents pilot symbols for data stream 1; and '0' represents data symbols, the unified pilot structure for a first cell/sector, a second cell/sector, and a third cell/sector includes:

$$\begin{vmatrix} 1 & 0 & 0 & 1 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 1 & 0 \\ 0 & 0 & 0 & 0 & 0 & 0 \end{vmatrix}, \begin{vmatrix} 0 & 1 & 0 & 0 & 1 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 1 \\ 0 & 0 & 0 & 0 & 0 & 0 \end{vmatrix}, \begin{vmatrix} 0 & 0 & 1 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & 0 & 1 & 0 & 0 \\ 0 & 0 & 0 & 0 & 0 & 0 \end{vmatrix},$$

respectively.

32. The wireless communication apparatus according to claim 12, wherein, provided that columns represent OFDM symbols and rows represent sub-carriers; '1' represents pilot symbols for data stream 1; '2' represents pilot symbols for data stream 2; and '0' represents data symbols, the unified pilot structure for a first cell/sector, a second cell/sector, and a third cell/sector includes:

$$\begin{vmatrix} 1 & 0 & 0 & 1 & 0 & 0 \\ 2 & 0 & 0 & 2 & 0 & 0 \\ 0 & 0 & 0 & 0 & 0 & 0 \\ 0 & 0 & 0 & 0 & 0 & 0 \\ 0 & 1 & 0 & 0 & 1 & 0 \\ 0 & 2 & 0 & 0 & 2 & 0 \end{vmatrix}, \begin{vmatrix} 0 & 1 & 0 & 0 & 1 & 0 \\ 0 & 2 & 0 & 0 & 2 & 0 \\ 0 & 0 & 0 & 0 & 0 & 0 \\ 0 & 0 & 0 & 0 & 0 & 0 \\ 0 & 0 & 1 & 0 & 0 & 1 \\ 0 & 0 & 2 & 0 & 0 & 2 \end{vmatrix}, \begin{vmatrix} 0 & 0 & 1 & 0 & 0 & 1 \\ 0 & 0 & 2 & 0 & 0 & 2 \\ 0 & 0 & 0 & 0 & 0 & 0 \\ 0 & 0 & 0 & 0 & 0 & 0 \\ 1 & 0 & 0 & 1 & 0 & 0 \\ 2 & 0 & 0 & 2 & 0 & 0 \end{vmatrix},$$

respectively.

33. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; and '0' represents data symbols, the unified pilot structure for a first cell/sector, a second cell/sector, and a third cell/sector includes:

$$\begin{vmatrix} 1 & 3 & 0 & 1 & 3 & 0 \\ 2 & 0 & 0 & 2 & 0 & 0 \\ 0 & 0 & 0 & 0 & 0 & 0 \\ 0 & 0 & 0 & 0 & 0 & 0 \\ 0 & 1 & 3 & 0 & 1 & 3 \\ 0 & 2 & 0 & 0 & 2 & 0 \end{vmatrix}, \begin{vmatrix} 0 & 1 & 3 & 0 & 1 & 3 \\ 0 & 2 & 0 & 0 & 2 & 0 \\ 0 & 0 & 0 & 0 & 0 & 0 \\ 0 & 0 & 0 & 0 & 0 & 0 \\ 3 & 0 & 1 & 3 & 0 & 1 \\ 0 & 0 & 2 & 0 & 0 & 2 \end{vmatrix}, \begin{vmatrix} 3 & 0 & 1 & 3 & 0 & 1 \\ 0 & 0 & 2 & 0 & 0 & 2 \\ 0 & 0 & 0 & 0 & 0 & 0 \\ 0 & 0 & 0 & 0 & 0 & 0 \\ 1 & 3 & 0 & 1 & 3 & 0 \\ 2 & 0 & 0 & 2 & 0 & 0 \end{vmatrix},$$

respectively.

34. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; '4' represents pilot symbols for data stream 4; and '0' represents data symbols, the unified pilot structure for a first cell/sector, a second cell/sector, and a third cell/sector includes:

$$\begin{vmatrix} 1 & 3 & 0 & 1 & 3 & 0 \\ 2 & 4 & 0 & 2 & 4 & 0 \\ 0 & 0 & 0 & 0 & 0 & 0 \\ 0 & 0 & 0 & 0 & 0 & 0 \\ 0 & 1 & 3 & 0 & 1 & 3 \\ 0 & 2 & 4 & 0 & 2 & 4 \end{vmatrix}, \begin{vmatrix} 0 & 1 & 3 & 0 & 1 & 3 \\ 0 & 2 & 4 & 0 & 2 & 4 \\ 0 & 0 & 0 & 0 & 0 & 0 \\ 0 & 0 & 0 & 0 & 0 & 0 \\ 3 & 0 & 1 & 3 & 0 & 1 \\ 4 & 0 & 2 & 4 & 0 & 2 \end{vmatrix}, \begin{vmatrix} 3 & 0 & 1 & 3 & 0 & 1 \\ 4 & 0 & 2 & 4 & 0 & 2 \\ 0 & 0 & 0 & 0 & 0 & 0 \\ 0 & 0 & 0 & 0 & 0 & 0 \\ 1 & 3 & 0 & 1 & 3 & 0 \\ 2 & 4 & 0 & 2 & 4 & 0 \end{vmatrix},$$

respectively.

35. The wireless communication apparatus according to claim 12, wherein, provided that columns represent OFDM symbols and rows represent sub-carriers; '1' represents pilot symbols for data stream 1; and '0' represents data symbols, the unified pilot structure for all cells or sectors includes:

$$\begin{vmatrix} 1 & 0 & 0 & 0 & 1 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 0 & 1 \\ 0 & 0 & 0 & 0 & 0 & 0 \end{vmatrix}.$$

36. The wireless communication apparatus according to claim 12, wherein, provided that columns represent OFDM symbols and rows represent sub-carriers; '1' represents pilot symbols for data stream 1; '2' represents pilot symbols for data stream 2; and '0' represents data symbols, the unified pilot structure for all cells or sectors includes:

$$\begin{vmatrix} 1 & 0 & 0 & 0 & 1 & 0 \\ 2 & 0 & 0 & 0 & 2 & 0 \\ 0 & 0 & 0 & 0 & 0 & 0 \\ 0 & 0 & 0 & 0 & 0 & 0 \\ 0 & 1 & 0 & 0 & 0 & 1 \\ 0 & 2 & 0 & 0 & 0 & 2 \end{vmatrix}.$$

37. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; and '0' represents data symbols, the unified pilot structure for all cells or sectors includes:

$$\begin{vmatrix} 1 & 3 & 0 & 0 & 1 & 3 \\ 2 & 0 & 0 & 0 & 2 & 0 \\ 0 & 0 & 0 & 0 & 0 & 0 \\ 0 & 0 & 0 & 0 & 0 & 0 \\ 3 & 1 & 0 & 0 & 3 & 1 \\ 0 & 2 & 0 & 0 & 0 & 2 \end{vmatrix}.$$

38. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; '4' represents pilot symbols for data stream 4; and '0' represents data symbols, the unified pilot structure for all cells or sectors includes:

$$\begin{vmatrix} 1 & 3 & 0 & 0 & 1 & 3 \\ 2 & 4 & 0 & 0 & 2 & 4 \\ 0 & 0 & 0 & 0 & 0 & 0 \\ 0 & 0 & 0 & 0 & 0 & 0 \\ 3 & 1 & 0 & 0 & 3 & 1 \\ 4 & 2 & 0 & 0 & 4 & 2 \end{vmatrix}.$$

39. The wireless communication apparatus according to claim 12, wherein, provided that columns represent OFDM symbols and rows represent sub-carriers; '1' represents pilot symbols for data stream 1; and '0' represents data symbols, the unified pilot structure for all cells or sectors includes:

$$\begin{vmatrix} 1 & 0 & 0 & 1 & 0 \\ 0 & 0 & 0 & 0 & 0 \\ 0 & 0 & 0 & 0 & 0 \\ 0 & 0 & 0 & 0 & 0 \\ 0 & 1 & 0 & 0 & 1 \\ 0 & 0 & 0 & 0 & 0 \end{vmatrix}.$$

40. The wireless communication apparatus according to claim 12, wherein, provided that columns represent OFDM symbols and rows represent sub-carriers; '1' represents pilot symbols for data stream 1; '2' represents pilot symbols for data stream 2; and '0' represents data symbols, the unified pilot structure for all cells or sectors includes:

$$\begin{vmatrix} 1 & 0 & 0 & 1 & 0 \\ 2 & 0 & 0 & 2 & 0 \\ 0 & 0 & 0 & 0 & 0 \\ 0 & 0 & 0 & 0 & 0 \\ 0 & 1 & 0 & 0 & 1 \\ 0 & 2 & 0 & 0 & 2 \end{vmatrix}.$$

41. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; and '0' represents data symbols, the unified pilot structure for all cells or sectors includes:

$$\begin{vmatrix} 1 & 3 & 0 & 1 & 3 \\ 2 & 0 & 0 & 2 & 0 \\ 0 & 0 & 0 & 0 & 0 \\ 0 & 0 & 0 & 0 & 0 \\ 3 & 1 & 0 & 3 & 1 \\ 0 & 2 & 0 & 0 & 2 \end{vmatrix}.$$

42. The wireless communication apparatus according to claim 12, wherein, provided that columns represent OFDM symbols and rows represent sub-carriers; '1' represents pilot symbols for data stream 1; '2' represents pilot symbols for data stream 2; '3' represents pilot symbols for data stream 3; '4' represents pilot symbols for data stream 4; and '0' represents data symbols, the unified pilot structure for all cells or sectors includes:

$$\begin{vmatrix} 1 & 3 & 0 & 1 & 3 \\ 2 & 4 & 0 & 2 & 4 \\ 0 & 0 & 0 & 0 & 0 \\ 0 & 0 & 0 & 0 & 0 \\ 3 & 1 & 0 & 3 & 1 \\ 4 & 2 & 0 & 4 & 2 \end{vmatrix}.$$

* * * * *

UNITED STATES PATENT AND TRADEMARK OFFICE
CERTIFICATE OF CORRECTION

| | | |
|---|---|---|
| PATENT NO. | : 8,488,693 B2 | |
| APPLICATION NO. | : 12/406394 | |
| DATED | : July 16, 2013 | |
| INVENTOR(S) | : Ho et al. | |

It is certified that error appears in the above-identified patent and that said Letters Patent is hereby corrected as shown below:

In the Claims:

Claim 26, Col. 37, Table Column 16, Table Row 14, "0" should read as --4--.

Signed and Sealed this
Nineteenth Day of November, 2013

Teresa Stanek Rea
*Deputy Director of the United States Patent and Trademark Office*

UNITED STATES PATENT AND TRADEMARK OFFICE
CERTIFICATE OF CORRECTION

Page 1 of 8

PATENT NO. : 8,488,693 B2
APPLICATION NO. : 12/406394
DATED : July 16, 2013
INVENTOR(S) : Chung-Lien Ho et al.

It is certified that error appears in the above-identified patent and that said Letters Patent is hereby corrected as shown below:

In Column 14, correct the numbers in the chart at lines 40-59, as identified by the circles below, as follows:

| | | | | | | | | | | | |
|---|---|---|---|---|---|---|---|---|---|---|---|
| 1 | 0 | 0 | 0 | 0 | 3 | 1 | 0 | 0 | 0 | ⓪ | 3 |
| 2 | 0 | 0 | 0 | 0 | 4 | 2 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 3 | 0 | 0 | 1 | 0 | 0 | 3 | 0 | 0 | 1 | 0 |
| 0 | 4 | 0 | 0 | 2 | 0 | 0 | 0 | 0 | 0 | 2 | 0 |
| 0 | 0 | 0 | 0 | 0 | 0 | 0 | 0 | 0 | 0 | 0 | 0 |
| 0 | 0 | 0 | 0 | 0 | ⓪ | 1 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 1 | 0 | 0 | 3 | 0 | 0 | 1 | 0 | 0 | 3 | 0 |
| 0 | 2 | 0 | 0 | 4 | 0 | 0 | 2 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 3 | ⓪ | 0 | 0 | 0 | 1 | 3 | 0 | 0 | 0 | 0 | 1 |
| 4 | 0 | 0 | 0 | 0 | 2 | 0 | 0 | 0 | 0 | 0 | 2 |

Signed and Sealed this
Fifth Day of January, 2016

Michelle K. Lee
*Director of the United States Patent and Trademark Office*

CERTIFICATE OF CORRECTION (continued)
U.S. Pat. No. 8,488,693 B2

In Column 16, correct the numbers in the chart at lines 1-21, as identified by the circles below, as follows:

| | | | | | | | | | | | | | | | | | |
|---|---|---|---|---|---|---|---|---|---|---|---|---|---|---|---|---|---|
| 1 | 0 | 0 | 3 | 0 | 0 | 0 | 1 | 0 | 0 | 3 | 0 | 0 | 0 | 1 | 0 | 0 | 3 |
| 2 | 0 | 0 | 4 | 0 | 0 | 0 | 2 | 0 | 0 | 4 | 0 | 0 | 0 | 2 | 0 | 0 | 4 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 3 | 0 | 0 | 1 | 0 | 0 | 0 | 3 | 0 | 0 | 1 | 0 | 0 | 0 | 3 | 0 | 0 | 1 |
| 4 | 0 | 0 | 2 | 0 | 0 | 0 | 4 | 0 | 0 | 2 | 0 | 0 | 0 | 4 | 0 | 0 | 2 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 3 | 0 | 0 | 0 | 1 | 0 | 0 | 3 | 1 | 0 | 0 | (0) | 0 | 0 | → 3
| 0 | 2 | 0 | 0 | 4 | 0 | 0 | 0 | 2 | 0 | 0 | 4 | 2 | 0 | 0 | (3) | 0 | 0 | → 4
| 0 | 0 | 0 | 0 | 0 | 0 | 0 | 0 | 0 | 0 | 0 | 0 | 0 | 0 | 0 | (4) | 0 | 0 | → 0
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 3 | 0 | 0 | 1 | 0 | 0 | 0 | 3 | 0 | 0 | 1 | 3 | 0 | 0 | 1 | 0 | 0 |
| 0 | 4 | 0 | 0 | 2 | 0 | 0 | 0 | 4 | 0 | 0 | 2 | (0) | (4) | 0 | 2 | 0 | 0 |

4↗   ↘0

In Column 16, correct the numbers in the chart at lines 29-48, as identified by the circles below, as follows:

| | | | | | | | | | | | | | | | | | |
|---|---|---|---|---|---|---|---|---|---|---|---|---|---|---|---|---|---|
| 1 | 0 | 0 | 3 | 0 | 0 | 0 | 1 | 0 | 0 | 3 | 0 | 0 | 0 | 1 | 0 | 0 | 3 |
| 2 | 0 | 0 | 0 | 0 | 0 | 0 | 2 | 0 | 0 | 0 | 0 | 0 | 0 | 2 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 3 | 0 | 0 | 1 | 0 | 0 | 0 | 3 | 0 | 0 | 1 | 0 | 0 | 0 | 3 | 0 | 0 | 1 |
| 0 | 0 | 0 | 2 | 0 | 0 | 0 | 0 | 0 | 0 | 2 | 0 | 0 | 0 | 0 | 0 | 0 | 2 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 3 | 0 | 0 | 0 | 1 | 0 | 0 | 3 | 1 | 0 | 0 | (0) | 0 | 0 | → 3
| 0 | 2 | 0 | 0 | 0 | 0 | 0 | 0 | 2 | 0 | 0 | 0 | 2 | 0 | 0 | (0) | 0 | 0 | → 0
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 3 | 0 | 0 | 1 | 0 | 0 | 0 | 3 | 0 | 0 | 1 | 3 | 0 | 0 | 1 | 0 | 0 |
| 0 | 0 | 0 | 0 | 2 | 0 | 0 | 0 | 0 | 0 | 0 | 2 | 0 | 0 | 0 | 2 | 0 | 0 |

In Column 17, correct the numbers in the chart at lines 35-54, as identified by the circles below, as follows:

```
|1 0 0 3 0| |0 1 0 0 3| |0 0 1 0 0|
|2 0 0 0 0| |0 2 0 0 0| |0 0 2 0 0|
|0 0 0 0 0| |0 0 0 0 0| |0 0 0 0 0|
|0 0 0 0 0| |0 0 0 0 0| |0 0 0 0 0|
|0 0 0 0 0| |0 0 0 0 0| |0 0 0 0 0|
|3 0 0 1 0| |0 3 0 0 1| |0 0 3 (1) 0|  ──0
|0 0 0 2 0| |0 0 0 0 2| |0 0 0 (2) 0|
|0 0 0 0 0| |0 0 0 0 0| |0 0 0 0 0|  ──0
|0 0 0 0 0| |0 0 0 0 0| |0 0 0 0 0|
|0 0 0 0 0| |0 0 0 0 0| |0 0 0 0 0|
|0 0 0 0 0| |0 0 0 0 0| |0 0 0 0 0|
|0 1 0 0 3| |0 0 1 0 0| |1 0 0 3 0|
|0 2 0 0 0| |0 0 2 0 0| |2 0 0 0 0|
|0 0 0 0 0| |0 0 0 0 0| |0 0 0 0 0|
|0 0 0 0 0| |0 0 0 0 0| |0 0 0 0 0|
|0 0 0 0 0| |0 0 0 0 0| |0 0 0 0 0|
|0 3 0 0 1| |0 0 3 0 0| |3 0 0 1 0|
|0 0 0 0 2| |0 0 0 0 0| |0 0 0 2 0|
```

In Column 20, correct the numbers in the chart at lines 19-39, as identified by the circles below, as follows:

```
|1 0 0 3 0 0 1| |0 1 0 0 3 0 0| |0 0 1 0 0 3 0|
|2 0 0 4 0 0 2| |0 2 0 0 4 0 0| |0 0 2 0 0 4 0|
|0 0 0 0 0 0 0| |0 0 0 0 0 0 0| |0 0 0 0 0 0 0|
|0 0 0 0 0 0 0| |0 0 0 0 0 0 0| |0 0 0 0 0 0 0|
|0 0 0 0 0 0 0| |0 0 0 0 0 0 0| |0 0 0 0 0 0 0|
|3 0 0 1 0 0 3| |0 3 0 0 1 0 0| |0 0 3 0 0 1 0|
|4 0 0 2 0 0 4| |0 4 0 0 2 0 0| |0 0 4 0 0 2 0|
|0 0 0 0 0 0 0| |0 0 0 0 0 0 0| |0 0 0 0 0 0 0|
|0 0 0 0 0 0 0| |0 0 0 0 0 0 0| |0 0 0 0 0 0 0|
|0 0 0 0 0 0 0| |0 0 0 0 0 0 0| |0 0 0 0 0 0 0|
|0 0 0 0 0 0 0| |0 0 0 0 0 0 0| |0 0 0 0 0 0 0|
|0 1 0 0 3 0 0| |0 0 1 0 0 0 0| |1 0 0 3 0 0 1|
|0 2 0 0 4 0 0| |0 0 2 0 0 3 0| |2 0 0 4 0 0 2|
|0 0 0 0 0 0 0| |0 0 0 0 0 4 0| |0 0 0 0 0 0 0|
|0 0 0 0 0 0 0| |0 0 0 0 0 0 0| |0 0 0 0 0 0 0|
|0 0 0 0 0 0 0| |0 0 0 0 0 0 0| |0 0 0 0 0 0 0|
|0 3 0 0 1 0 0| |0 0 3 0 0 1 0| |3 0 0 1 0 (0) 3|  ──0
|0 4 0 0 2 0 0| |0 0 4 0 0 2 0| |4 0 0 2 0 (0) 4|  ──0
```

CERTIFICATE OF CORRECTION (continued)
U.S. Pat. No. 8,488,693 B2

In Column 20, correct the numbers in the chart at lines 45-64, as identified by the circles below, as follows:

[Chart of three matrices with circled corrections indicating values to be changed to 0]

In Column 21, correct the numbers in the chart at lines 20-40, as identified by the circles below, as follows:

[Chart of three matrices with circled corrections indicating values to be changed to 0]

CERTIFICATE OF CORRECTION (continued)
U.S. Pat. No. 8,488,693 B2

In Column 21, correct the numbers in the chart at lines 44-62, as identified by the circles below, as follows:

|   |   |   |   |   |   |   |   |   |   |   |   |   |   |   |   |   |   |   |   |   |
|---|---|---|---|---|---|---|---|---|---|---|---|---|---|---|---|---|---|---|---|---|
| 1 | 0 | 0 | 3 | 0 | 0 | 1 | 0 | 1 | 0 | 0 | 3 | 0 | 3 | 0 | 0 | 1 | 0 | 0 | 3 | 0 |
| 2 | 0 | 0 | 0 | 0 | 0 | 2 | 0 | 2 | 0 | 0 | 0 | 0 | 0 | 0 | 0 | 2 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 1 | 0 | 0 | 3 | 0 | 3 | 0 | 0 | 1 | 0 | 0 | 0 | 0 | 3 | 0 | 0 | 1 | 0 |
| 0 | 0 | 0 | 2 | 0 | 0 | 0 | 0 | 0 | 0 | 0 | 2 | 0 | 0 | 0 | 0 | 0 | 0 | 0 | 2 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 3 | 0 | 0 | 0 | 0 | 1 | 0 | 0 | 0 | 0 | 1 | 0 | 0 | 3 | 0 | 0 | 1 |
| 0 | 2 | 0 | 0 | 0 | 0 | 0 | 0 | 0 | 2 | 0 | 0 | 3 | 0 | 2 | 0 | 0 | (4) | 0 | 0 | 2 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 3 | 0 | 0 | 1 | 0 | 0 | 1 | 0 | 3 | 0 | 0 | 1 | 0 | 3 | 0 | 0 | 1 | 0 | (1) | 3 |
| 0 | 0 | 0 | 0 | 2 | 0 | 0 | 2 | 0 | 0 | 0 | 0 | 2 | 0 | 0 | 0 | 0 | 2 | 0 | (2) | 0 |

Circled corrections → 0, 0, 0

In Column 22, correct the numbers in the chart at lines 21-41, as identified by the circles below, as follows:

|   |   |   |   |   |   |   |   |   |   |   |   |   |   |   |   |   |   |   |   |   |
|---|---|---|---|---|---|---|---|---|---|---|---|---|---|---|---|---|---|---|---|---|
| 0 | 0 | 0 | 3 | 0 | 0 | 1 | 0 | 1 | 0 | 0 | 3 | 0 | 0 | 0 | 0 | 1 | 0 | 0 | 3 | 0 |
| 0 | 0 | 0 | 4 | 0 | 0 | 2 | 0 | 2 | 0 | 0 | 4 | 0 | 0 | 0 | 0 | 2 | 0 | 0 | 4 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 3 | 0 | 3 | 0 | 0 | 1 | 0 | 0 | 0 | 0 | 3 | 0 | 0 | 1 | 0 |
| 0 | 0 | 0 | 2 | 0 | 0 | 4 | 0 | 4 | 0 | 0 | 2 | 0 | 0 | 0 | 0 | 4 | 0 | 0 | 2 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 3 | 0 | 0 | 0 | 0 | 1 | 0 | 0 | 0 | 0 | 1 | 0 | 0 | 3 | 0 | 0 | 0 |
| 0 | 2 | 0 | 0 | 4 | 0 | 0 | 0 | 0 | 2 | 0 | 0 | 3 | 0 | 2 | 0 | 0 | 4 | 0 | 0 | 0 |
| 0 | 0 | 0 | 0 | 0 | 0 | 0 | 0 | 0 | 0 | 0 | 0 | 4 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 3 | 0 | 0 | 1 | 0 | 0 | 0 | 0 | 3 | 0 | 0 | 1 | 0 | 3 | 0 | 0 | 1 | 0 | (1) | 0 |
| 0 | 4 | 0 | 0 | 2 | 0 | 0 | 0 | 0 | 4 | 0 | 0 | 2 | 0 | 4 | 0 | 0 | 2 | 0 | (2) | 0 |

Circled corrections → 0, 0

In Column 34, Claim 19, correct the numbers in the chart at lines 1-21, as identified by the circles below, as follows:

$$\begin{vmatrix} 1 & 0 & 0 & 0 & 1 & 3 \\ 2 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 0 & 0 & 0 & 2 & 0 \\ 0 & 0 & 0 & 0 & 0 & 0 \\ 1 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 3 & 0 \\ 0 & 2 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 0 & 0 & 0 & 0 & 1 \\ 0 & 0 & 0 & 0 & 0 & 2 \end{vmatrix}$$

The circled entries are: the "1" in row 1, column 5 (corrected to 0), and the "1" in row 9, column 1 (corrected to 0).

In Column 35, Claim 22, correct the numbers in the chart at lines 35-55, as identified by the circles below, as follows:

$$\begin{vmatrix} 1 & 0 & 0 & 0 & 0 & 3 \\ 2 & 0 & 0 & 0 & 0 & 4 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 4 & 0 & 0 & 2 & 0 \\ 0 & 0 & 0 & 0 & 0 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 1 & 0 & 0 & 3 & 0 \\ 0 & 2 & 0 & 0 & 4 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 0 & 0 & 0 & 0 & 1 \\ 4 & 0 & 0 & 0 & 0 & 2 \end{vmatrix}$$

The circled entries are: the "1" in column 6 (corrected to 0), and the "3" in the second-to-last row, column 1 (corrected to 0), and the "4" in the last row, column 1 (corrected to 0).

In Column 37, Claim 25, correct the numbers in the chart lines 2-21, as identified by the circles below, as follows:

$$\begin{vmatrix} 1 & 0 & 0 & 3 & 0 & 0 \\ 2 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 0 & 0 & 1 & 0 & 0 \\ 0 & 0 & 0 & 2 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 3 & 0 \\ 0 & 2 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 0 & 0 & 0 & 2 & 0 \end{vmatrix} \begin{vmatrix} 0 & 1 & 0 & 0 & 3 & 0 \\ 0 & 2 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 0 & 0 & 0 & 2 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 3 \\ 0 & 0 & 2 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 3 & 0 & 0 & 1 \\ 0 & 0 & 0 & 0 & 0 & 2 \end{vmatrix} \begin{vmatrix} 0 & 0 & 1 & 0 & 0 & 3 \\ 0 & 0 & 2 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 3 & 0 & 0 & 1 \\ 0 & 0 & 0 & 0 & 0 & 2 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & 0 & \underline{0} & 0 & 0 \\ 2 & 0 & 0 & \underline{3} & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 0 & 0 & 1 & 0 & 0 \\ 0 & 0 & 0 & 2 & 0 & 0 \end{vmatrix}$$

(circled values: 0 → 3, 3 → 0)

In Column 37, Claim 26, correct the numbers in the chart at lines 36-55, as identified by the circles below, as follows:

$$\begin{vmatrix} 1 & 0 & 0 & 3 & 0 & 0 \\ 2 & 0 & 0 & 4 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 3 & 0 & 0 & 1 & 0 & 0 \\ 4 & 0 & 0 & 2 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 3 & 0 \\ 0 & 2 & 0 & 0 & 4 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 4 & 0 & 0 & 2 & 0 \end{vmatrix} \begin{vmatrix} 0 & 1 & 0 & 0 & 3 & 0 \\ 0 & 2 & 0 & 0 & 4 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 3 & 0 & 0 & 1 & 0 \\ 0 & 4 & 0 & 0 & 2 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 1 & 0 & 0 & 3 \\ 0 & 0 & 2 & 0 & 0 & 4 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 3 & 0 & 0 & 1 \\ 0 & 0 & 4 & 0 & 0 & 2 \end{vmatrix} \begin{vmatrix} 0 & 0 & 1 & 0 & 0 & 3 \\ 0 & 0 & 2 & 0 & 0 & 4 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 3 & 0 & 0 & 1 \\ 0 & 0 & 4 & 0 & 0 & 2 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 1 & 0 & 0 & \underline{0} & 0 & 0 \\ 2 & 0 & 0 & \underline{3} & 0 & 0 \\ 0 & 0 & 0 & \underline{0} & 0 & 0 \\ 0 & 0 & 0 & 0 & 0 & 0 \\ 0 & 0 & 0 & 0 & 0 & 0 \\ 3 & 0 & 0 & 1 & 0 & 0 \\ 4 & 0 & 0 & 2 & 0 & 0 \end{vmatrix}$$

(circled values: 0 → 3, 3 → 0, 0 → 4)

CERTIFICATE OF CORRECTION (continued)
U.S. Pat. No. 8,488,693 B2

In Column 39, Claim 30, correct the numbers in the chart at lines 36-56, as identified by the circles below, as follows:

```
|0 0 0 3 0 0 1|  |0 1 0 0 3 0 0|  |0 0 1 0 0 3 0|
|0 0 0 4 0 0 2|  |0 2 0 0 4 0 0|  |0 0 2 0 0 4 0|
|0 0 0 0 0 0 0|  |0 0 0 0 0 0 0|  |0 0 0 0 0 0 0|
|0 0 0 0 0 0 0|  |0 0 0 0 0 0 0|  |0 0 0 0 0 0 0|
|0 0 0 0 0 0 0|  |0 0 0 0 0 0 0|  |0 0 0 0 0 0 0|
|0 0 0 1 0 0 3|  |0 3 0 0 1 0 0|  |0 0 3 0 0 1 0|
|0 0 0 2 0 0 4|  |0 4 0 0 2 0 0|  |0 0 4 0 0 2 0|
|0 0 0 0 0 0 0|  |0 0 0 0 0 0 0|  |0 0 0 0 0 0 0|
|0 0 0 0 0 0 0|  |0 0 0 0 0 0 0|  |0 0 0 0 0 0 0|
|0 0 0 0 0 0 0|. |0 0 0 0 0 0 0|. |0 0 0 0 0 0 0|
|0 0 0 0 0 0 0|  |0 0 0 0 0 0 0|  |0 0 0 0 0 0 0|
|0 1 0 0 3 0 0|  |0 0 1 0 0 0 0|  |1 0 0 3 0 0 0|
|0 2 0 0 4 0 0|  |0 0 2 0 0 3 0|  |2 0 0 4 0 0 0|
|0 0 0 0 0 0 0|  |0 0 0 0 0 4 0|  |0 0 0 0 0 0 0|
|0 0 0 0 0 0 0|  |0 0 0 0 0 0 0|  |0 0 0 0 0 0 0|
|0 0 0 0 0 0 0|  |0 0 0 0 0 0 0|  |0 0 0 0 0 0 0|
|0 3 0 0 1 0 0|  |0 0 3 0 0 1 0|  |3 0 0 1 (1) 0|  0
|0 4 0 0 2 0 0|  |0 0 4 0 0 2 0|  |4 0 0 2 (2) 0|  0
```